United States Patent
Negishi et al.

(10) Patent No.: US 8,661,853 B2
(45) Date of Patent: Mar. 4, 2014

(54) METHOD FOR PRODUCING GLASS, OPTICAL GLASS, GLASS MATERIAL FOR PRESS MOLDING, OPTICAL ELEMENT AND METHODS FOR PRODUCING SAME

(75) Inventors: Tomoaki Negishi, Tokyo (JP); Yasuhiro Fujiwara, Tokyo (JP)

(73) Assignee: Hoya Corporation, Tokyo (JP)

( * ) Notice: Subject to any disclaimer, the term of this patent is extended or adjusted under 35 U.S.C. 154(b) by 39 days.

(21) Appl. No.: 13/128,454

(22) PCT Filed: Nov. 9, 2009

(86) PCT No.: PCT/JP2009/069412
§ 371 (c)(1),
(2), (4) Date: Jun. 21, 2011

(87) PCT Pub. No.: WO2010/053214
PCT Pub. Date: May 14, 2010

(65) Prior Publication Data
US 2011/0263410 A1      Oct. 27, 2011

(30) Foreign Application Priority Data
Nov. 10, 2008   (JP) ................................. 2008-287374

(51) Int. Cl.
C03B 5/00     (2006.01)
C03B 5/16     (2006.01)
C03C 3/064    (2006.01)
C03C 3/068    (2006.01)

(52) U.S. Cl.
USPC .............. 65/134.1; 65/134.3; 501/77; 501/78

(58) Field of Classification Search
USPC .............. 501/73, 77, 78, 79; 65/134.1, 134.3, 65/134.8, 136.4, 122
See application file for complete search history.

(56) References Cited

U.S. PATENT DOCUMENTS

| | | | |
|---|---|---|---|
| 6,645,894 B2 * | 11/2003 | Endo | 501/51 |
| 8,127,570 B2 * | 3/2012 | Negishi et al. | 65/61 |
| 2002/0006857 A1 | 1/2002 | Tachiwama | |

(Continued)

FOREIGN PATENT DOCUMENTS

| | | |
|---|---|---|
| JP | 2001-76336 | 3/2001 |
| JP | 2001-348244 | 12/2001 |

(Continued)

OTHER PUBLICATIONS

International Search Report for PCT/JP2009/069412, dated Feb. 2, 2010.

(Continued)

*Primary Examiner* — Noah Wiese
(74) *Attorney, Agent, or Firm* — Nixon & Vanderhye P.C.

(57) ABSTRACT

A process for producing a glass in the production of a glass molded article formed of an optical glass by melting and clarifying a glass raw material to prepare a molten glass and molding said molten glass,
the process comprising preparing a glass raw material that gives an oxide glass comprising, by cationic %,
12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$,
a total content of said cationic components in the oxide glass being 99 to 100%, and said glass raw material comprising carbonate and sulfate.

9 Claims, 7 Drawing Sheets

(56) References Cited

U.S. PATENT DOCUMENTS

2003/0032542 A1    2/2003   Endo
2009/0176641 A1*   7/2009   Kobayashi et al. ............. 501/78

FOREIGN PATENT DOCUMENTS

| | | |
|---|---|---|
| JP | 2002-284542 | 10/2002 |
| JP | 2008-201645 | 9/2008 |
| JP | 2008-254951 | 10/2008 |
| WO | WO-2007/148816 | * 12/2007 .............. C03C 3/068 |

OTHER PUBLICATIONS

Written Opinion for PCT/JP2009/069412, dated Feb. 2, 2010.

* cited by examiner

METHOD FOR PRODUCING GLASS, OPTICAL GLASS, GLASS MATERIAL FOR PRESS MOLDING, OPTICAL ELEMENT AND METHODS FOR PRODUCING SAME

This application is the U.S. national phase of International Application No. PCT/JP2009/069412 filed 9 Nov. 2009 which designated the U.S. and claims priority to JP 2008-287374 filed 10 Nov. 2008, the entire contents of each of which are hereby incorporated by reference.

FIELD OF THE INVENTION

This invention relates to an optical glass having remarkably high internal quality, a press-molding glass material and an optical element each formed of the above glass, and a process for producing the optical element.

BACKGROUND ART

An optical glass having a boric acid-lanthanum system is known to be a high-refractivity low-dispersion glass or a high-refractivity intermediate-dispersion glass. As such a glass, there are known those which are disclosed in Patent Documents 1 and 2.
[Patent Document 1] JP2002-284542A
[Patent Document 2] JP2001-348244A

DISCLOSURE OF THE INVENTION

Problems to be Solved by the Invention

Meanwhile, a boric acid-lanthanum system glass having high-refractivity intermediate-dispersion or low-dispersion properties is a glass that requires a very high clarifying temperature or a long clarifying time period in order to have a sufficient bubble elimination effect as compared with general optical glasses. When the clarifying temperature is increased or the clarifying time period is increased, there is also a problem that the amount of volatile components such as boric acid, etc., is decreased by volatilization to vary a refractive index, or that a refractory material such as platinum constituting a clarifying vessel is corroded by a molten glass and is hence dissolved in the glass to color the glass.

This invention has been made to overcome the above problems inherent to the above glass, and it is an object of this invention to provide an optical glass excellent in clarification property and a process for producing the same, and also to provide a press-molding glass material and an optical element each formed of the above glass and a process for producing the optical element.

Means to Solve the Problems

This invention has been made to overcome the above problems and provides, (1) a process for producing a glass in the production of a glass molded article formed of an optical glass by melting and clarifying a glass raw material to prepare a molten glass and molding said molten glass,
the process comprising preparing a glass raw material that gives an oxide glass comprising, by cationic %,
12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Nb^{5+}$, $W^{6+}$ and $Bi^{3+}$,
0 to 35% of $Zn^{2+}$,
0 to 9% of total of $Li^+$, $Na^{4+}$ and $K^+$, and
0 to 15% of total of $Mg^{2+}$, $Ca^{2+}$, $Sr^{2+}$ and $Ba^{2+}$,
a total content of said cationic components in the oxide glass being 99 to 100%, and said glass raw material comprising carbonate and sulfate, (2) a process for producing a glass in the production of a cullet by melting a glass raw material to prepare a molten glass and rapidly cooling said molten glass,
the process comprising preparing a glass raw material that gives a glass comprising, by cationic %,
12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$,
a total content of said cationic components in the glass being 99 to 100%, and said glass raw material comprising carbonate and sulfate, (3) a process for producing a glass, which comprises preparing a cullet according to the process recited in the above (2), melting and clarifying said cullet to prepare a molten glass and molding said molten glass, to produce a glass molded material formed of an optical glass comprising, by cationic %,
12 to 65% of $B^{3+}$,
0 to 20% of $Si^{4+}$,
0 to 6% of $Ge^{4+}$,
15 to 50% of total of $La^{3+}$, $Gd^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$,
a total content of said cationic components in the optical glass being 99 to 100%, (4) a process for producing a glass as recited in the above (1) or (3), wherein at least one step of said melting and clarifying is carried out in a vessel made of platinum or a platinum alloy, (5) an optical glass that is an oxide glass comprising, by cationic %,
12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$,
a total content of said cationic components in the oxide glass being 99% or more,
the oxide glass containing carbon and sulfur, (6) a press-molding glass material formed of the optical glass recited in the above (5), (7) an optical element formed of the optical glass recited in the above (5), (8) a process for producing an optical element, which comprises preparing an optical glass according to the process recited in any one of the above (1), (3) and (4), and making an optical element from said optical glass, and (9) a cullet formed of an oxide glass comprising, by cationic %,
12 to 65% of $B^{3+}$,
0 to 20% of $Si^{4+}$, 0 to 6% of $Ge^{4+}$,
15 to 54% of total of $La^{3+}$, $Gd^{3+}$, $Y^{3+}$, $Yb^{3+}$, $Sc^{3+}$ and $Lu^{3+}$,
4 to 40% of total of $Ta^{5+}$, $Zr^{4+}$, $Ti^{4+}$, $Nb^{5+}$, and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$,
a total content of said cationic components in the oxide glass being 99% or more,
the oxide glass containing carbon and sulfur.

Effect of the Invention

According to this invention, there can be provided an optical glass excellent in clarification property and a process for producing the same. Since the excellent clarification property is achieved, it is no longer required to elevate a clarifying temperature or increase a clarifying time period, so that the corrosion of a glass melting vessel can be reduced and that the intensification of coloring caused by the dissolving of a refractory material constituting the vessel in a glass can be prevented. Further, since the amount of volatilization of a volatile component from a molten glass can be also reduced, the variance in refractivity can be inhibited. Furthermore, the wearing-down of a glass melting apparatus including a clarifying vessel can be also reduced. Further, since a high-quality optical glass can be produced for a relatively small time period, the productivity of the glass can be improved.

According to this invention, further, an excellent clarification property can be achieved without using, as a clarifying agent, arsenic that is harmful or antimony that intensifies a coloring.

According to this invention, further, there can be provided a press-molding glass material for producing a high-quality press molded article from the above optical glass, a high-quality optical element and a process for producing the optical element.

PREFERRED EMBODIMENTS OF THE INVENTION

[Optical Glass and Production Process Thereof]

Figure 1:
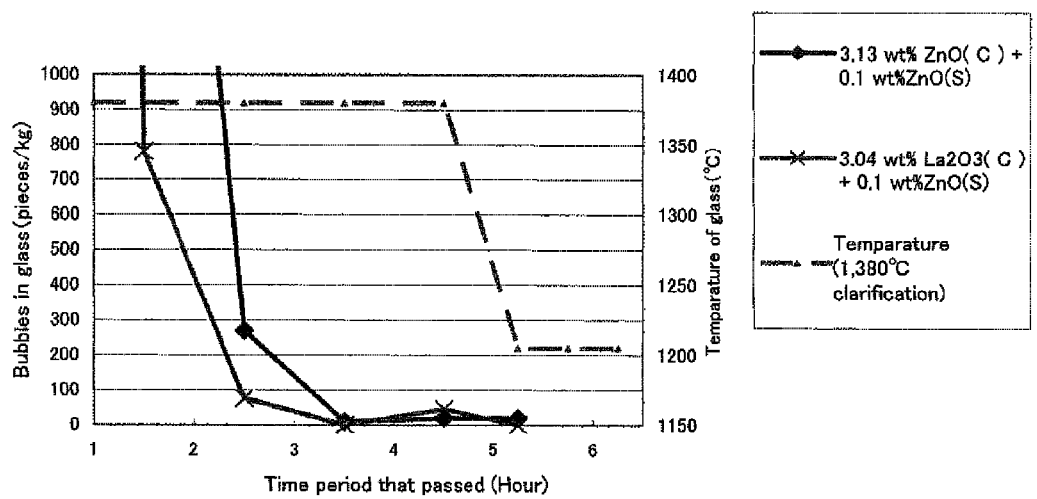
FIG. 1 shows a temperature change of a glass and a change of residual bubbles with time when a glass raw material that is prepared to give an optical glass I is melted, clarified and homogenized to obtain the glass.

The optical glass to be produced according to the process of this invention and the composition of the optical glass of this invention will be explained first. The optical glass to be produced according to the process of this invention and the optical glass of this invention will be referred to as "optical glass I" hereinafter. Contents of cationic components and total contents thereof will be by cationic % unless otherwise specified.

The optical glass I is an oxide glass comprising
12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$,
provided that the total content of said cationic components is 99% or more, and comprising carbon and sulfur.

In a glass having a composition that is the glass composition of the above optical glass I but is free of carbon and sulfur ("optical glass A" hereinafter), the total content of alkali metals and alkaline earth metals and the content of $Zn^{2+}$ are limited, and the total content of high-refractivity-imparting components such as $La^{3+}$, $Gd^{3+}$, $Y^{3+}$, $Yb^{3+}$, $Sc^{3+}$, $Zr^{3+}$, $Ta^{5+}$, $Zr^{4+}$, $Ti^{4+}$, $Nb^{5+}$, $W^{6+}$ and $Bi^{4+}$ is large, in order to increase refractivity. As compared with optical glasses in general, therefore, the optical glass A has a high melting temperature, or it is required to set its clarifying temperature at a very high temperature in order to render its viscosity suitable for clarification.

When $Sb_2O_3$ is added to the optical glass A to improve the clarification property, the coloring of the glass is intensified. When $SnO_2$ alone is added as a clarifying agent, no sufficient elimination of bubbles is possible. When the clarifying time period is increased in order to attain sufficient elimination of bubbles, there can be also caused a problem that a refractory material constituting a melting vessel, such as platinum, is dissolved in the glass to color the glass.

It is thinkable to use carbonates and nitrates as a glass raw material, in which these salts are thermally decomposed during melting to generate $CO_x$ gas and $NO_x$ gas in a molten glass, so that the elimination of bubbles is promoted. Since, however, the clarifying temperature for the optical glass A is high as compared with a temperature at which the carbonates and nitrates are thermally decomposed to generate $CO_x$ gas and $NO_x$ gas, almost no clarification effect by the above gases can be expected. When the amount of nitrates that are added is increased in order to improve the clarification effect, the nitrates are thermally decomposed to generate a large amount of $NO_x$ gas, and a refractory material constituting a melting vessel, such as platinum, etc., is increasingly intensely corroded and worn out.

Further, even when $SO_x$ gas is generated to promote clarification by using sulfates as a glass raw material, no great improvement in clarification effect can be observed, and when the amount of sulfates that are used is increased, a glass is colored, or a glass melt is over-boiled, and it is hence no longer possible to carry out excellent glass melting. Moreover, the sulfates are thermally decomposed to generate a large amount of $SO_x$ gas, and the refractory material constituting a melting vessel such as platinum, etc., is increasingly intensely corroded and worn out.

This invention overcomes the above problem inherent to the optical glass A by melting a glass in the co-presence of carbonates and sulfates.

It will be explained below that the co-presence of carbonates and sulfates in the optical glass I produces an excellent clarification effect. FIG. 1 is related to an optical glass $I_A$ to be described later, in particular, an optical glass $I_A$-1. FIGS. 2-5 are related to a glass that has the glass composition of an optical glass $I_A$ to be described later, in particular, an optical glass $I_A$-1 and that has a composition containing none of carbon and sulfur. The clarification effect in the optical glass $I_A$-1 is remarkably excellent, while the optical glass I that is other than the optical glass $I_A$-1, e.g., an optical glass $I_A$-2 to be described later also has an excellent clarification effect.

FIG. 1 shows a temperature change of a glass and a change of residual bubbles with time when a glass raw material containing boric acids, oxides, carbonates and sulfates is prepared to give an optical glass I, melted, clarified and homogenized to obtain the glass.

Figure 2:
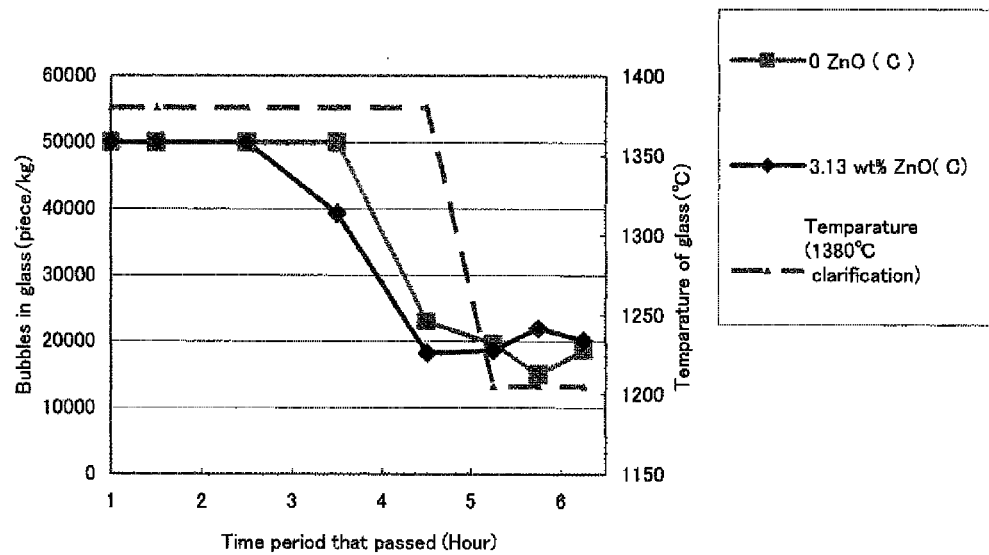
FIG. 2 shows a temperature change of a glass and a change of residual bubbles with time when a glass raw material that is prepared to give an optical glass A without using sulfate is melted, clarified and homogenized to obtain the glass.

FIG. 2 shows a temperature change of a glass and a change of residual bubbles with time when a glass raw material containing boric acid, oxides and carbonates is prepared to give an optical glass A without using sulfate, melted, clarified and homogenized to obtain the glass.

Figure 3:
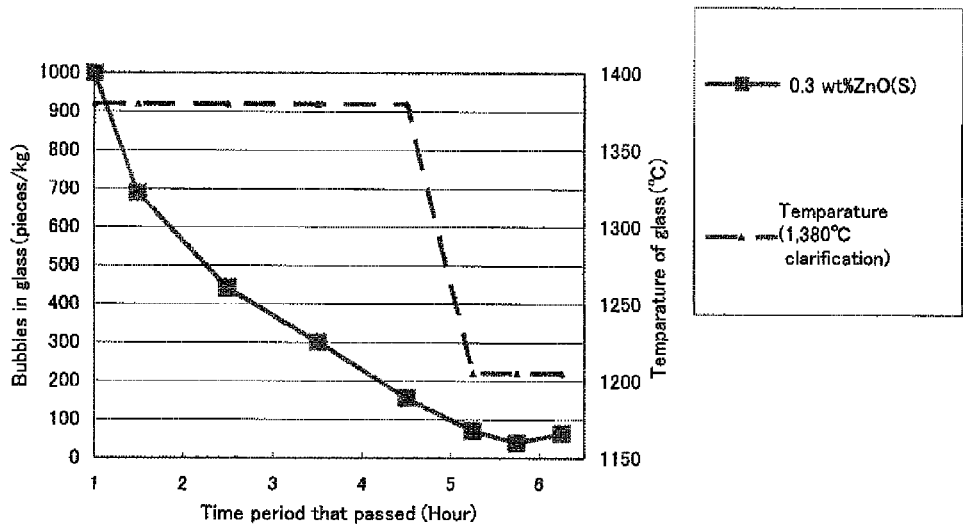
FIG. 3 shows a temperature change of a glass and a change of residual bubbles with time when a glass raw material that is prepared to give an optical glass A without using carbonates is melted, clarified and homogenized to obtain the glass.

FIG. 3 shows a temperature change of a glass and a change of residual bubbles with time when a glass raw material containing boric acid, oxides and sulfates is prepared to give an optical glass A without using carbonates, melted, clarified and homogenized to obtain the glass.

Figure 4:
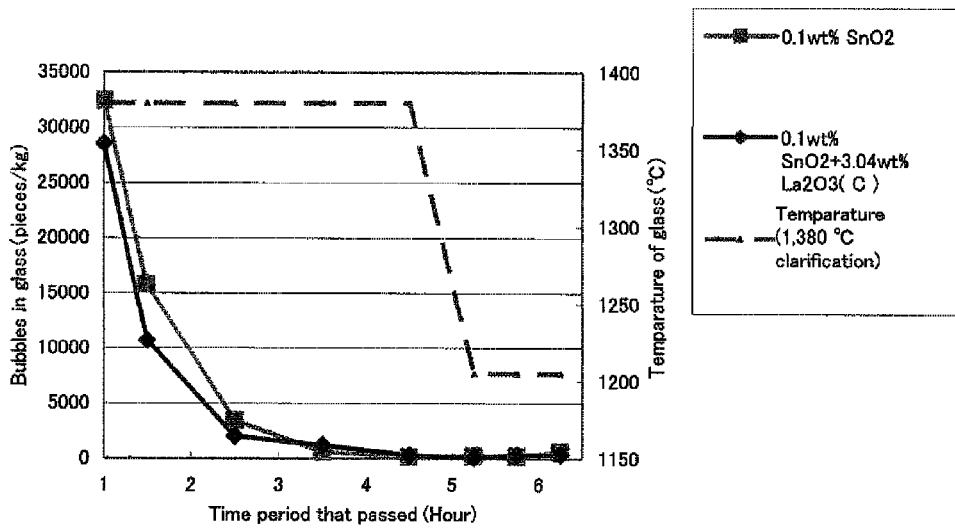
FIG. 4 shows a temperature change of a glass and a change of residual bubbles with time when a glass raw material that is prepared to give an optical glass A without using any one of carbonates and sulfates is melted, clarified and homogenized to obtain the glass, and a temperature change of a glass and a change of residual bubbles with time when a glass raw material that is prepared without using sulfate is melted, clarified and homogenized to obtain the glass.

FIG. 4 shows a temperature change of a glass and a change of residual bubbles with time when a glass raw material containing boric acid, oxides and $SnO_2$ is prepared to give an optical glass A without using any one of carbonates and sulfates, melted, clarified and homogenized to obtain the glass, and a temperature change of a glass and a change of residual bubbles with time when a glass raw material containing boric acid, oxides, carbonates and $SnO_2$ is prepared without using sulfate, melted, clarified and homogenized to obtain the glass.

Figure 5:
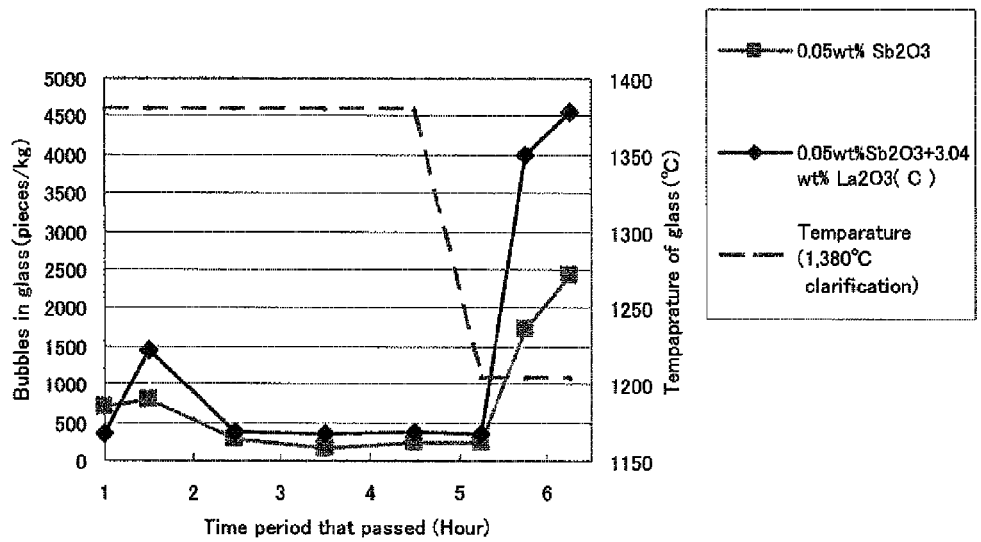
FIG. 5 shows a temperature change of a glass and a change of residual bubbles with time when a glass raw material that is prepared to give an optical glass A without using any one of carbonates and sulfates is melted, clarified and homogenized to obtain the glass, and a temperature change of a glass and a change of residual bubbles with time when a glass raw material that is prepared without using sulfate is melted, clarified and homogenized to obtain the glass.

FIG. 5 shows a temperature change of a glass and a change of residual bubbles with time when a glass raw material containing boric acid, oxides and $Sb_2O_3$ is prepared to give an optical glass A without using any one of carbonates and sulfates, melted, clarified and homogenized to obtain the glass, and a temperature change of a glass and a change of residual bubbles with time when a glass raw material containing boric acid, oxides, carbonates and $Sb_2O_3$ is prepared without using sulfate, melted, clarified and homogenized to obtain the glass.

Figure 6:
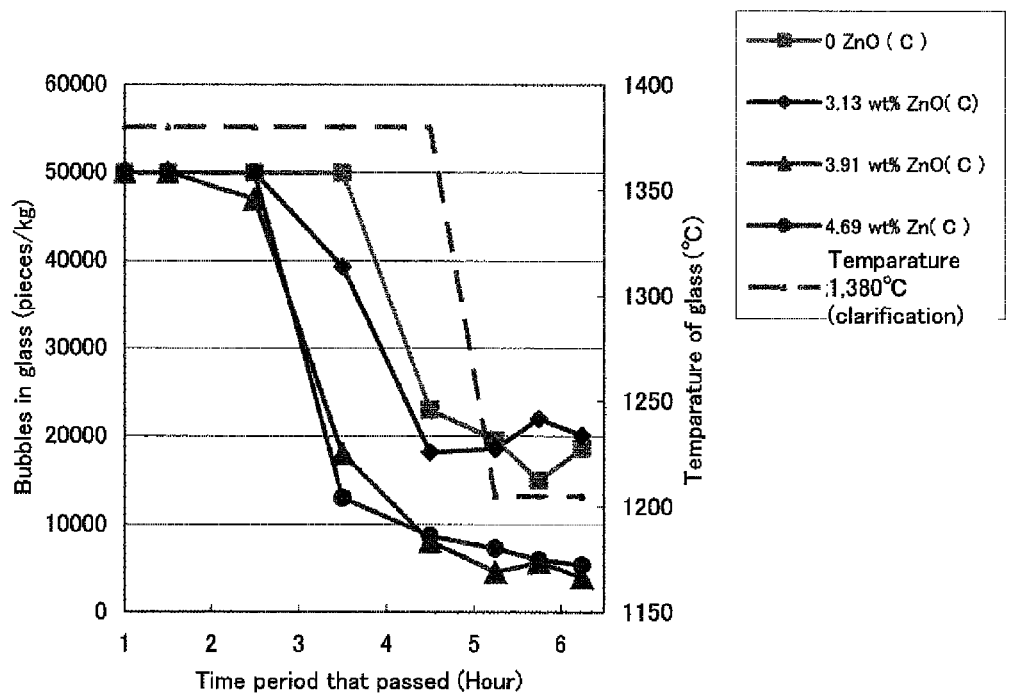
FIG. 6 shows how residual bubbles change depending upon a large or small amount of carbonates when no sulfate is used like in FIG. 2 but carbonates are used.

FIG. 6 shows how residual bubbles change depending upon a large or small amount of carbonates when no sulfate is used like in FIG. 2 but carbonate, specifically basic zinc carbonate, is used.

Figure 7:
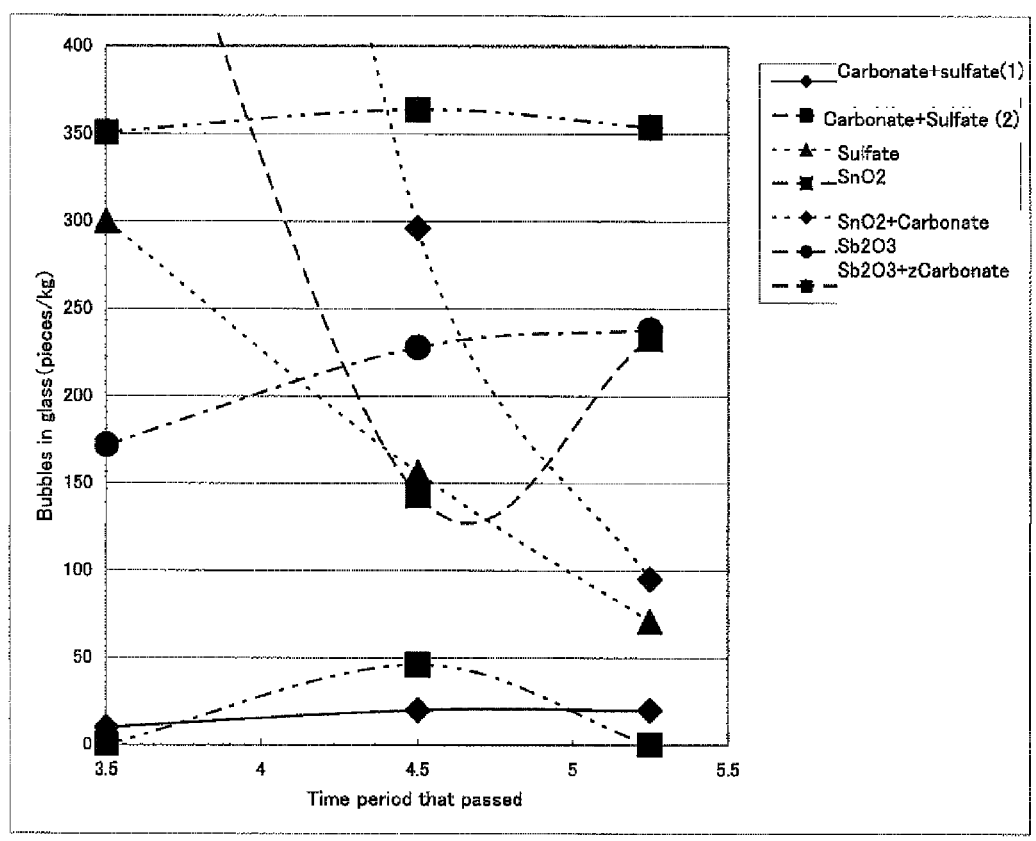
FIG. 7 shows enlarged views of changes of residual bubbles with time in 3.5 hours after the start of clarification up to 5.5 hours in FIG. 1 and FIGS. 3 to 5.

FIG. 7 shows enlarged views of changes of residual bubbles with time in 3.5 hours after the start of clarification up to 5.5 hours in FIG. 1 and FIGS. 3 to 5.

Data shown in FIGS. 1 to 7 are obtained by melting a glass in a platinum crucible having a volume of 3 liters, timely sampling glass melts in the crucible, rapidly cooling each sampled glass melt, holding each at a temperature around a glass transition temperature, then gradually cooled each at a rate of −30° C./hour to obtain glasses, measuring bubbles contained in each glass for numbers and converting measured values to densities per unit mass.

In FIGS. 1-6 and FIGS. 10-13 to be described later, each value by wt % ZnO(C) shows the amount, by mass %, of ZnO that is introduced into a glass in the form of a basic zinc carbonate. A value obtained by multiplying the above value by 0.2 is an amount (mass % externally based on a glass composition) of carbon as $CO_2$ contained in a glass raw material in the form of a basic zinc carbonate. A value by wt % $La_2O_3$ likewise shows the amount, by mass %, of $La_2O_3$ that is introduced into a glass in the form of lanthanum oxide. A value obtained by multiplying the above value by 0.405 is an amount (mass % externally based on a glass composition) of carbon as $CO_2$ contained in a glass raw material in the form of lanthanum carbonate. A value by wt % ZnO(S) likewise shows the amount, by mass %, of ZnO that is introduced into a glass in the form of zinc sulfate. A value obtained by multiplying the above value by 0.984 is an amount (mass % externally based on a glass composition) of sulfur as $SO_3$ contained in a glass raw material in the form of zinc sulfate.

It is seen from these results that only when a glass is melted in a state where carbonate and sulfate are co-present as shown in FIG. 1, residual bubbles in a glass are decreased to a low level and an excellent clarification effect can be obtained.

In contrast, even when carbonates or sulfates are used singly, no sufficient clarification effect is exhibited. Further, when carbonates are used singly and increased in an amount as shown in FIG. 6, no improvement in clarification effect is observed, and when the amount of carbonates gets larger than a certain amount, no change in clarification effect is observed.

It is thought that $CO_x$ or $SO_x$ that is generated by thermal decomposition of carbonates or sulfates in the process of melting raw materials in the production of a glass is dissolved in the glass and is released in the form of dissolved gas such as $CO_x$, $SO_x$, or the like that is dissolved in a molten glass by increasing the molten glass temperature during clarification to promote the clarification. It is thought that the cause of showing no change in clarification effect when carbonates are increased in amount as shown in FIG. 6 is that the solubility of $CO_x$ in the molten glass comes to be saturated. Even when $CO_x$ is dissolved in a molten glass until the solubility thereof is saturated, no sufficient clarification effect can be obtained on the basis of $CO_x$ alone. It is thought that $SO_x$ as a gas component having a different behavior of being dissolved in a glass is further dissolved in the molten glass in addition to $CO_x$, the amount of gas released in the molten glass is increased by increasing the temperature of the molten glass in the process of clarification, and the clarification effect is remarkably intensified. In FIG. 7, a solid line passing through plots ♦ (carbonate+sulfate (1)) and an alternate long and two dashes line passing through plots ■ (carbonate+sulfate (2)) show changes of bubble density in a glass when carbonate and sulfate are used at the same time. A dotted line passing through plots ▲ shows a change of bubble density with time when sulfate alone is used. Doubled dash line passing through plots ■ shows a change of bubble density with time when $SnO_2$ alone is used. A dotted line ($SnO_2$+carbonate) passing through plots ♦ shows a change of bubble density with time when $SnO_2$ and carbonate are used at the same time. An alternate long and short dash line passing through plots ● shows a change of bubble density with time when $Sb_2O_3$ alone is used. An alternate long and two dashes line ($Sb_2O_3$+carbonate) passing through plots ■shows a change of bubble density with time when $Sb_2O_3$ and carbonate are used at the same time.

As shown above, an optical glass A is melted in a state where carbonate and sulfate are co-present, a remarkably excellent clarification effect can be produced.

The glass production process completed on the basis of the above finding can be largely classified into the following three embodiments.

The first embodiment is a glass production process in the production of a glass molded article formed of an optical glass by melting and clarifying a glass raw material to prepare a molten glass and molding said molten glass, the process comprising preparing a glass raw material that gives an oxide glass comprising, by cationic %, 12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$,
a total content of said cationic components in the oxide glass being 99 to 100%, and said glass raw material comprising carbonate and sulfate ("glass production process I" hereinafter).

The glass production process T is excellent as a process for producing an optical glass by melting and clarifying a raw material prepared by mixing unvitrified compounds, and molding the molten glass to be referred to as "method of direct melting of batch raw materials").

The second embodiment is a glass production process in the production of a cullet by melting a glass raw material to prepare a molten glass and rapidly cooling said molten glass, the process comprising preparing a glass raw material that gives an oxide glass comprising, by cationic %, 12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$,
a total content of said cationic components in the glass being 99 to 100%, and said glass raw material comprising carbonate and sulfate (to be referred to as "glass production process II" hereinafter).

The glass production process II is called "rough melting" and is a process for producing a cullet raw material.

The third embodiment is a glass production process in the production of a glass molded article formed of an optical glass by preparing cutlets according to the glass production process II, melting and clarifying said cutlets to prepare a molten glass and molding said molten glass, the process comprising preparing a glass raw material that gives an oxide glass comprising, by cationic %, 12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$,
a total content of said cationic components in the optical glass being 99 to 100% and said glass raw material comprising carbonate and sulfate (to be referred to as "glass production process III" hereinafter).

For preventing the formation of a non-melted product by remaining non-melted glass raw material and the coloring of a glass in the glass production process I, and for improving the clarification effect, preferably, the temperature for melting the glass raw material is set in the range of 1,100 to 1,480° C., and the temperature for clarifying the glass is set in the range of 1,200 to 1,500° C. For producing the clarification effect, however, it is desirable to render the clarifying temperature higher than the melting temperature. Further, for obtaining a bubbles-free homogenous glass by taking bubbles in a molten glass into a glass composition and for attaining a viscosity suitable for molding, preferably, the temperature for causing a molten glass to flow out is set in the range of 1,000 to 1,250° C. However, for improving the clarification effect and for reducing or inhibiting volatilization on a glass surface when a molten glass is caused to flow out and molded, desirably, the flowing-out temperature is rendered lower than the clarification temperature, and rendered lower than the melting temperature. When the volatilization on the glass surface at a high temperature is reduced or inhibited, the occurrence of striae can be reduced or inhibited, and optical properties such as a refractive index, etc., can be stabilized. For controlling the flowing-out temperature, preferably, a clarified glass is transferred into a vessel called a working vessel while the temperature of the clarified glass is decreased, the glass is stirred in the working vessel to improve homogeneity and simultaneously adjusted to a flowing-out temperature, and then it is caused to flow out.

The above example represents a method in which a glass raw material is melted in a melting vessel called a dissolving vessel by heating, a molten glass obtained by the melting is transferred into a clarifying vessel and clarified with elevating the temperature of the molten glass, the clarified glass is transferred to a working vessel with decreasing the temperature of the clarified glass and stirred to improve homogeneity, and the molten glass is caused to flow out. In the above method, the glass is temperature-increased by heating the glass passing through a pipe connecting the melting vessel and the clarifying vessel by means of the pipe, and temperature-decreased by thermal radiation when it passes through a pipe connecting the clarifying vessel and the working vessel. A flowing-out pipe with a temperature adjusting function such as a heating mechanism is attached to the working vessel, and the glass that flows in the flowing-out pipe is temperature-adjusted.

In addition to the above method, there may be employed a method in which a glass raw material is heated, melted and stirred in one melting vessel to obtain a molten glass, the glass is clarified by increasing the glass temperature, the clarified glass is temperature-decreased to a temperature suitable for causing the glass to flow out and stirred to improve homogeneity, and then the molten glass is caused to flow out from a temperature-adjusting-function-possessing flowing-out pipe attached to the melting vessel. In this method, preferably, the temperature for melting the glass raw material, the clarifying temperature and the flowing-out temperature are adjusted to the above ranges.

The glass production process II is a process for producing a cullet glass material by melting and vitrifying an unvitrified raw material. The glass production process III is a process for melting a cullet raw material prepared according to the glass production process II, clarifying it to obtain a molten glass and molding the resultant molten glass to make a glass molded article.

In the glass production process II, desirably, gas generated by thermal decomposition of carbonate and sulfate and gas sources of the above gas remain in the cullet raw material in large amount. In the clarifying step in the glass production process III, preferably, the above gas is vigorously blown out to promote the elimination of bubbles, or gas from the above gas sources is vigorously generated to promote the elimination of bubbles.

Therefore, in the glass production process II, preferably, the temperature for meting the glass raw material, i.e., the non-vitrified raw material is set in the range of 1,100 to 1,480° C. When the melting temperature is lower than the above lower limit temperature, the glass raw material remains undissolved, and it is difficult to obtain a glass having a homogeneous composition. When an optical glass is produced by melting and clarifying a cullet raw material, a plurality of cullet raw material species are used, optical properties of the cullet raw material species such as refractive indices or Abbe's numbers and optical properties of an intended optical glass such as a refractive index or an Abbe's number are taken into account, and a plurality of the cullet raw material species are weighed, mixed, melted and clarified. When the cullet raw material species contain non-dissolved matter, therefore, the optical properties of an optical glass obtained when the non-dissolved matter is dissolved deviate from the intended optical properties. For getting around such a problem, preferably, the temperature for melting the glass raw material is set at the above lower limit temperature or higher. Further, when the melting temperature for the glass raw material exceeds the above upper limit temperature, all or most of gas that is generated by thermal decomposition of carbonate and sulfate is discharged from the glass, so that it is preferred to set the melting temperature at the above upper limit temperature or lower.

In the glass production process II, the glass raw material is melted to obtain a homogeneous molten glass, and then the above molten glass is rapidly cooled to make the cullet raw material. For example, the molten glass can be cast into a casting mold to rapidly cool it and shape it, and the obtained glass is pulverized to prepare the cullet raw material.

In the glass production process III, the temperature for melting the cullet raw material for obtaining a homogeneous molten glass is preferably set in the range of 1,100 to 1,480° C., more preferably in the range of 1,100 to 1,400° C., still more preferably in the range of 1,100 to 1,350° C., yet more preferably in the range of 1,100 to 1,300° C.

Further, the clarifying temperature is preferably adjusted to 1,200° C. or higher for promoting the elimination of bubbles by aggressively blowing out the above gas and aggressively generating gas from the above gas source and also by decreasing the glass viscosity. On the other hand, when the clarifying temperature is too high, a molten glass corrodes a material such as platinum or platinum alloy constituting a vessel keeping the molten glass therein, and corrosion products dissolved in the glass such as platinum ion, etc., color the glass. When the clarifying temperature is too high, easily volatilizable components such as boric acid, etc., volatilize from a molten glass, so that the glass composition changes to vary optical properties. For getting around such problems, it is preferred to adjust the clarifying temperature to 1,500° C. or lower. From the above viewpoint, the clarifying temperature is set in the range of 1,200 to 1,500° C. The clarifying temperature is more preferably in the range of 1,200 to 1,450° C., still more preferably in the range of 1,200 to 1,400° C., yet more preferably in the range of 1,200 to 1,350° C.

The clarifying temperature is preferably lower than the melting temperature for the glass raw material (unvitrified raw material) in the glass production process II and the melting temperature for the cullet raw material.

The molten glass that has been clarified is temperature-decreased to a flowing-out temperature or is brought close to a flowing-out temperature and stirred to improve homogeneity. When the molten glass is temperature-decreased, a bubble-free homogeneous glass can be obtained without taking bubbles in the molten glass into the glass composition, and the glass viscosity can be adjusted to a viscosity suitable for molding. For this reason, preferably, the temperature for causing the molten glass to flow out is set in the range of 1,000 to 1,250° C. In the glass production process III, the pipe from which the clarified and homogenized molten glass is caused to flow out is also preferably provided with temperature adjustment means such as a heating apparatus so that the viscosity of the glass can be adjusted when it is caused to flow out.

When an optical glass is produced according to the glass production process III from the cullet raw material prepared according to the glass production process II, it is desirable to set the clarifying temperature in the glass production process III higher than the melting temperature for the glass raw material in the glass production process II, for improving the clarification effect. Further, it is also desirable to set the flowing-out temperature lower than the clarifying temperature in the glass production process III for improving the clarification effect and for decreasing or inhibiting volatilization on the high-temperature surface of the glass that has flowed out. When the volatilization on a high-temperature glass surface is decreased or inhibited, the occurrence of striae is reduced or inhibited, and optical properties such as a refractive index can be stabilized.

When an optical glass is produced according to the glass production process I or when an optical glass is produced according to a combination of the glass production process II with the glass production process III, it is preferred to control the density of bubbles in the glass by adjusting the amount of carbonate and the amount of sulfate to be introduced into a glass raw material, such that the density of bubbles having a diameter of 50 µm or less to be contained in the optical glass to be produced is 60 pieces/kg or less, preferably 50 pieces/kg or less, more preferably 40 pieces/kg or less, still preferably 30 pieces/kg or less, yet preferably 20 pieces/kg or less, further more preferably 15 pieces/kg or less, further still more preferably 10 pieces/kg or less, further yet more preferably 7 pieces/kg or less, further preferably 5 pieces/kg or less, most more preferably 0 piece/kg. The preferred ranges of the amount of carbonate and the amount of sulfate will be described later.

[On Optical Glass I]

The compositional range of the optical glass I will be explained in detail below.

The optical glass I is a glass composition that is vitrified and formed by heating a glass raw material in a state that carbonate and sulfate are co-present and that contains carbon and sulfur.

The amount, as $CO_2$, of carbon to be introduced into the glass raw material for obtaining an optical glass I having a mass a is preferably in the range of $0.2 \times 10^{-2} \times a$ to $50 \times 10^{-2} \times a$. That is, it is preferred to bring the above amount of carbon as $CO_2$ into the range of 0.2 to 50 mass % based on a composition of the optical glass I having a mass a.

In the optical glass $I_A$ to be described later, the amount, as $CO_2$, of carbon to be introduced into the glass raw material for obtaining an optical glass $I_A$ having a mass a is preferably brought into the range of $0.2 \times 10^{-2} \times a$ to $5 \times 10^{-2} \times a$, more preferably, into the range of $0.2 \times 10^{-2} \times a$ to $2 \times 10^{-2} \times a$, for improving the clarification effect. That is, the above amount of carbon as $CO_2$ based on a composition of the optical glass $I_A$ having a mass a is preferably in the range of 0.2 to 5 mass %, more preferably in the range of 0.2 to 2 mass %. When the amount of carbon as $CO_2$ based on a composition of the optical glass is adjusted to 0.2 mass % or more, the clarification effect can be further improved. However, when it exceeds 5 mass %, no further improvement in the clarification effect is made, but it causes the discharge amount of $CO_2$ gas to increase, so that the amount of carbon is limited to the above range.

In the optical glass $I_B$ to be described later, the amount, as $CO_2$, of carbon to be introduced into the glass raw material for obtaining an optical glass $I_B$ having a mass a is preferably adjusted to the range of $2 \times 10^{-2} \times a$ or more, more preferably, to $3 \times 10^{-2} \times a$ or more, still more preferably, to $4 \times 10^{-2} \times a$ or more, yet more preferably, to $5 \times 10^{-2} \times a$ or more, for improving the clarification effect. That is, the above amount of carbon as $CO_2$ based on a composition of the optical glass $I_B$ having a mass a is preferably adjusted to 2 mass % or more, more preferably, to 3 mass % or more, still more preferably, to 4 mass % or more, yet more preferably, to 5 mass % or more.

On the other hand, in the optical glass $I_B$, the amount of carbon to be introduced into the glass raw material for obtaining an optical glass $I_B$ having a mass a is preferably adjusted to $50 \times 10^{-2} \times a$ or less, more preferably, to $20 \times 10^{-2} \times a$ or less, still more preferably, to $15 \times 10^{-2} \times a$ or less, yet more preferably, to $10 \times 10^{-2} \times a$ or less. That is, the above amount of carbon as $CO_2$ to be introduced into the glass raw material for obtaining an optical glass $I_B$ having a mass a, based on the glass composition, is preferably adjusted to 50 mass % or less, more preferably, to 20 mass % or less, still more preferably, to 15 mass % or less, yet more preferably, to 10 mass % or less.

The carbonate that is preferably added to the glass raw material includes zinc carbonate, basic zinc carbonate, barium carbonate, strontium carbonate, calcium carbonate, magnesium carbonate and lanthanum carbonate. Any one of the above carbonates or a combination of them can be selected and added to the glass raw material while taking account of the amount of cationic components to be introduced into the glass.

When the optical glass I contains $Zn^{2+}$, zinc carbonate and basic zinc carbonate can be used. Since zinc carbonate exhibits the property of absorbing moisture, the measurement accuracy that $Zn^{2+}$ is required to have as a glass component is decreased due to a change of a weight caused by moisture absorption with time. As a result, the resultant optical glass I is caused to have a change in refractive index, so that it is desirable to keep it from absorbing moisture, that is, to store it in a dry atmosphere or to keep it sealed in a pressure-reduced state. Basic zinc carbonate releases water undesirable for clarification of glass when it is heated, so that it is desirable to use it in a small amount by taking account of a clarification property.

When the optical glass I contains at least one of $Ba^{2+}$, $Sr^{2+}$, $Ca^{2+}$ and $Mg^{2+}$, barium carbonate, strontium carbonate, calcium carbonate and magnesium carbonate can be used as ones corresponding to these cationic components. However, in a glass having a small total content or no content of alkaline earth metal components like the optical glass $I_A$-1 to be described later, the amount of carbonates of these alkaline earth metals to be used is limited.

In the optical glass I containing $La^{3+}$, lanthanum carbonate can be used. A preferred embodiment of the optical glass I contains $La^{3+}$ as will be described later. In such a glass, lanthanum carbonate can be used. When lanthanum carbonate is used in combination with sulfate, a remarkably excellent clarification property can be obtained, and it is a carbonate that can also inhibit the refractive index from varying.

When the optical glass $I_A$ containing $Li^+$ is produced, lithium carbonate can be used as carbonate in the glass raw material. In this case, the amount (based on a glass composition, mass %) of carbon as $CO_2$ contained in the glass raw material is value obtained by multiplying the amount (mass %) of $Li_2O$ introduced as lithium carbonate into the glass by 1.4728.

The amount of sulfur to be introduced into the glass raw material for obtaining the optical glass I having a mass a is preferably $0.05 \times 10^{-2} \times a$ or more (0.05 mass % or more based on a glass composition) as $SO_3$ for improving the clarifying activity, and it is preferably $10 \times 10^{-2} \times a$ or less (10 mass % or less based on a glass composition) as $SO_3$ for preventing the overflowing of a molten glass caused by adding an excess amount of sulfate and for inhibiting the intensification of coloring of the glass.

With regard to the optical glass $I_A$ and optical glass $I_B$ to be described later, the amount of sulfur to be introduced into the glass raw material each has preferred ranges. In the optical glass $I_A$, the above amount of sulfur as $SO_3$ is preferably $0.07 \times 10^{-2} \times a$ or more (0.07 mass % or more based on a glass composition), more preferably $6 \times 10^{-2} \times a$ or less (6 mass % or less based on a glass composition), still more preferably $5 \times 10^{-2} \times a$ or less (5 mass % or less based on a glass composition), yet more preferably $3 \times 10^{-2} \times a$ or less (3 mass % or less based on a glass composition), further more preferably $2 \times 10^{-2} \times a$ or less (2 mass % or less based on a glass composition), still further more preferably $1 \times 10^{-2} \times a$ or less (1 mass % or less based on a glass composition), yet further more preferably $0.5 \times 10^{-2} \times a$ or less (0.5 mass % or less based on a glass composition).

in the optical glass $I_B$, the above amount of sulfur as $SO_3$ is preferably $0.07 \times 10^{-2} \times a$ or more (0.05 mass % or more based on a glass composition), more preferably $0.1 \times 10^{-2} \times a$ or more (0.1 mass % or more based on a glass composition), still more preferably $0.2 \times 10^{-2} \times a$ or more (0.2 mass % or more based on a glass composition), yet more preferably $0.3 \times 10^{-2} \times a$ or more (0.3 mass % or more based on a glass composition), and it is more preferably $6 \times 10^{-2} \times a$ or less (6 mass % or less based on a glass composition), still more preferably $5 \times 10^{-2} \times a$ or less (5 mass % or less based on a glass composition), yet more preferably $3 \times 10^{-2} \times a$ or less (3 mass % or less based on a glass composition), further more preferably $2 \times 10^{-2} \times a$ or less (2 mass % or less based on a glass composition), still further more preferably $1 \times 10^{-2} \times a$ or less (1 mass % or less based on a glass composition), yet further more preferably $0.5 \times 10^{-2} \times a$ or less (0.5 mass % or less based on a glass composition).

The sulfate to be added to the glass raw material preferably includes zinc sulfate, barium sulfate, strontium sulfate, calcium sulfate and magnesium sulfate. Any one of the above sulfates or a combination of them can be selected and added to the glass raw material while taking account of the amount of cationic components to be introduced into the glass.

When the optical glass I contains $Zn^{2+}$, it is preferred i to use zinc sulfate which improves the clarification property and is easily available as a raw material.

When the optical glass I contains at least one of $Ba^{2+}$, $Sr^{2+}$, $Ca^{2+}$ and $Mg^{2+}$, barium sulfate, strontium sulfate, calcium sulfate and magnesium sulfate can be used as ones corresponding to these cationic components. However, in a glass having a small total content or no content of alkaline earth metal components like the optical glass $I_A$-1 to be described later, the amount of sulfates of these alkaline earth metals to be used is limited.

Carbonate and sulfate in the glass raw material are decomposed in the step of melting the glass raw material to generate $CO_x$ and $SO_x$. $CO_x$ and $SO_x$ are dissolved in the molten glass as dissolved gases or discharged out of the molten glass as gases. When the molten glass is temperature-increased to a clarifying temperature, $CO_x$ and $SO_x$ dissolved in the molten glass blow out in the molten glass since the solubility of the dissolved gases is decreased, and the clarification is promoted. Since the solubility of each of $CO_x$ and $SO_x$ at the clarifying temperature is not zero, $CO_x$ and $SO_x$ partly remain in the optical glass I. Therefore, the optical glass I contains carbon and sulfur although their contents are small.

The amount, as $CO_2$, of carbon contained in the optical glass I is larger than the amount of carbon contained in the optical glass A obtained by melting and molding without using carbonate, and is less than the amount of carbon contained in the glass raw material.

The amount, as $SO_3$, of sulfur contained in the optical glass I is larger than the amount of sulfur contained in the optical glass A obtained by melting and molding without using sulfate, and is less than the amount of sulfur contained in the glass raw material.

More specifically, the content of carbon as $CO_2$ is equivalent to, or smaller than, the solubility of $CO_2$ at the clarifying temperature for each optical glass, and the content of sulfur as $SO_3$ is equivalent to, or smaller than, the solubility of $SO_3$ at the clarifying temperature for each optical glass.

$B^{3+}$ is a network-forming component and is an essential component for maintaining glass stability. It decreases dispersion, improves glass meltability and also works to prevent a glass transition temperature from going up. When the content of $B^{3+}$ is less than 12%, it is difficult to maintain glass stability, and the glass is easily devitrified during the production of the glass. When it exceeds 65%, the refractive index is decreased. The content of $B^{3+}$ is therefore limited to 12 to 65%. The content of $B^{3+}$ is preferably in the range of 12 to 62 more preferably in the range of 12 to 60%.

$Si^{4+}$ is a network-forming component as well, and has effects on the maintaining of glass stability, the maintaining of a viscosity suitable for molding a molten glass and the improving of chemical durability. When the content thereof exceeds 20%, it is difficult to realize an intended refractive index and an Abbe's number, a liquidus temperature and a glass transition temperature are increased, and the meltability and devitrification resistance of the glass are deteriorated. The content of $Si^{4+}$ is therefore limited to 0 to 20%.

$Ge^{4+}$ is a network-forming component, and also works to increase a refractive index, so that it is a component that can increase a refractive index with maintaining the glass stability. Since, however, it is very expensive, the content thereof is limited to 0 to 6%. The content of $Ge^{4+}$ is preferably in the range of 0 to 5%, more preferably in the range of 0 to 3%, still more preferably in the range of 0 to 2%, yet more preferably in the range of 0 to 1%. Further, more preferably, no $Ge^{4+}$ is incorporated.

$La^{3+}$, $Gd^{3+}$, $Y^{3+}$, $Yb^{3+}$, $Sc^{3+}$ and $Lu^{3+}$ are components that impart high-refractivity low-dispersion properties. When the total content of $La^{3+}$, $Gd^{3+}$, $Y^{3+}$, $Yb^{3+}$, $Sc^{3+}$ and $Lu^{3+}$ is less than 15%, no desired high refractivity can be realized. When it exceeds 50%, the glass stability is decreased, the melting temperature for the glass is increased, the corrosiveness of the molten glass is intensified, a refractory material constituting a melting vessel, such as platinum or platinum alloy, is hence corroded, and platinum ion is dissolved in the glass to color the glass or constitutes a foreign matter to degrade the glass quality. When the melting temperature is increased, easily volatilizable components such as boric acid, etc., are volatilized from a molten glass, and these components are decreased in content, so that there is caused a problem that optical properties, in particular refractive index, vary with time. For getting around these problems, the total content of $La^{3+}$, $Gd^{3+}$, $Y^{3+}$, $Y^{3+}$, $Yb^{3+}$, $Sc^{3+}$ and $Lu^{2+}$ is limited to 15 to 50%.

Of $La^{3+}$, $Gd^{3+}$, $Y^{3+}$, $Yb^{3+}$, $Sc^{3+}$ and $Lu^{3+}$, $Sc^{3+}$ and $Lu^{3+}$ are expensive components, and an effect produced by their introduction is low. Preferably, therefore, $Sc^{3+}$ and $Lu^{3+}$ are not introduced, or the total content of $La^{3+}$, $Gd^{3+}$, $Y^{3+}$ and $Yb^{3+}$ is limited to 15 to 50%. Further, $Yb^{3+}$ is also an expensive component although it is not so expensive as $Sc^{3+}$ and $Lu^{3+}$, and an effect produced by its introduction is low. Preferably, therefore, $Yb^{3+}$ is not introduced, or the total content of $La^{3+}$, $Gd^{3+}$ and $Y^{3+}$ is limited to 15 to 50%.

Of $La^{3+}$, $Gd^{3+}$, $Y^{3+}$, $Yb^{3+}$, $Sc^{3+}$ and $Lu^{3+}$, $La^{3+}$ is a component that does not easily deteriorate the glass stability even when a relatively large amount thereof is introduced. Further, since $La^{3+}$ is a component that does not easily color the glass among high-refractivity-imparting components, the content of $La^{3+}$ is preferably adjusted to 9% or more. On the other hand, when the content thereof exceeds 40%, the glass stability is deteriorated, the melting temperature is increased, the corrosiveness of the molten glass is hence intensified, and the above disadvantages may be increasingly caused. Therefore, the content of $La^{3+}$ is preferably limited to 9 to 40%.

$Ta^{5+}$, $Zr^{4+}$, $Ti^{4+}$, $Nb^{5+}$, $W^{6+}$ and $Bi^{4+}$ not only work to increase a refractive index, but also work to increase dispersion. When $La^{3+}$, $Gd^{3+}$, $Y^{3+}$, $Yb^{3+}$, $Sc^{3+}$ and $Lu^{3+}$ alone are used to increase a refractive index, the glass stability is deteriorated, so that it is required to incorporate at least one of $Ta^{5+}$, $Zr^{4+}$, $Nb^{5+}$, $W^{6+}$ and $Bi^{4+}$. On the other hand, when $Ta^{5+}$, $Zr^{4+}$, $Ti^{4+}$, $Nb^{5+}$, $W^{6+}$ and $Bi^{4+}$ are introduced to excess, there is caused a problem that the glass stability is deteriorated, or that the dispersion becomes too large. For these reasons, the total content of $Ta^{5+}$, $Zr^{4+}$, $Ti^{4+}$, $Nb^{5+}$, $W^{6+}$ and $Bi^{4+}$ limited to 4 to 54%.

$Zn^{2+}$ works to improve the meltability and devitrification resistance of the glass and works to decrease the liquidus temperature and glass transition temperature, and it is a component effective for improving productivity and moldability of the glass and inhibiting the coloring of the glass. Further, it is a useful component for achieving high-refractivity low-dispersion properties as optical properties. When its content exceeds 24%, however, the refractive index is decreased or the glass is degraded in chemical durability, so that the content of $Zn^{2+}$ is limited to 0 to 35%. For more remarkably improving the meltability and clarification property of the glass, the content of $Zn^{2+}$ is preferably adjusted to 0.1% or more. The upper limit of the content of $Zn^{2+}$ is preferably 33%, more preferably 30%, still more preferably 28%, yet more preferably 26%, further more preferably 24%.

$Li^+$, $Na^+$ and $K^+$ are optional components that work to improve the meltability of a glass and to decrease glass transition temperature. When the total content of $Li^+$, $Na^+$ and $K^+$ exceeds 9%, it is difficult to realize a desired refractive index, and the chemical durability is also degraded. The total content of $Li^+$, $Na^+$ and $K^+$ is therefore limited to 0 to 9%. In addition, $Rb^+$ and $Cs^+$ are expensive components as alkali metals, and they scarcely produce an introduction effect as compared with $Li^+$, $Na^+$ and $K^+$. It is hence preferred to incorporate none of $Rb^+$ and $Cs^+$.

$Mg^{2+}$, $Ca^{2+}$, $Sr^{2+}$ and $Ba^{2+}$ work to improve the meltability of a glass and light transmittance in the visible light region. Further, when they are introduced into a glass in the form of carbonates and nitrates, they produce a bubble elimination effect. However, when the total content of $Mg^{2+}$, $Ca^{2+}$, $Sr^{2+}$ and $Ba^{2+}$ exceeds 15%, the liquidus temperature is increased, and the devitrification resistance is deteriorated. Besides these, the refractive index is also decreased, and the chemical durability is also deteriorated. The total content of $Mg^{2+}$, $Ca^{2+}$, $Sr^{2+}$ and $Ba^{2+}$ is hence limited to 0 to 15%. Of $Mg^{2+}$, $Ca^{2+}$, $Sr^{2+}$ and $Ba^{2+}$, $Ba^{2+}$ is the most advantageous component for increasing the refractive index. The content of $Ba^{2+}$ is therefore adjusted to 0 to 15%.

$Be^{2+}$ that is an alkaline earth metal is highly toxic, and $Ra^{2+}$ is a radioactive substance, so that is preferred to incorporate none of $Be^{2+}$ and $Ra^{2+}$.

The total content of $B^{3+}$, $Si^{4+}$, $Ge^{4+}$, $La^{3+}$, $Gd^{3+}$, $Y^{3+}$, $Yb^{3+}$, $Sc^{3+}$, $Lu^{3+}$, $Ta^{5+}$, $Zr^{4+}$, $Ti^{4+}$, $Nb^{5+}$, $W^{6+}$, $Zn^{2+}$, $Na^+$, $K^+$, $Mg^{2+}$, $Ca^{2+}$, $Sr^{2+}$ and $Ba^{2+}$ is adjusted to 99% or more. When other component than the above components is introduced in an amount of over 1%, it is difficult to maintain the glass stability under good conditions with maintaining a high refractive index. For imparting a high refractive index and excellent glass stability, the above total content is preferably adjusted to 99.2% or more, more preferably 99.5% or more, still more preferably 99.8%, yet more preferably 100%.

The optical glass I has realized high-refractivity low-dispersion optical properties with maintaining glass stability, and it is not required to incorporate expensive Hf. The content of $Hf^{4+}$ is preferably limited to the range of 0 to 4%, more preferably, to the range of 0 to 2%, still more preferably, to the range of 0 to 1%, yet more preferably, to the range of 0 to 0.5%. It is particularly preferred to incorporate no $Hf^{4+}$.

In the optical glass I, for reducing a load on environmental effects, it is desirable to introduce or incorporate none of As, Pb, Cd, Cr, U, Th and Te.

For obtaining a glass that is less colored, it is also desirable to incorporate none of Fe, Cu, Co, Nd, V and Ni.

The optical glass I is an oxide glass, and the proportion of $O^{2-}$ as an anionic component is 95 anionic % or more, preferably 97 anionic % or more, more preferably 98 anionic % or more, still more preferably 99 anionic % or more, yet more preferably 99.3 anionic % or more, further more preferably 99.5 anionic % or more, still further more preferably 99.7 anionic % or more, yet further more preferably 99.8 anionic % or more, even further more preferably 99.9 anionic % or more, particularly preferably 100 anionic % or more. Anionic components that are introduced other than $O^{2-}$ include $F^-$, $Cl^-$, $Br^-$, $I^-$, etc.

In the optical glass I, the total content of alkali metals, the total content of alkaline earth metals and the content of $Zn^{2+}$ are limited as described above, and the total amount of $La^{3+}$, $Gd^{3+}$, $Y^{3+}$, $Yb^{3+}$, $Sc^{3+}$, $Lu^{3+}$, $Ta^{5+}$, $Zr^{4+}$, $Ti^{4+}$, $Nb^{5+}$, $W^{6+}$ and $Bi^{4+}$ is large, so that the optical glass I has properties of having a high melting temperature or having a glass low viscosity suitable for clarification, as compared with optical glasses in general.

For these reasons, the optical glass I is a glass in which bubbles present in a molten glass do not easily float upward and bubbles are eliminated with difficulties, while there can be provided a lass production process excellent in the elimination of bubbles by melting the glass in a state where carbonate and sulfate are co-present, according to the glass production process of this invention. According to the glass production process of this invention, further, the clarification can be carried out sufficiently for a relatively short period of time, so that there can be prevented the coloring of the glass and the inclusion of a foreign matter caused by the corroding of a melting vessel made of platinum, etc., or a refractory material constituting a pipe for the flowing of the glass.

As is clear in FIGS. 1, 4 and 7, the improvement in clarification effect is small even when $SnO_2$ is added in a state where carbonate and sulfate are not co-present. The amount of $SnO_2$ to be added can be therefore rendered small or zero. Specifically, the amount of $SnO_2$ based on a glass composition is preferably adjusted to 0 to 2 mass %, more preferably 0 to 1 mass %. No $SnO_2$ can be added.

As is clear in FIGS. 1, 5 and 7, the improvement in clarification effect produced by adding $Sb_2O_3$ is small. And, the addition of $Sb_2O_3$ sometimes intensifies the coloring of the glass, so that it is desirable to render the amount of $Sb_2O_3$ small or zero. Specifically, the amount of $Sb_2O_3$ based on a glass composition is limited to 0 to 0.1 mass %, more preferably, to 0 to 0.05 mass %, still more preferably, to 0 to 0.04 mass %, yet more preferably, to 0 to 0.03 mass %, further more preferably, to 0 to 0.01 mass %, still further more preferably, to 0 to 0.008 mass %, and it is particularly preferred to incorporate no $Sb_2O_3$.

When an image-sensing optical system or a projector optical system is constituted from an optical element formed of a high-refractivity optical glass, the optical system can be made compact. Further, when a lens is formed of a high-refractivity optical glass, the absolute value of curvature radius of an optical-function surface can be increased when the lens has the constant power (reciprocal of focal length), so that the productivity of lenses can be improved even when the lenses are produced by polishing or produced by precision press-molding. From the above viewpoint, a high-refractivity optical glass is desirable, and in a preferred glass of the optical glass I, there can be obtained optical properties such as a refractive index nd of 1.78 or more and an Abbe's number vd of 46 or less.

The vessel for melting and vitrifying the glass raw material in the glass production process I and the glass production process II, the vessel for clarifying the molten glass and the vessel for homogenizing the clarified glass in the glass production process I and the glass production process III, the vessel for melting the cutlet raw material in the glass production process II, and devices and apparatuses with which a glass melt comes in contact, such as a pipe connecting the vessels, a pipe for causing a glass to flow out, a stirrer for stirring a molten glass, are preferably made of platinum or a platinum alloy from the viewpoint of heat resistance, the corrosion resistance to a glass melt and processability.

According to this invention, excellent clarification properties can be realized, and hence excellent elimination of bubbles can be achieved without increasing the melting time period or the clarifying time period or without increasing the melting temperature or the clarifying temperature. Therefore, even when at least one step of the melting and clarifying steps is carried out using a vessel made of platinum or a platinum alloy, there is no case where corroded platinum is dissolved in a glass to intensify the coloring of the glass, so that a high-quality optical glass can be obtained.

Preferred embodiments of the optical glass I will be explained below.

[Optical Glass $I_A$]

The optical glass I can be largely classified into an optical glass $I_A$ and an optical glass $I_B$. The optical glass $I_A$ is a glass that gives priority to the increasing of a refractive index, and the optical glass $I_B$ is a glass that gives priority to the decreasing of the glass transition temperature for improving precision press-moldability.

The optical glass $I_A$ will be explained below.

The optical glass $I_A$ is an oxide glass comprising, by cationic %, 12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 9% of $Zn^{2+}$,
0 to 5% of total of $Li^+$, $Na^+$ and $K^+$, and
0 to 15% of total of $Mg^{2+}$, $Ca^{2+}$, $Sr^{2+}$ and $Ba^{2+}$,
a total content of said cationic components in the oxide glass being 99 to 100%.

In the optical glass $I_A$, the upper limit of the content of $Zn^{2+}$ and the total content of $Li^+$, $Na^+$ and $K^+$ in the optical glass I are kept low and are adjusted to a proper compositional ranges suitable for obtaining a higher refractive index. The content of $B^{3+}$ is 12 to 65% like the optical glass I, while the upper limit of the content of $B^{3+}$ is preferably 62%, more preferably 60%.

In the optical glass $I_A$, the total content of $Li^+$, $Na^+$ and $K^+$ is limited to 0 to 5% for increasing the refractive index. For further increasing the refractive index, the total content of $Li^+$, $Na^+$ and $K^+$ is preferably limited to 0 to 3%, more preferably, to 0 to 3%, still more preferably 0 to 2%, yet more preferably, to 0 to 1%, further more preferably 0 to 0.5%, still further more preferably, to 0 to 0.4%. Particularly preferably, none of these alkali metals is incorporated.

The total content of $Mg^{2+}$, $Ca^{2+}$, $Sr^{2+}$ and $Ba^{2+}$ is adjusted to 0 to 15% for the same reasons as those in the optical glass I.

$La^{3+}$ is a component that can be incorporated in a relatively large amount without impairing the glass stability. For maintaining excellent glass stability and increasing the refractive index, content of $La^{3+}$ is preferably adjusted to 13% or more. When it exceeds 40%, however, the glass stability tends to decrease. The content of $La^{3+}$ is hence preferably limited to 13 to 40%, more preferably, to 15 to 33%. Further, when the content of $La^{3+}$ is brought into the above range, the chemical durability can be improved as well.

$Gd^{3+}$ is a component that works not only to increase the refractive index but also to improve the chemical durability. When the content of $Gd^{3+}$ exceeds 12%, the glass stability tends to be decreased. The content of $Gd^{3+}$ is hence preferably limited to the range of 0 to 12%, more preferably, to the range of 0 to 10%, still more preferably, to 0 to 9%.

$Y^{3+}$ is also a component that works not only to increase the refractive index but also to improve the chemical durability. When the content of $Y^{3+}$ exceeds 10%, the glass stability tends to be decreased. The content of $Y^{3+}$ is hence preferably limited to the range of 0 to 10%, more preferably, to the range of 0 to 8%, still more preferably, to 0 to 7%.

$Yb^{3+}$ is also a component that works not only to increase the refractive index but also to improve the chemical durability. When the content of $Yb^{3+}$ exceeds 5%, the glass stability tends to be decreased. The content of $Yb^{3+}$ is hence preferably limited to the range of 0 to 5%, more preferably, to the range of 0 to 3%, still more preferably, to 0 to 2%.

$Sc^{3+}$ is also a component that works not only to increase the refractive index but also to improve the chemical durability. However, it is an expensive component and its introduction effect is not superior as compared with those of the above components. The content of $Sc^{3+}$ is hence preferably limited to 0 to 3%, more preferably, to 0 to 1%, yet more preferably, to 0 to 0.5%. Further, more preferably, $Sc^{3+}$ is not incorporated.

$Lu^{3+}$ is also a component that works not only to increase the refractive index but also to improve the chemical durability. However, it is an expensive component and its introduction effect is not superior as compared with those of the above components. The content of $Lu^{3+}$ is hence preferably limited to 0 to 3%, more preferably, to 0 to 1%, yet more preferably, to 0 to 0.5%. Further, more preferably, $Lu^{3+}$ is not incorporated.

$Ta^{5+}$, $Zr^{4+}$, $Ti^{4+}$, $Nb^{5+}$, $W^{6+}$ and $Bi^{3+}$ work to increase the refractive index as well, but also work to intensify the dispersion as compared with $La^{3+}$, $Y^{3+}$, $Sc^{3+}$ and $Lu^{3+}$. Further, when at least one component of $La^{3+}$, $Gd^{3+}$, $Y^{3+}$, $Sc^{3+}$ and $Lu^{3+}$ and at least one component of $Ta^{5+}$, $Zr^{4+}$, $Ti^{4+}$, $Nb^{5+}$, $W^{6+}$ and $Bi^{3+}$ are caused to be co-present, the glass stability can be improved.

$Ta^{5+}$ is component that works not only to increase the refractive index but also to improve the chemical durability. When it is incorporated in an amount of over 15%, the glass stability tends to decrease. The content of $Ta^{5+}$ is hence preferably limited to 0 to 15%, more preferably, to 0 to 13%, still more preferably 0 to 12%.

$Zr^{4+}$ is also a component that works not only to increase the refractive index but also to improve the chemical durability. When it is incorporated in an amount of over 12%, the glass stability tends to decrease. The content of $Zr^{4+}$ is hence preferably limited to 0 to 12%, more preferably, to 0 to 10%, still more preferably 0 to 9%.

$Ti^{4+}$ is also a component that works not only to increase the refractive index but also to improve the chemical durability. When it is incorporated in an amount of over 44%, the glass stability tends to decrease, and the coloring of the glass tends to be intensified. The content of $Ti^{4+}$ is hence preferably limited to 0 to 44%, more preferably, to 0 to 42%, still more preferably 0 to 40%. The clarification effect produced by this invention is remarkably excellent over the clarification effect produced by adding tin oxide as already described. In particular, there are some glasses containing $Ti^{4+}$ which are not improved in clarification property by adding tin oxide, while excellent clarification properties can be attained for glasses containing $Ti^{4+}$ according to this invention. From the above viewpoint, the content of $Ti^{4+}$ in the above range is preferably in the range of 0.5% or more, more preferably in the range of 1% or more, still more preferably in the range of 2% or more, yet more preferably in the range of 3% or more.

$Nb^{5+}$ is also a component that works not only to increase the refractive index but also to improve the chemical durability. When it is incorporated in an amount of over 16%, the glass stability tends to decrease, so that the content of $Nb^5$ is preferably 0 to 16%, more preferably 0 to 14%, still more preferably 0 to 13%.

$W^{6+}$ is also a component that works not only to increase the refractive index but also to improve the chemical durability. When it is incorporated in an amount of over 7%, not only the glass stability tends to decrease, but also the coloring of the glass is intensified, so that the content of $W^{6+}$ is preferably 0 to 7%, more preferably 0 to 5%, still more preferably 0 to 3%, yet more preferably 0 to 2%, further more preferably, 0 to 1%.

$Bi^{3+}$ is also a component that works not only to increase the refractive index but also to improve the chemical durability. When it is incorporated in an amount of over 7%, not only the glass stability tends to decrease, but also the coloring of the glass is intensified, so that the content of $Bi^{3+}$ is preferably 0 to 7%, more preferably 0 to 5%, still more preferably 0 to 3%, yet more preferably 0 to 1%.

The optical glass $I_A$ can be largely classified into a glass having an $Mg^{2+}$, $Ca^{2+}$, $Sr^{2+}$ and $Ba^{2+}$ total content of 7% or less and a glass having the above total content of over 7%, i.e., an optical glass $I_A$-1 and an optical glass $I_A$-2 having the above total content of over 7%.

In the optical glass $I_A$, the melting temperature in the glass production process I and the glass production process III is preferably in the range of 1,200 to 1,480° C., more preferably in the range of 1,230 to 1,450° C., still more preferably in the range of 1,240 to 1,350° C., the clarifying temperature is preferably in the range of 1,200 to 1,500° C., more preferably in the range of 1,210 to 1,480° C., and the flowing-out temperature is preferably in the range of 1,050 to 1,250° C., more preferably in the range of 1,100 to 1,250° C., still more preferably in the range of 1,160 to 1,250° C.

In the optical glass $I_A$, the temperature for melting the unvitrified raw material is preferably in the range of 1,200 to 1,480° C., more preferably in the range of 1,230 to 1,450° C., still more preferably in the range of 1,250 to 1,350° C.

[Optical glass $I_A$-1]

In the optical glass $I_A$-1, the total content of $Mg^{2+}$, $Ca^{2+}$, $Sr^{2+}$ and $Ba^{2+}$ is 0 to 7%, and preferably, the content of $Ba^{2+}$ is 0 to 7%. That is, the optical glass $I_A$-1 is an oxide glass comprising, by cationic %, 12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 9% of $Zn^{2+}$,
0 to 5% of total of $Li^+$, $Na^+$ and $K^+$, and
0 to 7% of total of $Mg^{2+}$, $Ca^{2+}$, $Sr^{2+}$ and $Ba^{2+}$,
wherein the total content of the said total cationic components is 99 to 100%.

The optical glass $I_A$-1 is suitable for attaining higher refractivity in a region of high refractivity and relatively low dispersion, e.g., a range of Abbe's number vd of 28 or more.

The reasons for imposing limitations on compositional ranges in the optical glass $I_A$-1 will be explained below.

The content of $B^{3+}$ is limited to 12 to 65% for the same reasons as those in the optical glass I. The upper limit of the content of $B^{3+}$ is preferably 62%, more preferably 60%. When it is intended to increase the refractive index while maintaining a low-dispersion property, the content of $B^{3+}$ is preferably adjusted to 20 to 60%, more preferably, to 25 to 36%, still more preferably, to 29 to 36%, yet more preferably, to 30 to 36%. When priority is given to a higher refractive index rather than a lower dispersion, the content of $B^{3+}$ is preferably adjusted to 12 to 35%, more preferably, to 20 to 35%, still more preferably, to 20 to 30%, yet more preferably 21 to 28%.

The content of $Si^{4+}$ is limited to 0 to 20% for the same reason as those in the optical glass I. The content of $Si^{4+}$ is preferably in the range of 6 to 16%. When it is intended to increase the refractive index while maintaining a low-dispersion property, the content of $Si^{4+}$ is preferably adjusted to 8 to 14%. When priority is given to a far higher refractivity rather than a lower dispersion, the content of $Si^{4+}$ is preferably adjusted to 6 to 11%.

The total content of $La^{3+}$, $Gd^{3+}$, $Y^{3+}$, $Yb^{3+}$, $Sc^{3+}$ and $Lu^{3+}$ is preferably limited to 15 to 50%, more preferably, to 15 to 40%, still more preferably, to 20 to 40%, yet more preferably, to 30 to 40% for the same reasons as those in the optical glass I. When it is intended to increase the refractive index while maintaining the low-dispersion property, the total content of $La^{3+}$, $Gd^{3+}$, $Y^{3+}$, $Yb^{3+}$, $Sc^{3+}$ and $Lu^{3+}$ is preferably adjusted to 31 to 36%. When priority is given to a higher refractive index rather than a lower dispersion, the above total content is preferably adjusted to 27 to 40%, more preferably, to 27 to 39%, still more preferably, 30 to 39%, yet more preferably, to 34 to 39%.

$La^{3+}$ is a component that works to increase the refractive index without increasing the dispersion and that permits the maintenance of glass stability even when it is incorporated in a relatively large amount, so that the content of $La^{3+}$ is preferably adjusted to 13 to 40%, more preferably, to 15 to 33%. When it is intended to increase the refractive index while maintaining the low-dispersion property, the content of $La^{3+}$ is preferably adjusted to 20 to 30%. When priority is given to far higher refractive index rather than a lower dispersion, the content of $La^{3+}$ is preferably adjusted to 15 to 32%, more preferably, to 23 to 32%, still more preferably, 27 to 32%.

The total content of $Ta^{5+}$, $Zr^{4+}$, $Ti^{4+}$, $Nb^{5+}$, $W^{6+}$ and $Bi^{3+}$ is limited to 4 to 40% for the same reasons as those in the optical glass I. The total content of $Ta^{5+}$, $Zr^{4+}$, $Ti^{4+}$, $Nb^{5+}$, $W^{6+}$ and $Bi^{3+}$ is preferably in the range of 8 to 40%, more preferably in the range of 8 to 30%. When it is intended to increase the refractive index while maintaining the low-dispersion property, the total content of $Ta^{5+}$, $Zr^{4+}$, $Ti^{4+}$, $Nb^{5+}$, $W^{6+}$ and $Bi^{3+}$ is preferably adjusted to 10 to 20%, more preferably, to 14 to 19%. When priority is given to a higher refractive index rather than a lower dispersion, the total content of $Ta^{5+}$, $Zr^{4+}$, $Ti^{4+}$, $Nb^{5+}$, $W^{6+}$ and $Bi^{3+}$ is preferably adjusted to 10 to 30%, more preferably, to 14 to 30%, still more preferably, to 20 to 30%, yet more preferably, to 22 to 29%, further more preferably, to 24 to 29%.

$Zn^{2+}$ works to improve the glass meltability and to decrease the glass transition temperature, while the refractive index is decreased when it is introduced to excess. In the optical glass $I_A$-1 that gives priority to the higher refractivity rather than the decreasing of the glass transition temperature, therefore, the content thereof is limited to 0.1 to 9%, more preferably, to 1 to 9%. When it is intended to increase the refractive index while maintaining the low dispersion property, the content of $Zn^{2+}$ is is preferably limited to 1 to 8%, more preferably, to 3 to 8%. When priority is given to a far higher refractive index rather than a lower dispersion, the content of $Zn^{2+}$ is preferably limited to 0.5 to 8%, more preferably, to 0.5 to 6%, still more preferably, to 0.5 to 4%.

The total content of $Li^+$, $Na^+$ and $K^+$ and its preferred content ranges are similar to those in the optical glass $I_A$.

$Mg^{2+}$, $Ca^{2+}$, $Sr^{2+}$ and $Ba^{2+}$ work to improve the glass meltability and to decrease the glass transition temperature, while the glass stability is degraded when they are incorporated to excess. The optical glass $I_A$-1 is desirable as a glass that can be increased in refractive index while maintaining the low-dispersion property. In a high-refractivity glass, however, it tends to be difficult to maintain the glass stability well when the high-refractivity glass is imparted with a lower dispersion. In the optical glass $I_A$-1 that is required to have the low-dispersion property, therefore, the total content of $Mg^{2+}$, $Ca^{2+}$, $Sr^{2+}$ and $Ba^{2+}$ work is limited to 0 to 7%. The total content of $Mg^{2+}$, $Ca^{2+}$, $Sr^{2+}$ and $Ba^{2+}$ is preferably in the range of 0 to 5%, more preferably in the range of 0 to 3%, still more preferably in the range of 0 to 1%, yet more preferably zero. Of $Mg^{2+}$, $Ca^{2+}$, $Sr^{2+}$ and $Ba^{2+}$, it is $Ba^{2+}$ that has the highest effect on the imparting with the higher refractive index. The content of $Ba^{2+}$ is hence preferably adjusted to the range of 0 to 7%, more preferably, to the range of 0 to 5%, still more preferably, to the range of 0 to 3%, yet more preferably, to the range of 0 to 1%, further more preferably, to zero.

In the optical glass $I_A$-1, the above optical glass that is suitable in particular for increasing the refractive index while maintaining the low-dispersion property (to be referred to as "optical glass $I_A$-1-a" hereinafter) is an oxide glass comprising, by cationic %, 20 to 60% of $B^{3+}$,
8 to 14% of $Si^{4+}$,
0 to 1% of $Ge^{4+}$,
31 to 36% of total of $La^{3+}$, $Gd^{3+}$, $Y^{3+}$, $Yb^{3+}$, $Sc^{3+}$ and $Lu^{3+}$,
14 to 19% of total of $Ta^{5+}$, $Zr^{4+}$, $Ti^{4+}$, $Nb^{5+}$, $W^{6+}$ and $Bi^{3+}$,
3 to 8% of $Zn^{2+}$,
0 to 1% of total of $Li^+$, $Na^+$ and $K^+$, and
0 to 1% of total of $Mg^{2+}$, $Ca^{2+}$, $Sr^{2+}$ and $Ba^{2+}$,
wherein the total content of the said total cationic components is 99 to 100%.

In the above compositional ranges, a glass containing none of $Ge^{4+}$, $Yb^{3+}Sc^{3+}$, $Lu^{3+}$, $Li^+$, $Na^+$, $K^+$, $Mg^{2+}$, $Ca^{2+}$, $Sr^{2+}$ and $Ba^{2+}$ is preferred. In the above compositional ranges, further, the content of $B^{3+}$ is preferably in the range of 25 to 36%, more preferably in the range of 29 to 36%, still more preferably in the range of 30 to 36%, yet more preferably in the range of 33 to 36%. Further, the content of $La^{3+}$ is preferably in the range of 23 to 28%.

In the optical glass $I_A$-1-a, the melting temperature in the glass production process I and the glass production process III is preferably in the range of 1,270° C. to 1,320° C., the clarifying temperature is preferably in the range of 1,300 to 1,380° C., and the flowing-out temperature is preferably in the range of 1,160 to 1,190° C. In the glass production process II, further, the melting temperature for the vitrified raw material is preferably in the range of 1,270 to 1,320° C.

In the optical glass $I_A$-1-a, the refractive index nd is preferably 1.89 to 2.0. A higher refractive index serves to moderate the curve of a lens surface (to increase the absolute value of a curvature radius) when the lens has a constant focal length, so that there can be produced an effect that the production of lenses is made easy or that the correction of an aberration is made easy. Further, when a plurality of lenses are combined to constitute an image-sensing optical system or a projector optical system, the optical system can be made compact. Further, when an optical path is bent with a prism for decreasing an optical path length in optical systems such as an image-sensing optical system or a projector optical system, a higher refractive index of a glass constituting the prism is effective for decreasing the optical path length. Further, the angle of view in an image-sensing system can be increased. For these reasons, the lower limit of the refractive index nd is determined as described above. On the other hand, when the refractive index is increased to excess, the glass stability is degraded, and the production of a glass tends to be difficult, so that the upper limit of the refractive index nd is determined as described above. The lower limit of the refractive index nd is preferably 1.892, more preferably 1.894, still more preferably 1.895, yet more preferably 1.90. The upper limit thereof is preferably 1.98, more preferably 1.95, still more preferably 1.94, yet more preferably 1.93.

In the optical glass $I_A$-1-a, the Abbe's number vd is preferably 32 to 38. When a lens formed of the optical glass $I_A$-1-a and a lens formed of a high-refractivity high-dispersion glass is combined, there can be obtained a compact chromatic aberration-correcting optical system. In such a chromatic aberration-correcting system, a larger difference between the Abbe's number of the optical glass $I_A$-1-a and the Abbe's number of the high-refractivity high-dispersion glass is advantageous for realizing the good correction of chromatic aberration in a compact system. For these reasons, the lower limit of the Abbe's number vd is determined to be the above value. On the other hand, when it is intended to attain a lower dispersion to excess while maintaining a high refractive index, the glass stability and the molten glass moldability are decreased, and the production of a glass is made difficult. Therefore, the upper limit of the Abbe's number vd is determined to be the above value. The lower limit of the Abbe's number vd is preferably 32.5, more preferably 33.0, still more preferably 33.5, yet more preferably 34.0, further more preferably 34.5. The upper limit of the Abbe's number vd is more preferably 37.9, still more preferably 37.8, yet more preferably 37.7.

Further, a glass having a small Abbe's number vd, i.e., a glass having a high dispersion is suitable for increasing the refractive index while maintaining the stability and the viscosity when a molten glass is molded. However, even when it is intended to attain higher-refractivity lower-dispersion properties within the above optical property ranges, the glass stability and the moldability of a molten glass can be maintained, so that there can realized particularly useful optical properties in optical designing. From the above viewpoint, an optical glass having optical properties that satisfy the following expression (1) is preferred, an optical glass having optical properties that satisfy the following expression (2) is more preferred, an optical glass having optical properties that satisfy the following expression (3) is still preferred, an optical glass having optical properties that satisfy the following expression (4) is yet more preferred, an optical glass having optical properties that satisfy the following expression (5) is further more preferred, and an optical glass having optical properties that satisfy the following expression (6) is still further more preferred.

$$nd \geq 2.54 - 0.02 \times vd \quad (1)$$

$$nd \geq 2.55 - 0.02 \times vd \quad (2)$$

$$nd \geq 2.56 - 0.02 \times vd \quad (3)$$

$$nd \geq 2.57 - 0.02 \times vd \quad (4)$$

$$nd \geq 2.58 - 0.02 \times vd \quad (5)$$

$$nd \geq 2.59 - 0.02 \times vd \quad (6)$$

When ranges determined by the expressions (1) to (6) and preferred ranges of the refractive index nd are combined, in the range of this invention, a range determined by $$nd \geq 2.54 - 0.02 \times vd \text{ (in which } vd > 32.5\text{) and}$$

$$nd \geq 1.89 \ (vd \leq 32.5)$$

is preferred, a range determined by $$nd \geq 2.55 - 0.02 \times vd \text{ (in which } vd > 33.0\text{) and}$$

$$nd \geq 1.89 \ (vd \leq 33.0)$$

is more preferred, a range determined by $$nd \geq 2.56 - 0.02 \times vd \text{ (in which } vd > 33.5\text{) and}$$

$$nd \geq 1.89 \ (vd \leq 33.5)$$

is still more preferred, a range determined by $nd \geq 2.57-0.02 \times vd$ (in which $vd>34.0$) and $nd \geq 1.89$ ($vd \leq 34.0$)

is yet more preferred, a range determined by $nd \geq 2.58-0.02 \times vd$ (in which $vd>34.5$) and $nd \geq 1.89$ ($vd \leq 34.5$)

is further more preferred, and a range determined by $nd \geq 2.59-0.02 \times vd$ (in which $vd>35.0$) and $nd \geq 1.89$ ($vd \leq 35.0$)

is still further more preferred,

The above examples show ranges where the refractive index nd is 1.89 or more and the expressions (1) to (6) are satisfied, while ranges where the refractive index nd is 1.892 or more and the expressions (1) to (6) are satisfied, ranges where the refractive index nd is 1.894 or more and the expressions (1) to (6) are satisfied, ranges where the refractive index nd is 1.895 or more and the expressions (1) to (6) are satisfied, and ranges where the refractive index nd is 1.90 or more and the expressions (1) to (6) are satisfied can be also similarly defined.

For realizing far excellent glass stability, an optical glass having optical properties that satisfy the following expression (7) is preferred, an optical glass having optical properties that satisfy the following expression (8) is more preferred, and an optical glass having optical properties that satisfy the following expression (9) is still more preferred.

$nd \leq 2.69-0.02 \times vd$ (7)

$nd \leq 2.68-0.02 \times vd$ (8)

$nd \leq 2.67-0.02 \times vd$ (9)

When the ranges determined by the expressions (7) to (9) and the preferred upper limits of the refractive index nd are combined, in the rage of this invention, a range determined by $nd \leq 2.69-0.02 \times vd$ (in which $vd>34.5$) and $nd \leq 2.0$ ($vd \leq 34.5$)

is preferred, a range determined by $nd \leq 2.68-0.02 \times vd$ (in which $vd>34.0$) and $nd \leq 2.0$ ($vd \leq 34.0$)

is more preferred, and a range determined by $nd \leq 2.67-0.02 \times vd$ (in which $vd>33.5$) and $nd \leq 2.0$ ($vd \leq 33.5$)

is still more preferred.

The above examples show ranges where the refractive index nd is 2.0 or less and the expressions (7) to (9) are satisfied, while ranges where the refractive index nd is 1.98 or less and the expressions (7) to (9) are satisfied, ranges where the refractive index nd is 1.95 or less and the expressions (7) to (9) are satisfied, ranges where the refractive index nd is 1.96 or less and the expressions (7) to (9) are satisfied, and ranges where the refractive index nd is 1.94 or less and the expressions (7) to (9) are satisfied can be also similarly defined.

(Coloring of Glass)

The optical glass $I_4$-1-a has a coloring degree $\lambda 70$ of 430 nm or less. The coloring degree $\lambda 70$ corresponds to a wavelength at which a 10±0.1 mm thick glass having optically polished two opposed surfaces in parallel with each other exhibits a transmittance of 70% when measured for spectral transmittances in a wavelength region of 280 nm to 700 nm. The above spectral transmittance or transmittance is value represented by $I_{out}/II_n$ in which $II_n$ is an intensity of light that is caused to enter the above surface of the glass at right angles and $I_{out}$ is an intensity of light that is transmitted through the glass and comes out from the other surface, and it is a transmittance including a surface reflection loss on the above surface of the glass.

The surface reflection loss increases with an increase in a refractive index. Therefore, a high-refractivity glass having a small $\lambda 70$ means that the coloring of the glass itself is remarkably small. When $\lambda 70$ is adjusted to 430 nm or less, there can be provided an optical element for constituting an image-sensing optical system or projector optical system excellent in color balance. The image-sensing optical system or projector optical system uses a plurality of lenses for correcting various aberrations. When lenses formed of colored glass are used, therefore, there is a problem that the amount of transmitted light in the entire optical system is decreased. In particular, an interchangeable lens of a single-lens reflex camera has a large thickness due to its large aperture, and when a colored lens is used, the amount of transmitted light is greatly decreased. When a lens is made from the optical glass of this invention, the amount of transmitted light can be fully secured as a single lens or the entire optical system since it is a high-refractivity low-dispersion glass but has remarkably small coloring. Further, owing to the small coloring and the high-refractivity low-dispersion properties, the image-sensing optical system and the projector optical system can be also made compact. For these reasons, the optical glass I is suitable as an optical element material for constituting an image-sensing optical system and an projector optical system, and in particular suitable as a material for an optical element for constituting an interchangeable lens for a single-lens reflex camera.

For complying with these demands, an optical glass having $\lambda 70$ in the above range is required. In the optical glass of this invention, further, the coloring degree $\lambda 70$ is preferably in the range of 425 nm or less, more preferably in the range of 420 nm or less, still more preferably in the range of 415 nm or less, yet more preferably in the range of 410 nm or less, further more preferably in the range of 405 nm or less. The lower limit of $\lambda 70$ is determined by itself depending upon glass properties such as a refractive index and a composition.

The coloring degree other than $\lambda 70$ also includes $\lambda 80$ and $\lambda 5$. $\lambda 80$ is a wavelength at which a transmittance of 80% is exhibited, and is a wavelength at which a transmittance of 5% is exhibited.

(Viscosity of Glass at Liquidus Temperature)

For preventing the devitrification when a molten glass of a high-refractivity glass, in particular a high-refractivity low-dispersion glass is molded, generally, the temperature for causing the molten glass to flow out and molding the same is set at a high temperature. Therefore, the viscosity during flowing out and molding is very low, and it is difficult to produce a high-quality glass highly productively.

For example, when the flowing-out temperature of a glass is high, a specific easily volatile component is volatilized from the glass surface having a high temperature, to alter the glass surface. As a result, an optically inhomogeneous part called striae is formed. Further, when the viscosity during flowing-out and molding is low, a surface of a glass that flows out is wrapped up inside, and striae are formed inside the glass. Further, when the temperature during flowing-out is high, a mold in contact with the glass having a high temperature is thermally deteriorated and easily worn out.

When the viscosity of a high-refractivity low-dispersion glass at a liquidus temperature can be secured, a molten glass can be improved in moldability, and there can be highly productively provided a high-quality glass. Further, the inhibition of the liquidus temperature from increasing advantageously serves to improve the productivity of a high-quality glass.

For these reasons, the optical glass $I_A$-1-a is preferably an optical glass having a viscosity of 1 dPa·s or more at a liquidus temperature. When the above viscosity property is imparted to a high-refractivity low-dispersion glass, a molten glass thereof can be remarkably improved in moldability. For further improving the above moldability, the viscosity at a liquidus temperature is preferably adjusted to 1.2 dPa·s or more, more preferably, to 1.4 dPa·s or more, still more preferably, to 1.6 dPa·s or more, yet more preferably, to 2.0 dPa·s or more, further more preferably, to 2.5 dPa·s or more. The upper limit of the viscosity at a liquidus temperature is determined by itself depending upon the above glass compositional ranges, while it can be 30 dPa·s or less as a reference target.

Further, from the above viewpoint, the liquidus temperature of the optical glass $I_A$-1-a is adjusted to 1,300° C. or lower, more preferably, to 1,280° C. or lower, still more preferably, to 1,250° C. or lower. The lower limit of the liquidus temperature is determined by itself depending upon glass compositions, and it can be 1,000° C. or higher as a reference target.

(Glass Transition Temperature)

In the optical glass $I_A$-1-a, a plurality of high-refractivity-imparting components are introduced in a proper balance, such that the content of a high-refractivity-imparting component in particular is not especially large. Further, ZnO is introduced as an essential component, so that the glass transition temperature can be kept low for a high-refractivity low-dispersion glass.

In the optical glass $I_A$-1-a, the glass transition temperature is preferably in the range of 710° C. or lower, more preferably in the range of 700° C. or lower, still more preferably in the range of 695° C. or lower. When the glass transition temperature is kept low, the annealing temperature for the glass can be kept from increasing, and the thermal deterioration and wearing out of an annealing apparatus can be inhibited. Further, since the heating temperature when the glass is re-heated and softened for press-molding can be also kept low, the thermal deterioration and wearing out of a press-molding apparatus including a press mold, etc., can be suppressed. An annealing furnace, an apparatus for moving a glass in the annealing furnace and a press-molding apparatus are made from stainless steel in many cases. Stainless steel has a deformation temperature around 700° C., and the glass transition temperature is limited to the above range, in particular to 700° C. or lower, preferably to 695° C. or lower, so that the deformation of stainless steel in each step above can be prevented.

The lower limit of the glass transition temperature is limited by itself depending upon glass compositions, and it can be 650° C. or higher as a reference target.

(Devitrification Resistance During Re-Heating)

Figure 8:
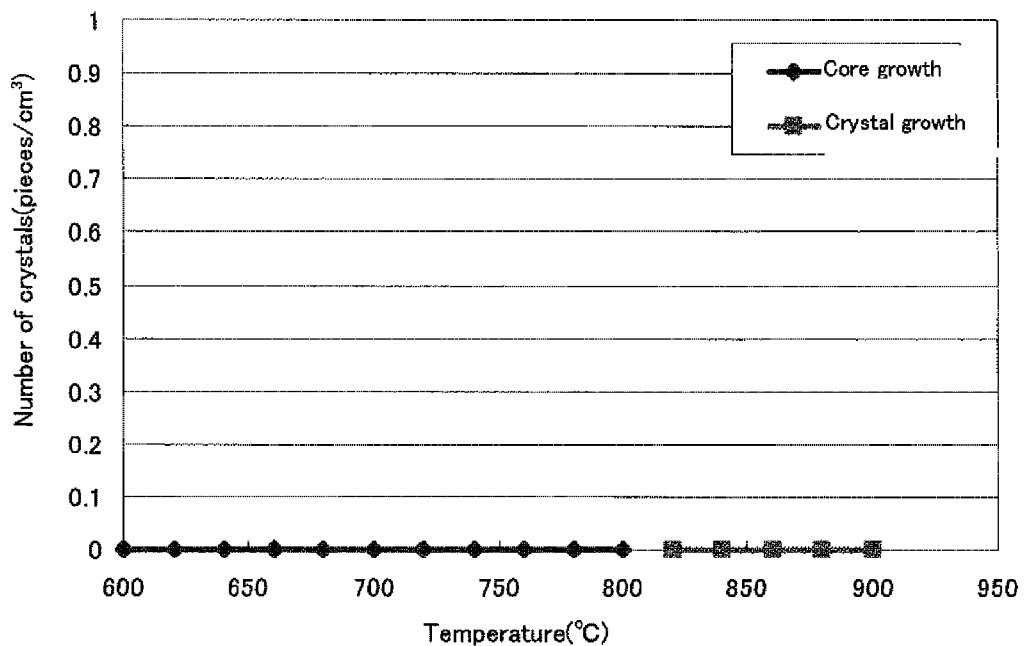
FIG. 8 shows the relationship between the temperatures of primary heat-treatment and secondary heat treatment (re-heating) of a glass obtained in Example 1 and a number density of crystals precipitated inside the glass.

The optical glass $I_A$-1-a is excellent in devitrification resistance when the glass is re-heated and molded. In a preferred embodiment of the optical glass-1-a, after a glass sample is held at 600° C.-800° C. for 1.0 minutes (primary heat treatment), then temperature-increased to 820° C.-900° C. and held at this temperature for 10 minutes (secondary heat treatment), there is recognized no precipitation of a crystal inside the glass. FIG. 8 shows a relationship between the temperatures for the primary heat treatment and secondary heat treatment of a glass obtained in Example 1 to be described later and the number density of crystal that precipitated inside the glass. In FIG. 8, it is seen that the glass has a very low number density of crystal during re-heating and is remarkably excellent in devitrification resistance. When the above test is carried out, a glass sample is preferably that which is obtained by cutting and polishing, and for example, a sample having a size of 15×15×15 mm can be used. It can be analyzed by magnification-observing an inside of a glass with an optical microscope of 100 magnifications whether or not a crystal is precipitated.

Figure 9:
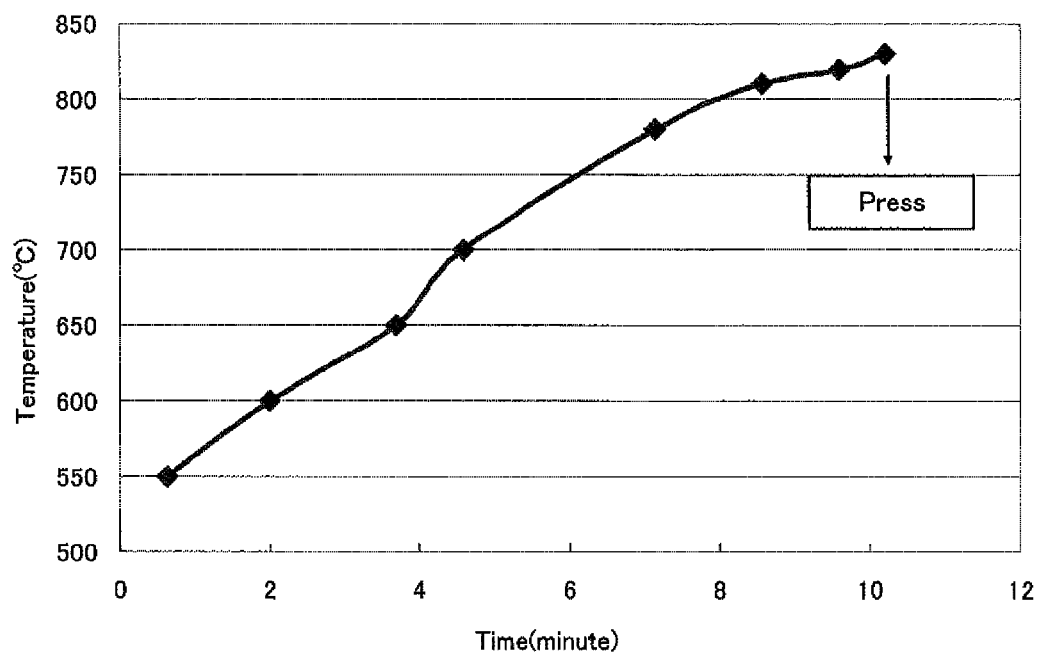
FIG. 9 shows a heating schedule when a glass sample that is cut and barrel-polished is re-heated and press-molded.

Further, when a glass sample (sample weight=6.05 g) obtained by cutting and barrel-polishing was re-heated and press-molded, for example, according to a heating schedule shown in FIG. 9, there was recognized no precipitation of a crystal inside the glass press-molded.

As described above, the optical glass of this invention is excellent in devitrification resistance, it is suitable as a material for a press-molding glass material from which a high-quality press-molded article can be produced.

<Optical Glass $I_A$-1-b>

In the optical glass $I_A$-1, the above optical glass that is suitable in particular for increasing the refractive index (to be referred to as "optical glass $I_A$-1-b" hereinafter) is an oxide glass comprising, by cationic, 12 to 35% of $B^{3+}$,
6 to 11% of $Si^{4+}$,
0 to 1% of $Ge^{4+}$,
27 to 40% of total of $La^{3+}$, $Gd^{3+}$, $Y^{3+}$, $Yb^{3+}$, $Sc^{3+}$ and $Lu^{3+}$,
10 to 30% of total of $Ta^{5+}$, $Zr^{4+}$, $Ti^{4+}$, $Nb^{5+}$, $W^{6+}$ and $Bi^{3+}$,
1.5 to 8% of $Zn^{2+}$,
0 to 1% of total of $Li^+$, $Na^+$ and $K^+$, and
0 to 5% of total of $Mg^{2+}$, $Ca^{2+}$, $Sr^{2+}$ and $Ba^{2+}$, wherein the total content of the said total cationic components is 99 to 100%.

In the above compositional ranges, a glass containing none of $Ge^{4+}$, $Yb^{3+}$, $Sc^{3+}$, $Lu^{3+}$, $Li^+$, $Na^+$, $K^+$, $Mg^{2+}$, $Mg^{2+}$, $Ca^{2+}$, $Sr^{+2}$ and $Ba^{2+}$ is preferred.

In the optical glass $I_A$-1-b, the melting temperature in the glass production process I and the glass production process III is preferably in the range of 1,240° C. to 1,300° C., the clarifying temperature is preferably in the range of 1,320 to 1,400° C., and the flowing-out temperature is preferably in the range of 1,175 to 1,205° C. In the glass production process II, further, the melting temperature for the unvitrified raw material is preferably in the range of 1,240 to 1,300° C.

In the optical glass $I_A$-1-b, the refractive index nd is preferably in the range of 1.92 to 2.2. The lower limit of the refractive index nd is more preferably 1.930, still more preferably 1.935, yet more preferably 1.940. The upper limit of the refractive index nd is more preferably 2.0, still more preferably 1.935, yet more preferably 1.990. The increasing of the refractive index is effective for making an optical element higher-functional and compact, and the limiting of the upper limit of the refractive index is advantageous for improving the glass stability In the optical glass $I_A$-1-b, the Abbe's number vd is preferably in the range of 25 to 45. When combined with a lens formed of a high-dispersion glass to correct chromatic aberration, a larger Abbe's number vd is advantageous. For the above point of view, the lower limit of the Abbe's number vd is more preferably 26, still more preferably 27, yet more preferably 28, further more preferably 29. On the other hand, the moderating of the upper limit of the Abbe's number vd advantageously works for maintaining and improving the glass stability. From the above point of view, the upper limit of the Abbe's number νd is more preferably 43, still more preferably 40, yet more preferably 38, further more preferably 36, still further more preferably 35.

The optical glass $I_A$-1-b is a glass having a small partial dispersion ratio when the Abbe's number νd is fixed, so that optical elements formed of the optical glass $I_A$-1-b, such as a lens, are suitable for the chromatic aberration correction of the high order.

The above partial dispersion ratio Pg,F is represented by (ng−nF)/(nF−nc) in which ng, nF and nc are refractive indexes to g ray, F ray and c ray.

For providing an optical glass suitable for the chromatic aberration correction of the high order, in the optical glass $I_A$, a glass having a partial dispersion ratio Pg,F and an Abbe's number νd which satisfy the relationship of the following expression (10) is preferred, a glass having a partial dispersion ratio Pg,F and an Abbe's number νd which satisfy the relationship of the following expression (11) is more preferred, and a glass having a partial dispersion ratio Pg,F and an Abbe's number νd which satisfy the relationship of the following expression (12) is still preferred.

$$Pg,F \leq -0.0017 \times \nu d + 0.660 \quad (10)$$

$$Pg,F \leq -0.0017 \times \nu d + 0.655 \quad (11)$$

$$Pg,F \leq -0.0017 \times \nu d + 0.650 \quad (12)$$

The light transmittance of the optical glass $I_A$-1-b will be explained below.

The optical glass $I_A$-1-b exhibits high light transmittance in a broad wavelength region of the visible region. A preferred embodiment of the optical glass exhibits a coloring degree of λ70 of 470 nm or less. The λ70 is preferably in the range of 465 nm or less, more preferably in the range of 460 nm or less, still more preferably in the range of 455 nm, yet more preferably in the range of 450 nm, further more preferably in the range of 445 nm, still further more preferably in the range of 440 nm.

In a preferred embodiment of the optical glass $I_A$-1-b, the transmittance is over 70% in the longer wavelength side than λ70 in the visible light region. The λ5 is preferably in the range of 380 nm or less, more preferably in the range of 375 nm or less, still more preferably in the range of 365 nm. λ70 and λ5 are as described in the explanation of the optical glass $I_A$-1-a.

As will be described later, a lens formed of the optical glass $I_A$-1-b can provide an optical system that is excellent in capability of chromatic aberration correction, compact and highly functional, when combined with a lens formed of an ultra-low dispersion optical glass. A conventional chromatic aberration correction optical system uses a lens formed of a high-refractivity high-dispersion glass in combination with a lens formed of an ultra-low dispersion glass, while the high-refractivity high-dispersion glass contains relatively large amounts of high-refractivity high-dispersion-imparting components such as Ti, Nb, W, etc., and there are some cases where no sufficient light transmittance can be obtained on the short wavelength side of the visible light region. In the chromatic aberration correction optical system having a combination of a lens formed of an ultra-low dispersion glass and a lens formed of a high-refractivity high-dispersion glass, the transmittance of the lens formed of the high-refractivity high-dispersion glass to light on the short wavelength side of the visible light region, such as blue, is decreased, and the transmittance of the entire optical system to the visible light is hence decreased to that extent. When the lens formed of the high-refractivity high-dispersion glass is replaced with a lens formed of the optical glass $I_A$-1-b, the light transmittance of the above chromatic aberration correction system as a whole to the visible light region is fully secured.

(Glass Transition Temperature of Optical Glass $I_A$-1-b)

The optical glass $I_A$-1-b is suitable for forming an optical-function surface by grinding and polishing. Suitability to cold processing such as grinding and polishing, i.e., cold processability has a relationship to a glass transition temperature although it is indirect. A glass having a low glass transition temperature is suitable for precision press-molding rather than for cold processing while a glass having a high glass transition temperature is suitable for cold processing rather than for precision press-molding, and is excellent in cold processability. In the optical glass therefore, it is preferred to keep the glass transition temperature from decreasing to excess. The glass transition temperature is preferably adjusted to higher than 630° C., more preferably, to 640° C. or higher, still more preferably, to 660° C. or higher. When the glass transition temperature is too high, however, the heating temperature for molding a glass by re-heating and softening it is increased, and a mold used for the molding is greatly deteriorated, or the annealing temperature is increased, so that an annealing furnace is deteriorated or worn out greatly. The glass transition temperature is therefore preferably adjusted to 750° C. or lower, more preferably, to 730° C. or lower, still more preferably, to 710° C. or lower.

<Optical Glass $I_A$-2>

In the optical glass $I_A$-2, the total content of $Mg^{2+}$, $Ca^{2+}$, $Sr^{2+}$ and $Ba^{2+}$ is over 7% but 15% or less, and preferably, the content of $Ba^{2+}$ is over 7% but 15% or less. That is, the optical glass $I_A$-2 is an oxide glass comprising, by cationic %, 20 to 60% of $B^{3+}$, 0 to 20% of $Si^{4+}$, 0 to 6% of $Ge^{4+}$, 15 to 50% of total of $La^{3+}$, $Gd^{3+}$, $Y^{3+}$, $Yb^{3+}$, $Sc^{3+}$ and $Lu^{3+}$, provided that the content of $La^{3+}$ is 15 to 32%, 4 to 40% of total of $Ta^{5+}$, $Zr^{4+}$, $Nb^{5+}$, $W^{6+}$ and $Bi^{3+}$, 0 to 9% of $Zn^{2+}$, 0 to 5% of total of $Li^+$, $Na^+$ and $K^+$, and over 7% but 15% or less of total of $Mg^{2+}$, $Ca^{2+}$, $Sr^{2+}$ and $Ba^{2+}$, wherein the total content of the said total cationic components is 99 to 100%.

The optical glass $I_A$-2 is preferred as a glass that is increased in refractive index without having the limitation of the low-dispersion property imposed thereon, and there can be obtained an optical glass that is a high-refractivity glass but is remarkably less colored. In the optical glass $I_A$-2, the Abbe's number νd is preferably in the range of 34 or less.

The reasons for limiting the compositional ranges in the optical glass $I_A$-2 will be explained below.

The content of $B^{3+}$ is limited to 20 to 60% for the same reasons as those in the optical glass I. The content of $B^{3+}$ is preferably in the range of 20 to 36%.

The content of $Si^{4+}$ is limited to 0 to 2% for the same reasons as those in the optical glass I. The content of $Si^{4+}$ is preferably in the range of 6 to 16%.

The content of $Ge^{4+}$ is limited to 0 to 6% for the same reasons as those in the optical glass I. The content of $Ge^{4+}$ is preferably in a range like that of the optical glass I.

The total content of $La^{3+}$, $Gd^{3+}$, $Y^{3+}$, $Yb^{3+}$, $Sc^{3+}$ and $Lu^{3+}$ is preferably adjusted to 15 to 50%, more preferably, to 15 to 40%, still more preferably, to 20 to 40%, yet more preferably, to 30 to 40%, for the same reasons as those in the optical glass I.

$La^{3+}$ is a component that works to increase the refractive index without increasing the dispersion and that permits the maintenance of the glass stability even if it is incorporated in a relatively large amount, so that the content of $La^{3+}$ is preferably adjusted to 13 to 40%, more preferably, to 15 to 33%.

The total content of $Ta^{5+}$, $Zr^{4+}$, $Ti^{4+}$, $Nb^{5+}$, $W^{6+}$ and $Bi^{3+}$ is adjusted to 4 to 40% for the same reasons as those in the optical glass I. The total content of $Ta^{5+}$, $Zr^{4+}$, $Ti^{4+}$, $Nb^{5+}$, $W^{6+}$ and $Bi^{3+}$ is preferably in the range of 8 to 40%, more preferably in the range of 8 to 30%, still more preferably in the range of 14 to 30%, yet more preferably in the range of 10 to 20%, further more preferably in the range of 14 to 19%.

$Zn^{2+}$ works to improve the glass meltability and to decrease the glass transition temperature, while it decreases the refractive index when it is introduced to excess. In the optical glass $I_A$-2 in which priority is given to the increasing of the refractive index rather than to the decreasing of the glass transition temperature; the content thereof is limited to 0 to 9%, more preferably, to 0.1 to 9%. The content of $Zn^{2+}$ is preferably in the range of 0.5 to 8%, more preferably in the range of 1 to 8%.

The total content of $Li^+$, $Na^+$ and $K^+$ and its preferred ranges are similar to those in the optical glass $I_A$.

$Mg^{2+}$, $Ca^{2+}$, $Sr^{2+}$ and $Ba^{2+}$ work to improve the glass meltability and to decrease or suppress the coloring of the glass, but the glass stability is decreased when it is incorporated in a large amount, so that the total content of $Mg^{2+}$, $Ca^{2+}$, $Sr^{2+}$ and $Ba^{2+}$ limited to over 7% but 15% or less. The total content of $Mg^{2+}$, $Ca^{2+}$, $Sr^{2+}$ and $Ba^{2+}$ is preferably in the range of 8 to 15%, more preferably in the range of 8 to 14%, still more preferably in the range of 8 to 13%, yet more preferably in the range of 9 to 12%.

In the optical glass $I_A$, the upper limits of the content of $B^{3+}$ and the content of $Zn^{2+}$ are kept low as compared with the optical glass $I_B$, the melt-viscosity of the glass is high, and gas is generated due to heating and thermal decomposition during melting so that the amounts of raw materials for improving the clarification effect are limited. For these reasons, the glass production process of this invention in which the glass is melted in a state where carbonate and sulfate are caused to be co-present is remarkably effective, and there can be also produced the excellent clarification effect over the optical glass $I_B$.

In the optical glass $I_A$-1, the upper limit of the total content of $Zn^{2+}$, $Li^+$, $Na^+$, $K^+$, $Mg^{2+}$, $Ca^{2+}$, $Sr^{2+}$ and $Ba^{2+}$ is restricted to a small amount in addition to the restriction of the upper limits of the content of $B^{3+}$ and the content of $Zn^{2+}$, so that the glass has a higher melt viscosity and generates gas due to heating and thermal decomposition during melting and that the amount of raw materials for improving the clarification effect is limited to a small amount. For these reasons, the glass production process of this invention in which the glass is melted in a state where carbonate and sulfate are caused to be co-present is more remarkably effective.

Bubbles having a diameter of over 50 μm, contained in a molten glass, easily come up to the surface, and it is bubbles having a diameter of 50 μm or less that have a problem as bubbles that remain in the glass. It is hence sufficient to take control of numbers of bubbles with regard to the bubbles having a diameter of 50 μm or less. Specifically, a glass is observed through an optical microscope by enlarging it for bubbles, the bubbles are measured, and the measurement result is converted to a number density of the bubbles contained per unit mass.

According to the optical glass $I_A$, the optical glass $I_A$-1 and the optical glass $I_A$-2, the number of bubbles having a diameter of 50 μm or less, contained in the glass, can be suppressed to 60 pieces/kg or less, more preferably, to 50 pieces/kg or less, still more preferably, to 40 pieces/kg or less, yet more preferably, to 30 pieces/kg or less, further more preferably, to 20 pieces/kg or less, still further more preferably, to 15 pieces/kg or less, yet further more preferably, to 10 pieces/kg or less, far further more preferably, to 7 pieces/kg or less, particularly preferably, to 5 pieces/kg or less, most preferably, to 0 piece/kg.

<Optical Glass $I_B$>

The optical glass $I_D$ is an optical glass in which priority is given to the decreasing of the glass transition temperature for improving the precision press-moldability.

The optical glass $I_B$ will be explained below.

The optical glass $I_B$ is an oxide glass comprising, by cationic %, 25 to 62% of $B^{3+}$,
0 to 9% of $Si^{4+}$,
0 to 6% of $Ge^{4+}$,
16 to 31% of total of $La^{3+}$, $Gd^{3+}$, $Y^{3+}$, $Yb^{3+}$, $Sc^{3+}$ and $Lu^{3+}$,
4 to 40% of total of $Ta^{5+}$, $Zr^{4+}$, $Ti^{4+}$, $Nb^{5+}$, $W^{6+}$ and $Bi^{3+}$,
8 to 24% of $Zn^{2+}$,
0 to 9% of total of $Li^+$, $Na^+$ and $K^+$, and
0 to 7% of total of $Mg^{2+}$, $Ca^{2+}$, $Sr^{2+}$ and $Ba^{2+}$, wherein the total content of the said total cationic components is 99 to 100%.

For keeping the glass transition temperature low and also for maintaining the glass stability in a good state in the optical glass $I_B$, the refractive index nd is in the range of 0.78 to 1.90 and the Abbe's number νd is in the range of 36 to 46 with regard to the optical properties thereof.

The optical glass $I_B$ is suitable as a precision press-molding optical glass, and has the low-temperature-softening property or a glass transition temperature of 630° C. or lower.

The compositional ranges of the optical glass $I_B$ will be explained in detail below.

$B^{3+}$ is a network-forming component and is also an essential component for maintaining the glass stability, and it works not only to decrease the dispersion but also to improve the glass meltability and to keep the glass transition temperature from increasing. When the content of $B^{3+}$ is less than 25%, it is difficult to maintain the glass stability, and the glass tends to be devitrified during the production thereof. Further, the dispersion is increased. When it exceeds 62%, the refractive index is decreased, so that the content of $B^{3+}$ is limited to 25 to 62%. The lower limit of the content of $B^{3+}$ is preferably 30%, more preferably 36%, and the upper limit of the content of is preferably 60%, more preferably 58%.

$Si^{4+}$ is also a network-forming component, and has effects on the maintaining of the glass stability, the maintaining of a viscosity suitable for molding a molten glass and the improving of the chemical durability. When its content exceeds 9%, the glass transition temperature is increased. The content of $Si^{4+}$ is hence limited to 0 to 9%. The content of $Si^{4+}$ is preferably in the range of 0 to 8%.

$Ge^{4+}$ is a network-forming component and also works to increase the refractive index, so that it is a component that can increase the refractive index while maintaining the glass stability. Since, however, it is a very expensive component, the content thereof is limited to 0 to 6%. The content of $Ge^{4+}$ is preferably in the range of 0 to 5%, more preferably in the range of 0 to 3%, still more preferably in the range of 0 to 2%, yet more preferably in the range of 0 to 1%. Further, more preferably, $Ge^{4+}$ is not contained.

$La^{3+}$, $Gd^{3+}$, $Y^{3+}$, $Yb^{3+}$ $Sc^{3+}$ and $Lu^{3+}$ are components that impart the glass with high-refractivity low-dispersion properties. When the total content of $La^{3+}$, $Gd^{3+}$, $Y^{3+}$, $Yb^{3+}$, $Sc^{3+}$ and $Lu^{3+}$ is less than 16%, no desired high refractivity property can be realized. When it exceeds 31%, the glass stability is decreased, the glass transition temperature and the glass melting temperature are increased, the precision press-moldability is deteriorated, the corrosiveness of the molten glass is intensified, a refractory material constituting a melting vessel, such as platinum or platinum alloy, is hence corroded, and platinum ion is dissolved in the glass to color the glass or forms foreign matter to degrade the glass quality. Further, when the melting temperature is increased, easily volatile components such as boric acid are volatilized from the molten glass, and the content of these components are decreased, so that there is caused a problem that the optical properties such as the refractive index in particular vary with time. For getting around the above problem, the total content of $La^{3+}$, $Gd^{3+}$, $Y^{3+}$, $Yb^{3+}$, $Sc^{3+}$ and $Lu^{3+}$ is adjusted to 16 to 31%.

Of $La^{3+}$, $Gd^{3+}$, $Y^{3+}$, $Yb^{3+}$, $Sc^{3+}$ and $Lu^{3+}$, $Sc^{3+}$ and $Lu^{3+}$ are expensive components, and the effect produced by their introduction is low, so that it is preferred to introduce none of $Sc^{3+}$ and $Lu^{3+}$ or to adjust the total content of $La^{3+}$, $Gd^{3+}$, $Y^{3+}$ and $Yb^{3+}$ to 16 to 31%. Then, $Yb^{3+}$ is also an expensive component although it is not so expensive as $Sc^{3+}$ or $Lu^{3+}$, and the effect produced by its introduction is low, so that it is preferred to introduce no $Yb^{3+}$ or to adjust the total content of $La^{3+}$, $Gd^{3+}$ and $Y^{3+}$ to 16 to 31%.

Of $La^{3+}$, $Gd^{3+}$, $Y^{3+}$, $Yb^{3+}$, $Sc^{3+}$ and $Lu^{3+}$ is a component that does not easily deteriorate the glass stability even when a relatively large amount of it is introduced. Further, it is a component that does not easily color the glass among those components that impart with high refractivity, so that it is preferred to adjust the content of $La^{3+}$ to 9% or more. On the other hand, when its content exceeds 25%, the glass stability is decreased, the melting temperature is increased, the corrosiveness of the molten glass is increased, and the above failures may highly possibly increasingly occur. The content of $La^{3+}$ is hence preferably limited to 9 to 25%.

$Ta^{5+}$, $Zr^{4+}$, $Ti^{4+}$, $Nb^{5+}$, $W^{6+}$ and $Bi^{4+}$ not only work to increase the refractive index but also work to increase the dispersion. When the refractive index is increased by $La^{3+}$, $Gd^{3+}$, $Y^{3+}$, $Yb^{3+}$, $Sc^{3+}$ and $Lu^{3+}$ alone, the glass stability is decreased, so that it is required to incorporate at least one component of $Ta^{5+}$, $Zr^{4+}$, $Ti^{4+}$, $Nb^{5+}$, $W^{6+}$ and $Bi^{4+}$. When $Ta^{5+}$, $Zr^{4+}$, $Ti^{4+}$, $Nb^{5+}$, $W^{6+}$ and $Bi^{4+}$ is introduced to excess, there is caused a problem that the glass stability is decreased or that the dispersion is made too large. For these reasons, the total content of $Ta^{5+}$, $Zr^{4+}$, $Ti^{4+}$, $Nb^{5+}$, $W^{6+}$ and $Bi^{4+}$ is limited to 4 to 40%.

$Zn^{2+}$ works to improve the meltability and devitrification resistance of the glass and to decrease the liquidus temperature and glass transition temperature, and it is a component effective for improving the productivity and moldability of the glass and inhibiting the coloring. Further, it is a component effective for achieving the high refractivity low-dispersion as optical properties. In the optical glass $I_B$ in which priority is given to the decreasing of the glass transition temperature, it is required to incorporate 8% or more of $Zn^{2+}$. When the content thereof exceeds 24%, the refractive index is decreased or the glass is degraded in chemical durability, so that the content of $Zn^{2+}$ is limited to 8 to 24%.

$Li^+$, $Na^+$ and $K^+$ are optional components that work to improve the glass meltability and to decrease the glass transition temperature. When the total content of $Li^+$, $Na^+$ and $K^+$ exceeds 9%, it is difficult to realize the desired refractive index, and the chemical durability is also decreased. The total content of $Li^+$, $Na^+$ and $K^+$ is hence limited to 0 to 9%. $Rb^+$ and $Cs^+$ are expensive components as alkali metals, and their introduction effect is also poor as compared with $Li^+$, $Na^+$ and $K^+$. It is hence preferred to incorporate none of $Rb^+$ and $Cs^+$.

$Mg^{2+}$, $Ca^{2+}$, $Sr^{2+}$ and $Ba^{2+}$ work to improve the glass meltability and the light transmittance in the visible light region. When they are introduced into the glass in the form of carbonate and nitrate, there can be produced a bubble elimination effect. However, when the total content of $Mg^{2+}$, $Ca^{2+}$, $Sr^{2+}$ and $Ba^{2+}$ exceeds 7%, the liquidus temperature is increased, and the devitrification resistance is degraded. Further, the refractive index is decreased, and the chemical durability is also degraded. The total content of $Mg^{2+}$, $Ca^{2+}$, $Sr^{2+}$ and $Ba^{2+}$ is hence limited to 0 to 7%. Of $Mg^{2+}$, $Ca^{2+}$, $Sr^{2+}$ and $Ba^{2+}$, it is $Ba^{2+}$ that is the most advantageous for increasing the refractive index. Therefore, the content of $Ba^{2+}$ is preferably adjusted to 0 to 7%.

$Be^{2+}$ that is an alkaline earth metal is highly toxic, and $Ra^{2+}$ is a radioactive substance, so that it is preferred to incorporate none of $Be^{2+}$ and $Ra^{2+}$.

The total content of $B^{3+}$, $Si^{4+}$, $Ge^{4+}$, $La^{3+}$, $Y^{3+}$, $Yb^{3+}$, $Sc^{3+}$, $Lu^{3+}$, $Ta^{5+}$, $Zr^{4+}$, $Ti^{4+}$, $Nb^{5+}$, $W^{6+}$, $Bi^{4+}$, $Zn^{2+}$, $Li^+$, $Na^+$, $K^+$, $Mg^{2+}$, $Ca^{2+}$, $Sr^{2+}$ and $Ba^{2+}$ is adjusted to 99% or more. When over 1% of a component other than the above components is introduced, it is difficult to maintain the glass stability under a good condition while maintaining the high refractive index. For imparting the glass with the high refractive index and excellent glass stability, the above total content is preferably adjusted to 99.2% or more, more preferably, to 99.5% or more, still more preferably, to 99.8% or more, yet more preferably, to 100%.

The optical glass $I_B$ has two particularly preferred scopes.

The first scope to be referred to as "optical glass $I_B$-1" hereinafter) is preferred as a glass having optical properties represented by a refractive index nd of 1.78 to 1.82 and an Abbe's number vd in the range of 44 to 46.

The optical glass $I_B$-1 is an oxide glass comprising, by cationic %, 44 to 62% of $B^{3+}$,
0 to 8% of $Si^{4+}$,
0 to 6% of $Ge^{4+}$,
16 to 26% of total of $La^{3+}$, $Gd^{3+}$, $Y^{3+}$, $Yb^{3+}$, $Sc^{3+}$ and $Lu^{3+}$,
4 to 12% of total of $Ta^{5+}$, $Zr^{4+}$, $Ti^{4+}$, $Nb^{5+}$, $W^{6+}$ and $Bi^{3+}$,
8 to 16% of $Zn^{2+}$,
0 to 9% of total of $Li^+$, $Na^+$ and $K^+$, and
0 to 7% of total of $Mg^{2+}$, $Ca^{2+}$, $Sr^{2+}$ and $Ba^{2+}$,
wherein the total content of the said total cationic components is 99 to 100%.

The content of $B^{3+}$ is adjusted to 44 to 62% for maintaining the low dispersion property. The content of $B^{3+}$ is preferably in the range of 44 to 61%, more preferably in the range of 44 to 60%, still more preferably in the range of 46 to 57%, yet more preferably in the range of 51 to 56%.

The content of $Si^{4+}$ is adjusted to 0 to 8% for keeping the glass transition temperature low. The content of $Si^{4+}$ is preferably in the range of 0 to 6%, more preferably in the range of 0 to 5%, still more preferably in the range of 0 to 3%.

The content of $Ge^{4+}$ is adjusted to 0 to 6% for the same reasons as those in the optical glass I. Preferred ranges of the content of $Ge^{4+}$ are also like those of the content of $Ge^{4+}$ in the optical glass I.

The total content of $La^{3+}$, $Gd^{3+}$, $Y^{3+}$, $Yb^{3+}$, $Sc^{3+}$ and $Lu^{3+}$ is adjusted to 16 to 26% for maintaining the glass stability and the low-temperature-softening property while imparting the glass with the above optical properties. The total content of $La^{3+}$, $Gd^{3+}$, $Y^{3+}$, $Yb^{3+}$, $Sc^{3+}$ and $Lu^{3+}$ is preferably in the range of 17 to 26%, more preferably in the range of 18 to 26%, still more preferably in the range of 19 to 25%, yet more preferably in the range of 20 to 24%. $Sc^{3+}$ and $Lu^{3+}$ are expensive components and their incorporation effect is not so superior to those of the other components, so that the total content of $La^{3+}$, $Gd^{3+}$, $Y^{3+}$ and $Yb^{3+}$ is preferably adjusted to 16 to 26%, more preferably, to 17 to 26%, still more preferably, to 18 to 26%, yet more preferably, to 19 to 25%, further more preferably, to 20 to 24%. Further, $Yb^{3+}$ is also an expensive component, and its incorporation effect is not so superior, so that the total content of $La^{3+}$, $Gd^{3+}$ and $Y^{3+}$ is preferably adjusted to 16 to 26%, more preferably, to 17 to 26%, still more preferably, to 18 to 26%, yet more preferably, to 19 to 25%, further more preferably, to 20 to 24%.

Of $La^{3+}$, $Gd^{3+}$, $Y^{3+}$, $Yb^{3+}$, $Sc^{3+}$ and $Lu^{3+}$, $La^{3+}$ does not easily decrease the glass stability even when it is incorporated in a relatively large amount, so that the content of $La^{3+}$ is preferably adjusted to 9 to 18%, more preferably, to 10 to 18%, still more preferably, to 11 to 17%, yet more preferably, to 12 to 16%.

The total content of $Ta^{5+}$, $Zr^{4+}$, $Ti^{4+}$, $Nb^{5+}$, $W^{6+}$ and $Bi^{3+}$ is adjusted to 4 to 12% for maintaining the glass stability and the low-temperature-softening property while imparting the glass with the above optical properties. The total content of $Ta^{5+}$, $Zr^{4+}$, $Ti^{4+}$, $Nb^{5+}$, $W^{6+}$ and $Bi^{3+}$ is preferably in the range of 5 to 10%, more preferably in the range of 5 to 9%, still more preferably in the range of 6 to 9%, yet more preferably in the range of 6 to 8%.

The content of $Zn^{2+}$ is adjusted to 8 to 16% for maintaining the low-dispersion property while keeping the glass transition temperature low. The content of $Zn^{2+}$ is preferably in the range of 9 to 15%, more preferably in the range of 10 to 14%, still more preferably in the range of 11 to 14%.

The total content of $Li^+$, $Na^+$ and $K^+$ is limited to 0 to 9 for maintaining the glass stability. The total content of $Li^+$, $Na^+$ and $K^+$ is preferably in the range of 0 to 7%, more preferably in the range of 0 to 5%, still more preferably in the range of 0 to 4%, yet more preferably in the range of 0 to 3%, further more preferably in the range of 0 to 2%. Of $Li^+Na^+$ and $K^+$, $Li^+$ is a component that has the largest effect on the decreasing of the glass transition temperature while maintaining the high refractive index and excellent glass stability, so that the content of $Li^+$ is preferably adjusted to 0 to 9%, more preferably, to 0 to 7%, still more preferably, to 0 to 5%, yet more preferably, to 0 to 4%, further more preferably, to 0 to 3%, still further more preferably, to 0 to 2%.

$Mg^{2+}$, $Ca^{2+}Sr^2$ and $Ba^{2+}$ work to improve the glass meltability and decrease the glass transition temperature. They also produce a bubble-elimination effect when introduced in the form of carbonate or nitrate. When the total content of $Mg^{2+}$, $Ca^{2+}$, $Sr^{2+}$ and $Ba^{2+}$ exceeds 7%, however, the liquidus temperature is increased, and the devitrification resistance is degraded. Moreover, the refractive index is decreased, and the chemical durability is also degraded. The total content of $Mg^{2+}$, $Ca^{2+}$, $Sr^{2+}$ and $Ba^{2+}$ is hence limited to 0 to 7%. The total content of $Mg^{2+}$, $Ca^{2+}$, $Sr^{2+}$ and $Ba^{2+}$ is preferably in the range of 0 to 5%, more preferably in the range of 0 to 3%, still more preferably in the range of 0 to 2%, yet more preferably in the range of 0 to 1%, further more preferably 0%. Of $Mg^{2+}$, $Ca^{2+}$, $Sr^{2+}$ and $Ba^{2+}$, $Ba^{2+}$ is the most advantageous component for increasing the refractive index. Therefore, the content of $Ba^{2+}$ is preferably adjusted to 0 to 7%, more preferably, to 0 to 5%, still more preferably, to 0 to 3%, yet more preferably, to 0 to 2%, further more preferably, to 0 to 1%, still further more preferably, to 0%. In addition, $Be^{2+}$ that is an alkaline earth metal is highly toxic, and $Ra^{2+}$ is a radioactive substance, so that it is preferred to incorporate none of $Be^{2+}$ and $Ra^{2+}$.

In the optical glass $I_B$-1, the glass transition temperature is preferably in the range of 630° C. or lower, more preferably in the range of 620° C. or lower, still more preferably in the range of 610° C. or lower, yet more preferably in the range of 600° C. or lower.

Of the particularly preferred scopes of the optical glass $I_B$, the second scope (to be referred to as "optical glass $I_B$-2" hereinafter) is preferred as a glass having optical properties represented by a refractive index nd of 1.86 to 1.90 and an Abbe's number νd in the range of 36 to 39.

The optical glass $I_B$-2 is an oxide glass comprising, by cationic %,
28 to 47% of $B^{3+}$,
0 to 9% of $Si^{4+}$,
0 to 6% of $Ge^{4+}$,
18 to 31% of total of $La^{3+}$, $Gd^{3+}$, $Y^{3+}$, $Yb^{3+}$, $Sc^{3+}$ and $Lu^{3+}$,
9 to 20% of total of $Ta^{5+}$, $Zr^{4+}$, $Ti^{4+}$, $Nb^{5+}$, $W^{6+}$ and $Bi^{3+}$,
13 to 34% of $Zn^{2+}$,
0 to 9% of total of $Li^+$, $Na^+$ and $K^+$, and
0 to 7% of total of $Mg^{2+}$, $Ca^{2+}$, $Sr^{2+}$ and $Ba^{2+}$,
wherein the total content of the said total cationic components is 99 to 100%.

The content of $B^{3+}$ is adjusted to 28 to 47% for further increasing the refractive index. The content of $B^{3+}$ is preferably in the range of 36 to 47%, more preferably in the range of 38 to 45%, still more preferably in the range of 39 to 43%.

The content of $Si^{4+}$ is adjusted to 0 to 9% for keeping the glass transition temperature low. The content of $Si^{4+}$ is preferably in the range of 0 to 8%, more preferably in the range of 0 to 6%, still more preferably in the range of 0 to 5%, yet more preferably in the range of 0 to 2%.

The content of $Ge^{4+}$ is limited to 0 to 6% for the same reasons as those in the optical glass I. Preferred ranges the content of $Ge^{4+}$ are also like those of the content of $Ge^{4+}$ in the optical glass I.

The total content of $La^{3+}$, $Gd^{3+}$, $Y^{3+}$, $Yb^{3+}$, $Sc^{3+}$ and $Lu^{3+}$ is adjusted to 18 to 31% for maintaining the glass stability and the low-temperature-softening property while imparting the glass with the above optical properties. The total content of $La^{3+}$, $Gd^{3+}$, $Y^{3+}$, $Yb^{3+}$, $Sc^{3+}$ and $Lu^{3+}$ is preferably in the range of 19 to 30%, more preferably in the range of 20 to 29%, still more preferably in the range of 21 to 28%, yet more preferably in the range of 22 to 27%. $Sc^{3+}$ and $Lu^{3+}$ are expensive components and their incorporation effect is not so superior to those of the other components, so that the total content of $La^{3+}$, $Gd^{3+}$, $Y^{3+}$ and $Yb^{3+}$ is preferably adjusted to 18 to 31%, more preferably, to 19 to 30%, still more preferably, to 20 to 29%, yet more preferably, to 21 to 28%, further more preferably, to 22 to 27%. Further, $Yb^{3+}$ is also an expensive component, and its incorporation effect is not so superior, so that the total content of $La^{3+}$, $Gd^{3+}$ and $Y^{3+}$ is preferably adjusted to 18 to 31%, more preferably, to 19 to 30%, still more preferably, to 20 to 29%, yet more preferably, to 21 to 28%, further more preferably, to 22 to 27%.

Of $La^{3+}$, $Gd^{3+}$, $Y^{3+}$, $Yb^{3+}$, $Sc^{3+}$ and $Lu^{3+}$, $La^{3+}$ does not easily decrease the glass stability even when it is incorporated in a relatively large amount, so that the content of $La^{3+}$ is preferably adjusted to 12 to 25%, more preferably, to 14 to 24%, still more preferably, to 15 to 24%, yet more preferably, to 16 to 23%, further more preferably, to 17 to 22%.

The total content of $Ta^{5+}$, $Zr^{4+}$, $Ti^{4+}$, $Nb^{5+}$, $W^{6+}$ and $Bi^{3+}$ is adjusted to 9 to 20% for maintaining the glass stability and the low-temperature-softening property while imparting the glass with the above optical properties. The total content of $Ta^{5+}$, $Zr^{4+}$, $Ti^{4+}$, $Nb^{5+}$, $W^{6+}$ and $Bi^{3+}$ is preferably in the range of 10 to 18%, more preferably in the range of 11 to 18%, still more preferably in the range of 11 to 17%, yet more preferably in the range of 11 to 16%, still further more preferably in the range of 12 to 16%, yet further more preferably in the range of 12 to 15%.

The content of $Zn^{2+}$ is adjusted to 13 to 34% for keeping the glass transition temperature low. The content of $Zn^{2+}$ is preferably in the range of 13 to 30%, more preferably in the range of 13 to 26%, still more preferably in the range of 13 to 24%, yet more preferably in the range of 15 to 22%, further more preferably in the range of 16 to 21%, still more preferably in the range of 17 to 20%.

The total content of $Li^+$, $Na^+$ and $K^+$ is limited to 0 to 9 for maintaining the glass stability. The total content of $Li^+$, $Na^+$ and $K^+$ is preferably in the range of 0 to 7%, more preferably in the range of 0 to 5%, still more preferably in the range of 0 to 5-8, yet more preferably in the range of 0 to 3%, further more preferably in the range of 0 to 2%, still further more preferably in the range of 0 to 1%, yet further more preferably 0. Of $Li^+$, $Na^+$ and $K^+$, $Li^+$ is a component that has the largest effect on the decreasing of the glass transition temperature while maintaining the high refractive index and excellent glass stability, so that the content of $Li^+$ is preferably adjusted to 0 to 9%, more preferably, to 0 to 7%, still more preferably, to 0 to 5%, yet more preferably, to 0 to 3%, further more preferably, to 0 to 2%, still further more preferably, to 0 to 1%, yet further more preferably 0.

$Mg^{2+}$, $Ca^{2+}$, $Sr^{2+}$ and $Ba^{2+}$ work to improve the glass meltability and decrease the glass transition temperature. They also produce a bubble-elimination effect when introduced in the form of carbonate or nitrate. When the total content of $Mg^{2+}$, $Ca^{2+}$, $Sr^{2+}$ and $Ba^{2+}$ exceeds 7%, however, the liquidus temperature is increased, and the devitrification resistance is degraded. Moreover, the refractive index is decreased, and the chemical durability is also degraded. The total content of $Mg^{2+}$, $Ca^{2+}$, $Sr^{2+}$ and $Ba^{2+}$ is hence limited to 0 to 7%. The total content of $Mg^{2+}$, $Ca^{2+}$, $Sr^{2+}$ and $Ba^{2+}$ is preferably in the range of 0 to 5%, more preferably in the range of 1 to 3%, still more preferably in the range of 0 to 2%, yet more preferably in the range of 0 to 1%, further more preferably 0%. Of $Mg^{2+}$, $Ca^{2+}$, $Sr^{2+}$ and $Ba^{2+}$, $Ba^{2+}$ is the most advantageous component for increasing the refractive index. Therefore, the content of $Ba^{2+}$ is preferably adjusted to 0 to 7%, more preferably, to 0 to 5%, still more preferably, to 0 to 3%, yet more preferably, to 0 to 2%, further more preferably, to 0 to 1%, still, further more preferably, to 0%. In addition, $Be^{2+}$ that is an alkaline earth metal is highly toxic, and $Ra^{2+}$ is a radioactive substance, so that it is preferred to incorporate none of $Be^{2+}$ and $Ra^{2+}$.

In the optical glass $I_B$-2, the glass transition temperature is preferably in the range of 630° C. or lower, more preferably in the range of 620° C. or lower.

In the optical glass $I_B$, the glass melting temperature in the glass production process I and the glass production process III is preferably in the range of 1,100 to 1,350° C., more preferably in the range of 1,100 to 1,300° C., still more preferably in the range of 1,150 to 1,250° C., yet more preferably in the range of 1,180 to 1,230° C., the clarification temperature is preferably in the range of 1,200 to 1,400° C., more preferably in the range of 1,230 to 1,380° C., still more preferably in the range of 1,250 to 1,350° C., yet more preferably in the range of 1,270 to 1,330° C., and the melting temperature for an unvitrified raw material in the glass production process II is preferably in the range of 1,100 to 1,350° C., more preferably in the range of 1,100 to 1,300° C., still more preferably in the range of 1,150 to 1,250, yet more preferably in the range of 1,180 to 1,230° C.

Further, more preferred melting temperature conditions and clarification temperature conditions in the optical glass $I_B$-2 are as follows. The glass melting temperature in the glass production process I and the glass production process III and the melting temperature for an unvitrified raw material in the glass production process II are a liquidus temperature of the glass or higher, preferably a temperature higher than the liquidus temperature by 30° C. or more, and they are preferably adjusted to a temperature at which the glass has a viscosity of 20 dPa·s or higher temperature, more preferably, to a temperature at which the glass has a viscosity of 10 dPa·s or higher temperature, still more preferably, to a temperature at which the glass has a viscosity of 5 dPa·s or higher temperature, yet more preferably, to a temperature at which the glass has a viscosity of 3 dPa·s or higher temperature, further more preferably, to a temperature at which the glass has a viscosity of 1 dPa·s or higher temperature. Specifically, the glass melting temperatures each is preferably adjusted to a temperature range that liquidus temperature or higher but not higher by over 400° C., more preferably, to a temperature range that is higher than the liquidus temperature by 100° C. but is not higher by over 250° C., still more preferably, to a temperature range that is higher than the liquidus temperature by 120° C. but is not higher by over 220° C., yet more preferably, to a temperature range that is higher than the liquidus temperature by 140° C. but is not higher by over 200° C.

The clarification temperature in the glass production process I and the glass production process III is preferably in the range that is the liquidus temperature of the glass or higher, preferably in the range that is higher than the liquidus temperature by 30° C. or more and that is of a temperature at which the glass has a viscosity of 20 dPa·s or higher temperature, more preferably in the range of a temperature at which the glass has a viscosity of 10 dPa·s or higher temperature, still more preferably in the range of a temperature at which the glass has a viscosity of 5 dPa·s or higher temperature, yet more preferably in the range of a temperature at which the glass has a viscosity of 3 dPa·s or higher temperature, further more preferably in the range of a temperature at which the glass has a viscosity of 1 dPa·s or higher temperature. Specifically, the clarification temperature for the glass is preferably adjusted to a temperature range that is higher than the liquidus temperature by 100° C. but higher than the liquidus temperature by 500° C. or less, more preferably adjusted to a temperature range that is higher than the liquidus temperature by 120° C. but higher than the liquidus temperature by 450° C. or less, still more preferably adjusted to a temperature range that is higher than the liquidus temperature by 140° C. but higher than the liquidus temperature by 400° C. or less, yet more preferably adjusted to a temperature range that is higher than the liquidus temperature by 150° C. but higher than the liquidus temperature by 400° C. or less, further more preferably adjusted to a temperature range that is higher than the liquidus temperature by 200° C. but higher than the liquidus temperature by 350° C. or less.

For promoting the melting of the glass, it is good to increase the temperature, while a lowest temperature at which the melting is possible for a predetermined time period is selected in many cases for inhibiting the raw material from damaging the furnace. Further, for producing the clarification effect, the temperature is increased, while a low temperature at which the clarification is possible is selected in many cases for preventing the damage of the furnace and the coloring of the glass. The flowing-out temperature is desirably higher than the liquidus temperature, while the flowing-out temperature is desirably as low as possible for inhibiting the occurrence of striae caused by the volatilization of the glass and the folding of the glass into itself. Further, the glass can be caused to flow out at a liquidus temperature or lower for a short period of time if the time period is sufficient for the thermal stability of the glass.

In the glass production process I and the glass production process III, the temperature for causing the glass to flow out is preferably in the range of 950 to 1,150° C., more preferably in the range of 1,000 to 1,100° C. The flowing-out temperature is preferably higher than the liquidus temperature of the glass for reliably preventing the devitrification of the glass. When the time period for which the glass is held at a liquidus temperature or lower before it is rapidly cooled is a short period of time sufficient to maintain the thermal stability of the glass, it is made possible to get around the devitrification of the glass even if the flowing-temperature is set at the liquidus temperature or lower. The flowing-out temperature for the optical glass $I_B$-1 is preferably in the range of 1,000 to 1,050° C., and the flowing-out temperature for the optical glass $I_B$-2 is preferably in the range of 1,050 to 1,080° C.

<Cullet>

The cullet of this invention has the same composition as that of the optical glass I and contains carbon and sulfur. When the optical glass I, the optical glass $I_A$, the optical glass $I_A$-1, the optical glass $I_A$-2, the optical glass I or the optical glass $I_B$-2 is produced by the glass production process III, there are prepared a plurality of cutlets having the same composition as that of the above optical glass to be produced. When the cutlets are heated, melted and clarified, carbon is discharged as $CO_x$ gas, and sulfur is discharged as $SO_x$ gas, out of the molten glass, so that the cutlets contain more carbon and sulfur than the optical glass I.

In the glass production process III, a plurality of cullets are prepared and melted to produce an intended optical glass. For example, a plurality of cullets having compositions close to the composition of the intended optical glass are prepared. As the plurality of cullets, there are prepared a cullet having a higher refractive index than the intended optical glass, and a cullet having a lower refractive index than the intended optical glass. And, the cullet having a higher refractive index than the intended optical glass, and the cullet having a lower refractive index than the intended optical glass are mixed in a predetermined mixing ratio, such that there can be obtained a glass having an intended refractive index. The refractive index of the cullet is preferably adjusted by controlling the amount of a specific component of the composition of the intended optical glass. A plurality of the cullets can be mixed, for example, by the following manner. For example, there are two cullets A and B, the cullet A has a refractive index nd higher than the intended value by $\alpha$, and the cullet B has a refractive index nd lower than the intended value by $\beta$. In this case, the cullet A having a mass a and the cullet B having a mass b are mixed such that $\alpha \times a = \beta \times b$, whereby an optical glass having the intended refractive index can be obtained.

The cullet can be produced by the glass production process II.

<Press-Molding Glass Material>

The press-molding glass material of this invention is formed of the optical glass I. The press-molding glass material formed of the optical glass I is suitable as a glass material (glass gob) for producing an optical element blank, said optical element blank being produced by heating and softening the glass raw material and press-molding it with a press mold, and having a form obtained by adding a grinding margin and a polishing margin to the form of an intended optical element. The press-molding glass material formed of the optical glass $I_B$ is suitable as a glass material (preform) that is heated and precision press-molded with a press mold to produce an optical element.

Embodiments of the production of the press-molding glass material formed of the optical glass I are as follows.

In a first production embodiment, molten glass that flows out from a flow pipe is continuously cast into a mold that is horizontally placed below the flow pipe, and shaped into a plate-shaped glass having a constant thickness. The shaped glass is continuously withdrawn in the horizontal direction from an opening portion provided on a side of the mold. The plate-shaped glass is withdrawn by means of a belt conveyor. The plate-shaped glass is withdrawn such that a glass shaped material has a constant thickness by setting the withdrawing speed of the conveyor at a constant speed, whereby a glass shaped material having a predetermined thickness and plate width can be obtained. The glass shaped material is transferred into an annealing furnace by means of the belt conveyor and gradually cooled. The gradually cooled glass shaped material is cut or split in the plate thickness direction, and further ground and polished to form a press-molding glass material such as a glass gob or a preform, or barrel-polished to obtain a press-molding glass material such as a glass gob.

In a second production embodiment, a molten glass is cast into a cylindrical mold in place of the above mold to form a cylindrical glass shaped material. The glass shaped material formed in the mold is withdrawn through an opening portion of the mold bottom portion at a constant speed in the vertically downward direction. The withdrawing speed can be set at such a speed that the liquid level of the molten glass in the mold is constant. The glass shaped material that is gradually cooled is then cut or split and ground or polished to prepare a press-molding glass material such as a glass gob or a preform, or barrel-polished to obtain a press-molding glass material such as a glass gob.

In the first production embodiment and the second production embodiment, the glass material produced by polishing is suitable for precision press-molding, or as a preform, and the optical glass $I_B$ is suitable as a glass therefor. The glass material produced by barrel-polishing is suitable as a glass material for press-molding an optical element blank, that is, as a glass gob, and the optical glass $I_A$ is suitable as a glass therefor.

In a third production embodiment, a molding machine having a plurality of molds placed at regular intervals on the circumference of a round turn table is placed below a flowing-out pipe, the turn table is index-turned, a molten glass is supplied to a mold that is positioned in one mold stop position that is determined to be a molten glass supply position (called a casting position), the supplied molten glass is molded into a glass shaped material, and the glass shaped material is taken out in a predetermined mold stop position (take-out position) that is different from the casting position. It can be determined taking account of the turning speed of the turntable, the cooling rate of the glass, etc., which stop position should be the take-out position. The molten glass can be supplied to the mold in the casting position by a method in which the molten glass is dropped from the glass flow outlet of the flowing-out pipe and the glass drop is received with the above mold, a method in which the mold staying in the casting position is brought close to the glass flow outlet to support the lower end of the molten glass flow, a narrow portion is formed somewhere halfway in the glass flow, the mold is rapidly moved in the vertically downward direction timely as predetermined to separate a molten glass below the narrow portion, and the molten glass is thus received on the mold, or a method in which the molten glass flow that flows out is cut with a cutting blade, and the separated glass mass is received with the mold staying in the casting position.

The glass material produced in the third production embodiment is suitable for precision press-molding, that is, as a preform, or as a glass material for press-molding an optical element blank, that is, as a glass gob. The optical glass $I_A$ and the optical glass $I_B$ are suitable as a glass therefor, and the optical glass $I_B$ is in particular suitable as a glass therefor.

The method of molding the glass on the mold can be carried out by the application of a known method. Above all, the glass is molded while it is caused to float by applying upward gas to the glass mass by ejecting gas upwardly from the mold. This method can prevent creases from being formed on the glass shaped material surface, or can prevent the glass shaped material from cracking by coming in contact with the mold.

The glass shaped material can be imparted with a spherical form, a spheroidal form or a form having one axis of rotational symmetry and two surfaces facing in the axial directions of the above axis of rotational symmetry and both forming outwardly convex forms. These forms are suitable for a glass material for press-molding an optical element such as a lens or an optical element blank such as a lens blank. The thus-obtained glass shaped material can be used as a press-molding glass material directly or after its surface is polished or barrel-polished.

When a glass gob is press-molded, the fusion of a press mold and the glass can be reliably prevented by applying a known release agent having the form of a powder to the surface of the glass gob. When a preform is precision press-molded, the fusion of a press mold and the glass can be reliably prevented by coating a carbon-containing film, etc., on the surface of the preform, and it is hence made easier to precisely transfer the form of molding surface of the mold to the glass.

[Optical Element]

The optical element of this invention will be explained below.

The optical element of this invention has a feature that it is formed of the optical glass I. The optical element of this invention is formed of the optical glass I that has a high refractive index and that has high inner quality without containing any bubbles, so that there can be provided optical elements such as various lenses, prisms, etc., which have optically high values.

Examples of the lens include lenses of which the optical-function surfaces are spherical or aspherical, specifically, various lenses such as a concave meniscus lens, a convex meniscus lens, a double convex lens, a plano-convex lens, a plano-concave lens, etc.

The coloring of the optical glass I is suppressed though it is a high-refractivity glass, so that the optical element of this invention is suitable as a lens for constituting an interchangeable lens of a single-lens reflex camera.

Further, a prism is formed of the high-refractivity optical glass I of which the coloring is suppressed, and when it is incorporated into an image-sensing optical system, therefore, the light path can be bent toward the desired direction, so that there can be realized an optical system that is compacter and has a wide angle of view.

The optical-function surface of the optical element of this invention can be provided with a film that controls the light transmittance such as an anti-reflection film, etc.

The process for producing an optical element, provided by this invention, will be explained below.

In a first embodiment of the optical element production process of this invention, the above press-molding glass material is heated, softened and press-molded to form an optical element blank. The optical element blank is then annealed to decrease a strain, and the refractive index thereof is finely adjusted such that it comes to be precisely equivalent to an intended value. After annealed, the optical element blank is ground and polished by a known method to obtain an intended optical element. When the optical element blank is produced, there is provided a press mold having molding surfaces having inversion forms of the above blank. The press mold is constituted of mold members including an upper mold member, a lower mold member and optionally a sleeve member, and the molding surfaces of the upper and lower mold members are provided with the above forms, and the molding surface of the sleeve member when it is optionally used is also provided with part of the above forms. Then, a release agent in the form of a powder such as boron nitride, etc., is uniformly applied to the surface of the press-molding glass material. And, the press-molding glass material is heated and softened, and then it is introduced onto the lower mold member and pressed with the upper mold member facing the lower mold member to form it into an optical element blank. Concerning heating conditions for the glass gob, press molding conditions, materials for the press mold, etc., known conditions, etc., can be applied thereto. The above steps can be carried out in atmosphere.

In a second embodiment of the optical element production process of this invention, the glass raw material is melted according to the glass production process I or the glass production process III, and the resultant molten glass is press-molded to produce an optical element blank formed of the optical glass I. The, the optical element blank is annealed to reduce a strain, and the refractive index thereof is finely adjusted such that it comes to be precisely equivalent to an intended value. After annealed, the optical element blank is ground and polished by a known method to obtain an intended optical element.

In the above press-molding, the press mold is constituted of mold members including an upper mold member, a lower mold member and optionally a sleeve member, and the molding surfaces of the press mold are processed such that they have inversion forms of the optical element blank as described above.

A mold release agent having the form of a powder such as boron nitride, etc., is uniformly applied onto the lower mold member molding surface, a molten glass that is obtained by melting according to the above optical glass production process is caused to flow out on the lower mold member molding surface, and when the amount of the molten glass on the lower mold member comes to a desired amount, the flow of the molten glass is cut with a cutting blades called shears. A molten glass mass is obtained on the lower mold member in the above manner, and then the lower mold member with the molten glass mass on it is transferred to a position where the upper mold member waits above, the glass is pressed with the upper and lower mold members to form it into an optical element blank. Concerning heating conditions for the glass material, press molding conditions, materials for the press mold, etc., known conditions, etc., can be applied thereto. The above steps can be carried out in atmosphere.

A third embodiment of the optical element production process of this invention is a process for producing an optical element by precision press-molding the above press-molding glass material (preform) of this invention with a press mold.

The heating of the press mold and the preform and the precision press-molding step are preferably carried out in the atmosphere of a non-oxidizing gas such as nitrogen gas or a mixture of nitrogen gas with hydrogen gas, for preventing the oxidation of the molding surfaces of the press mold or the release film provided on the above molding surfaces. In the non-oxidizing gas atmosphere, a carbon-containing film coating the preform surface also remains on the precision press-molded product without being oxidized. This film is to be finally removed, and for relatively easily and completely removing the carbon-containing film, the precision press-molded product can be heated in an oxidizing atmosphere, e.g., in atmosphere. The removal of the carbon-containing film by oxidation should be carried out at a temperature at which the precision press-molded product is not deformed by the heating. Specifically, it is preferably carried out in the temperature range of less than a glass transition temperature.

The precision press-molding uses a press mold of which the molding surfaces are highly precisely processed beforehand into desired forms, and a release film may be formed on each molding surface for preventing the fusion of the glass thereto during the pressing. The release film includes a carbon-containing film, a nitride film and a noble metal film, and the carbon-containing film preferably includes a hydrogenated carbon film, a carbon film, etc.

The third embodiment of the optical element production process of this invention includes the following two processes.

The first process (to be referred to as "optical element production process 1" hereinafter) is a process for producing an optical element, which comprises introducing a preform into the press mold, heating the above preform and the press mold together and precision press-molding the preform. The second process (to be referred to as "optical element production process 2" hereinafter) is a process for producing an optical element, which comprises introducing a pre-heated preform into a pre-heated press mold and precision press-molding the preform.

In the optical element production process 1, the preform is supplied between a pair of the facing upper mold member and lower mold member of which the molding surfaces are precisely form-processed, both the mold and the preform are heated to a temperature corresponding to a glass viscosity of $10^5$ t $10^9$ dPa·s to soften the preform, and the preform is press-molded to transfer the molding surfaces of the mold to the glass. The optical element production process 1 is a recommended process when importance is attached to the improvements of molding accuracy such as surface accuracy, decenterizing accuracy, etc.

In the optical element production process 2, a preform that is temperature-increased to a temperature corresponding to a glass viscosity of $10^4$ to $10^8$ dPa·s is supplied between a pair of the upper mold member and lower mold member of which the molding surfaces are precisely form-processed, and the preform is press-molded, whereby the forms of molding surfaces of the mold can be precisely transferred to the glass. The optical element production process 2 is a recommended process when importance is attached to the improvement of productivity.

The pressure and time period during the pressing can be determined as required while taking account of the glass viscosity, etc., and for example, the pressing pressure can be set at approximately 5 to 15 MPa, and the pressing time period can be set for 10 to 300 seconds. The pressing conditions such as the pressing time period and the pressing pressure can be determined as required in known ranges depending upon the form and dimensions of a molded product.

Then, the press mold and the precision press-molded product are cooled, and preferably, when a temperature of a strain point or lower, the mold members are separated, and the precision press-molded product is taken out. For bringing the optical properties into agreement precisely with desired values, the annealing conditions, e.g., an annealing speed, etc., for the molded product during its cooling may be adjusted as required.

The optical element of this invention can be also produced without carrying out the press-molding step. For example, a homogeneous molten glass is cast into a mold to form a glass block, a strain is removed by annealing, and the optical properties are adjusted by adjusting the annealing conditions such that the refractive index of the glass comes to be a desired value. Then, the glass block is cut or split to prepare glass pieces, each glass piece is ground and polished to complete an optical element.

EXAMPLES

This invention will be explained in detail with reference to Examples hereinafter. The whole of this invention can be carried out on the basis of these Examples and the above explanation.

Example 1

Boric acid, oxides, carbonates and sulfates were weighed so as to obtain optical glasses having compositions shown in Tables 1-1 to 1-3, Tables 2-1 to 2-10 and Tables 3-1 to 3-3, and glass raw materials were prepared by mixing. Lanthanum carbonate, zinc carbonate and barium carbonate were used as the carbonates, and zinc sulfate, barium sulfate, etc., were used as the sulfates. In addition, Sb, As and nitrates were not introduced into any glass raw material.

When an optical glass to be obtained had a mass a, the amount of carbon that was introduced into each glass raw material by carbonates was adjusted to the range of $0.2 \times 10^{-2}$×a to $2 \times 10^{-2}$×a (0.2 to 2 mass % based on g glass composition) as $CO_2$, and the amount of sulfur that was introduced into each glass raw material by sulfates was adjusted to the range of $0.07 \times 10^{-2}$×a to $0.5 \times 10^{-2}$×a (0.07 to 0.5 mass % based on a glass composition) as $SO_3$. The number density of bubbles in each optical glass was controlled such that the number density of bubbles having a diameter of 50 µm or less contained in the optical glass was 5 pieces/kg or less, preferably 0 piece/kg.

With regard to the compositions shown in Tables 1-1 to 1-3, glass raw materials obtained by mixing were placed in melting vessels made of platinum, melted by heating them at 1,270 to 1,320° C., and then the molten glasses were transferred to clarification vessels from the melting vessels through pipes made of platinum and clarified at 1,300 to 1,380° C. When the molten glasses moved through the pipes, they were heated and temperature-increased to the above clarifying temperature. After clarified, the molten glasses were transferred into working vessels from the clarification vessels through pipes made of platinum and were stirred at 1,160 to 1,190° C. to homogenize them, and then they were caused to flow out. The molten glasses that flowed out were molded, to obtain 22 optical glasses, Glass No. 1-1 to Glass No. 1-22, corresponding to the optical glass $I_A$-1-a.

Figure 10:
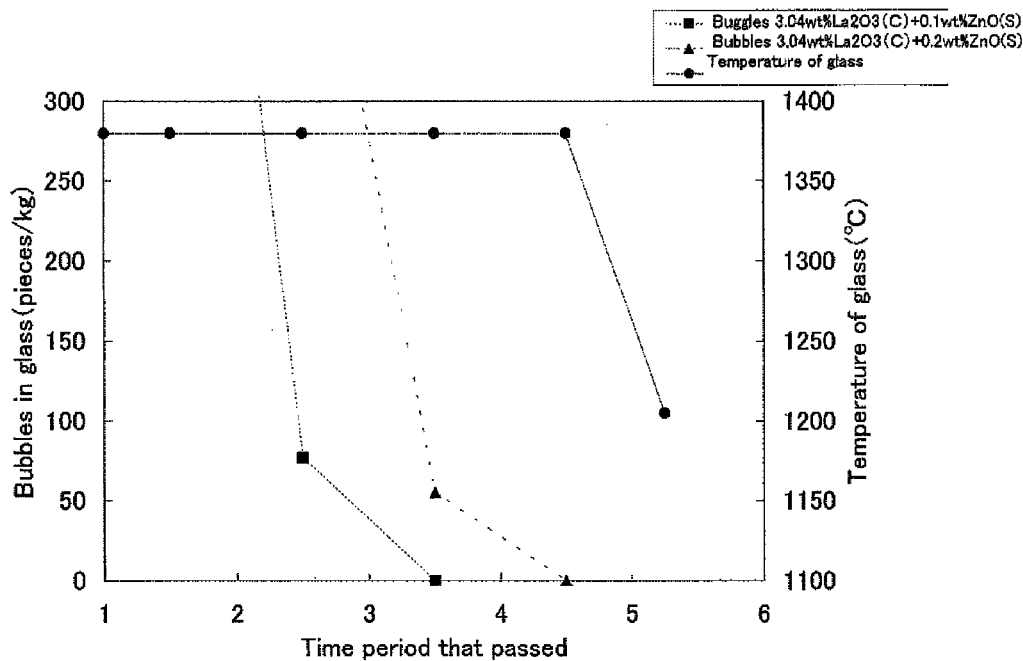
FIG. 10 shows relationships among the passage of time in the step of melting a glass, the temperature of the glass and the density of bubbles in the glass in Example 1.

In FIG. 10, the abscissa axis shows a time period that passed in the step of melting a glass, the ordinate axis on the left side shows the number of bubbles contained in the glass per unit mass (bubble density), and the ordinate axis on the right side shows a temperature of the glass. FIG. 10 shows changes in the density of bubbles contained in the glass and the glass temperature with time with regard to Glass No. 1-22. In Figure, a line passing through plots ● shows a change in the temperature of the glass, a line passing through plots ■ shows a result obtained when the amount of $La_2O_3$ to be introduced into the glass as lanthanum carbonate was adjusted to 3.04 mass % and the amount of ZnO to be introduced into the glass as zinc sulfate was adjusted to 0.1 mass %, and a line passing through plots ▲ shows a result obtained when the amount of $La_2O_3$ to be introduced into the glass as lanthanum carbonate was adjusted to 3.04 mass % and the amount of ZnO to be introduced into the glass as zinc sulfate was adjusted to 0.2 mass %. The above results are also shown in Table 4.

In any one of the above cases, the density of bubbles in the glass could be brought into zero as shown in FIG. 10. Even when the amount of carbonate or sulfate to be introduced is changed within the above ranges, the density of bubbles in the glass can be brought into a low level like the above results. Further, like results can be obtained with regard to each glass of Glass No. 1-1 to Glass No. 1-21. Melting conditions such as a melting time period for a glass, etc., are adjusted, and carbonate and sulfate are used, so that the density of bubbles in the glass may become a predetermined value or less as described above, whereby the bubble density can be controlled such that it is on a remarkably low level.

With regard to compositions shown in Table 2-1 to 2-10, each glass raw material obtained by mixing was placed in a crucible made of platinum, melted by heating it at 1,240 to 1,300° C., and then temperature-elevated and clarified at 1,320 to 1,400° C. Each clarified glass was temperature-decreased and stirred and homogenized at 1,175 to 1,200° C., and the homogenized glass was caused to flow out. The molten glass that flowed out was molded, and in this manner, there were obtained 70 optical glasses, Glass No. 2-1 to Glass No. 2-70, corresponding to the optical glass $I_A$-1-b.

With regard to compositions shown in Tables 3-1 to 3-3, each glass raw material obtained by mixing was placed in a crucible made of platinum, melted by heating it at 1,200 to 1,480° C., and then temperature-elevated and clarified at 1,210 to 1,500° C. Each clarified glass was temperature-decreased and stirred and homogenized at 1,050 to 1,250° C., and the homogenized glass was caused to flow out. The molten glass that flowed out was molded, and in this manner, there were obtained 22 optical glasses, Glass No. 3-1 to Glass No. 3-22, corresponding to the optical glass $I_A$.

The above glasses were measured for properties as follows. Tables 1-1 to 1-3, Tables 2-1 to 2-10 and Tables 3-1 to 3-3 show the results.

As shown in Tables 1-1 to 1-3 and Tables 2-1 to 2-10, remarkably excellent clarification effects were found on the 92 optical glasses, Glass No. 1-1 to Glass No. 1-22 and Glass No. 2-1 to Glass No. 2-70.

Figure 11:
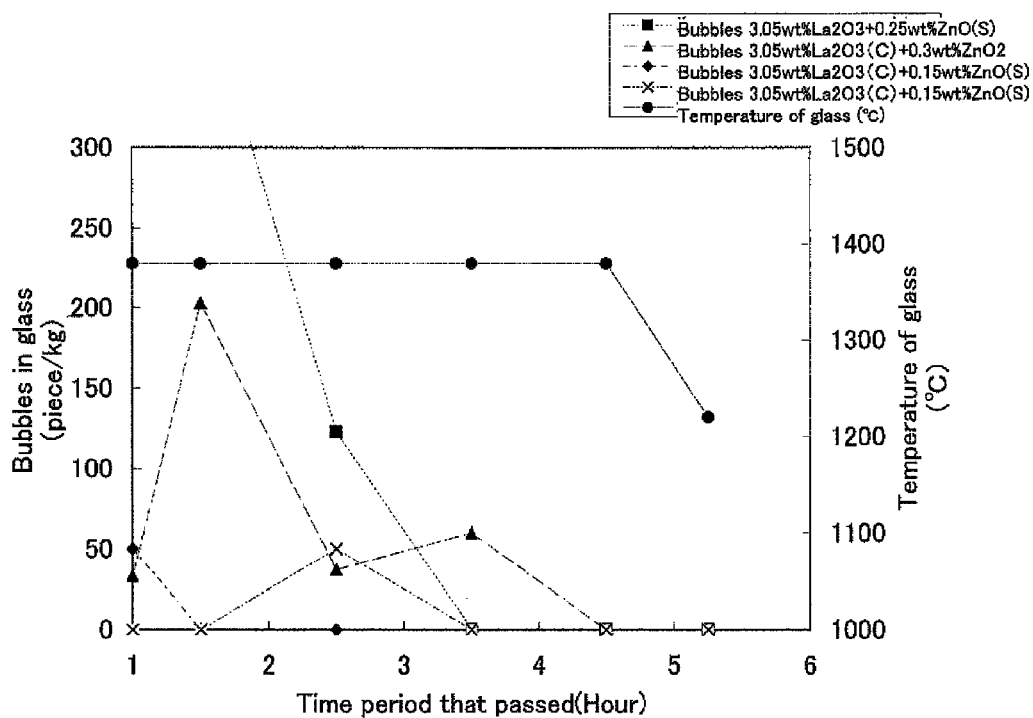
FIG. 11 shows relationships among the passage of time in the step of melting a glass, the temperature of the glass and the density of bubbles in the glass in Example 1.

In FIG. 11, the abscissa axis shows a time period that passed in the step of melting a glass, the ordinate axis on the left side shows the number of bubbles contained in the glass per unit mass (bubble density), and the ordinate axis on the right side shows a temperature of the glass. FIG. 11 shows a change in the density of bubbles contained in the glass with time with regard to Glass No. 2-42. In Figure, a line passing through plots ● shows a change in the temperature of the glass, a line passing through plots ■ shows a result obtained when the amount of $La_2O_3$ to be introduced into the glass as lanthanum carbonate was adjusted to 3.05 mass % and the amount of ZnO to be introduced into the glass as zinc sulfate was adjusted to 0.25 mass %, a line passing through plots ▲ shows a result obtained when the amount of $LaO_3$ to be introduced into the glass as lanthanum carbonate was adjusted to 3.05 mass % and the amount of ZnO to be introduced into the glass as zinc sulfate was adjusted to 0.3 mass %, a line passing through plots ♦ shows a result obtained when the amount of $La_2O_3$ to be introduced into the glass as lanthanum carbonate was adjusted to 3.05 mass % and the amount of ZnO to be introduced into the glass as zinc sulfate was adjusted to 0.15 mass %, and a line passing through plots × shows a result obtained when the amount of $La_2O_3$ to be introduced into the glass as lanthanum carbonate was adjusted to 3.05 mass % and the amount of ZnO to be introduced into the glass as zinc sulfate was adjusted to 0.15 mass %. The above results are also shown in Table 5.

In any one of the above cases, the density of bubbles in the glass could be brought into zero as shown in FIG. 11. Even when the amount of carbonate or sulfate to be introduced is changed within the above ranges, the density of bubbles in the glass can be brought into a low level like the above results. Further, like results can be obtained with regard to each glass of Glass No. 2-1 to Glass No. 2-41 and Glass No. 2-43 to Glass No. 2-70. Melting conditions such as a melting time period for a glass, etc., are adjusted, and carbonate and sulfate are used, so that the density of bubbles in the glass may become a predetermined value or less as described above, whereby the bubble density can be controlled such that it is on a remarkably low level.

Figure 12:
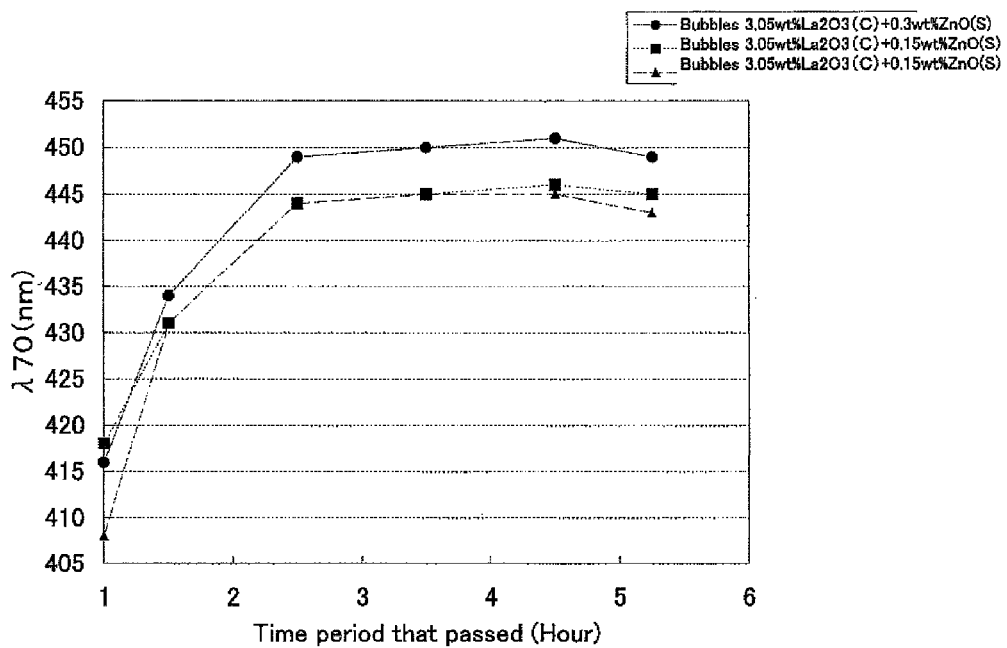
FIG. 12 shows the relationship between the passage of time in the step of melting a glass and the coloring degree λ70 of the glass in Example 1.

In FIG. 12, the abscissa axis shows a time period that passed in the step of melting a glass, and the ordinate axis shows a coloring degree λ70 of Glass No. 2-42, and FIG. 12 shows a change of λ70 with time. A line passing through plots ● shows a results obtained when the amount of $La_2O_3$ to be introduced into the glass as lanthanum carbonate was adjusted to 3.05 mass % and the amount of ZnO to be introduced into the glass as zinc sulfate was adjusted to 0.3 mass %, a line passing through plots ■ shows a result obtained when the amount of $La_2O_2$ to be introduced into the glass as lanthanum carbonate was adjusted to 3.05 mass % and the amount of ZnO to be introduced into the glass as zinc sulfate was adjusted to 0.15 mass %, and a line passing through plots ▲ shows a result obtained when the amount of $La_2O_3$ to be introduced into the glass as lanthanum carbonate was adjusted to 3.05 mass % and the amount of ZnO to be introduced into the glass as zinc sulfate was adjusted to 0.15 mass %. The above results are also shown in Table 5.

In any one the above cases, the value of λ70 is stabilized with the passage of time. Thanks to such a mixture effect of carbonate and sulfate, bubbles can be eliminated excellently, and properties such as the coloring degree are also stabilized.

Excellent clarification effects were also found in eight optical glasses, Glass No. 3-1 to Glass No. 3-8 shown in Table 3-1.

In 14 optical glasses, Glass No. 3-9 to Glass No. 3-22 shown in Tables 3-2 and 3-3, clarification effects sufficient for usability as an optical glass can be produced.

(1) Refractive Index nd, Abbe's Number νd and Partial Dispersion Ratio Pg,F

A glass obtained by temperature-decrease rate of −30° C./hour was measured for refractive indices nd, nF and nC according to the refractive index measurement method of Japan Optical Glass Industry Society Standard, and an Abbe's number νd was calculated from these results. Further, it was measured for refractive indices ng, nF and nC, and a partial dispersion ratio Pg,F was calculated from these results.

(2) Liquidus Temperature LT and Viscosity at Liquidus Temperature

A glass was placed in a furnace which was heated to a predetermined temperature, and it was held therein for 2 hours and cooled. Then, the glass was internally observed through an optical microscope of 100 magnifications, and a liquidus temperature was determined on the basis of whether or not a crystal was present.

On the basis of "JIS Z 8803-1991 "Viscosity of liquid—Measurement Method, 8. Viscosity measurement with a single cylindrical rotating viscometer", the glass was measured for a viscosity at a liquidus temperature according to a rotating-cylinder method.

(3) Glass Transition Temperature Tg and Sag Temperature Ts

They were measured at a temperature-elevation rate of 4° C./minute with a thermo-mechanical analyzer (TMA) supplied by Bruker AXS.

(4) Specific Gravity

Measured according to an Archimedean method.

(5) Number Density of Bubbles in Glass

A glass was observed by enlarging it with an optical microscope, it was sighted whether or not bubbles were there, bubbles were counted, and the result was converted to a number density of bubbles contained per unit mass.

(6) Detection of $CO_2$ and $sO_3$ Contained in Glass

They were detected and determined according to the mass spectroscopy.

(7) λ80, λ70 and λ5

A 10±0.1 mm thick glass having optically polished two opposed surfaces in parallel with each other was used and measured for spectral transmittance in the wavelength region of 280 nm to 700 nm, and a wavelength at which the glass exhibited a transmittance of 80% was taken as λ80, a wavelength at which the glass exhibited a transmittance of 70% was taken as λ70, and a wavelength at which the glass exhibited a transmittance of 5% was taken as λ5.

In the above examples, unvitrified raw materials were heated, melted, clarified, homogenized and molded to produce optical glasses directly, while there may be employed a constitution in which unvitrified glass materials are melted by heating to obtain molten glasses, the thus-obtained glasses were pulverized to obtain cullets, or a cullet having a slightly lower refractive index than an intended refractive index and a cullet having a slightly higher refractive index than the intended refractive index are prepared, the thus-prepared cullets are heated, melted, clarified, homogenized and molded to produce an optical glass.

All of the thus-obtained optical glasses have remarkably excellent clarification properties. Much $CO_2$ and $SO_3$ are detectable from these glasses as compared with an optical glass produced without using any one of carbonate and sulfate. Defects such as platinum foreign matter, etc., were not found inside any one of the above optical glasses.

TABLE 1-1

| No. (Cationic %) | 1-1 | 1-2 | 1-3 | 1-4 | 1-5 | 1-6 | 1-7 | 1-8 |
|---|---|---|---|---|---|---|---|---|
| $B^{3+}$ | 30.50 | 29.50 | 31.50 | 32.00 | 31.65 | 33.00 | 34.00 | 33.00 |
| $Si^{4+}$ | 13.00 | 13.00 | 12.00 | 12.00 | 12.00 | 11.00 | 10.00 | 11.00 |
| $Ge^{4+}$ | 0.00 | 0.00 | 0.00 | 0.00 | 0.00 | 0.00 | 0.00 | 0.00 |
| $La^{3+}$ | 26.00 | 26.00 | 26.00 | 25.50 | 25.50 | 25.50 | 25.50 | 25.50 |
| $Gd^{3+}$ | 5.50 | 5.75 | 5.50 | 6.00 | 6.00 | 6.00 | 6.00 | 6.00 |
| $Y^{3+}$ | 2.00 | 3.00 | 2.00 | 2.00 | 2.00 | 2.00 | 2.00 | 2.20 |
| $Yb^{3+}$ | 0.00 | 0.00 | 0.00 | 0.00 | 0.00 | 0.00 | 0.00 | 0.00 |
| $\Sigma Ln^{3+}$ | 33.50 | 34.75 | 33.50 | 33.50 | 33.50 | 33.50 | 33.50 | 33.70 |
| $Ta^{5+}$ | 0.00 | 0.00 | 0.00 | 0.00 | 0.00 | 0.00 | 0.00 | 0.00 |
| $Zr^{4+}$ | 3.95 | 3.70 | 4.45 | 4.45 | 4.45 | 4.45 | 4.45 | 4.45 |
| $Ti^{4+}$ | 7.50 | 7.50 | 7.50 | 7.50 | 7.35 | 7.50 | 7.50 | 7.30 |
| $Nb^{5+}$ | 4.55 | 4.55 | 4.55 | 5.05 | 5.05 | 5.05 | 5.05 | 5.05 |
| $W^{6+}$ | 0.50 | 0.50 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| $\Sigma HR$ | 16.50 | 16.25 | 16.50 | 17.00 | 16.85 | 17.00 | 17.00 | 16.80 |
| $Zn^{2+}$ | 6.50 | 6.50 | 6.50 | 5.50 | 6.00 | 5.50 | 5.50 | 5.50 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| $\Sigma R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 |
| $Ba^{2+}$ | 0.00 | 0.00 | 0.00 | 0.00 | 0.00 | 0.00 | 0.00 | 0.00 |
| $\Sigma R^{2+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| Bubbles (pieces/kg) | 0 | 0 | 0 | 0 | 0 | 0 | 0 | 0 |
| nd | 1.90757 | 1.9107 | 1.90928 | 1.91036 | 1.90994 | 1.91231 | 1.91389 | 1.91107 |
| vd | 34.96 | 35.12 | 35.3 | 35.03 | 35.12 | 34.97 | 34.89 | 35.07 |
| Specific gravity | 4.99 | 5.04 | 4.99 | 4.98 | 4.98 | 5 | 5.01 | 5 |
| Pg, F | 0.5832 | 0.58619 | 0.58579 | 0.58369 | 0.5851 | 0.58298 | 0.58228 | 0.58045 |
| Tg (° C.) | 683 | 688 | 683 | 686 | 685 | 686 | 681 | 685 |
| Ts (° C.) | 733 | 740 | 725 | 736 | 733 | 735 | 730 | 733 |
| Liquidus temperature (° C.) | Less than 1200 | — | Less than 1200 | Less than 1190 | Less than 1190 | Less than 1180 | Less than 1180 | Less than 1175 |
| Viscosity at liquidus temperature (dPa·s) | — | — | 3.08 | 3.12 | — | 3.2 | — | 3.31 |

TABLE 1-1-continued

| No. (Cationic %) | 1-1 | 1-2 | 1-3 | 1-4 | 1-5 | 1-6 | 1-7 | 1-8 |
|---|---|---|---|---|---|---|---|---|
| λ 80 (nm) | 497 | 490 | 500 | 484 | 495 | 492 | 494 | 498 |
| λ 70 (nm) | 426 | 422 | 423 | 422 | 422 | 422 | 423 | 423 |
| λ 5 (nm) | 360 | 359 | 358 | 359 | 358 | 359 | 359 | 359 |

(Note 1)

Σ Ln3+ means a total content of La3+, Gd3+, Y3+, Yb3+, Sc3+ and Lu3+.

(Note 2)

Σ HR means a total content of Ta5+, Zr4+, Ti4+, Nb5+, W6+ and Bi3+.

(Note 3)

Σ R+ means a total content of Li+, Na+ and K+.

(Note 4)

Σ R2+ means a total content of Mg2+, Ca2+, Sr2+ and Ba2+.

(Note 5)

Sb represents an amount of Sb cation regardless of its valence.

TABLE 1-2

| No. (Cationic %) | 1-9 | 1-10 | 1-11 | 1-12 | 1-13 | 1-14 | 1-15 | 1-16 |
|---|---|---|---|---|---|---|---|---|
| $B^{3+}$ | 33.00 | 34.50 | 34.50 | 33.00 | 33.00 | 33.00 | 33.00 | 33.00 |
| $Si^{4+}$ | 11.00 | 9.50 | 9.50 | 11.00 | 11.00 | 11.00 | 11.00 | 11.00 |
| $Ge^{4+}$ | 0.00 | 0.00 | 0.00 | 0.00 | 0.00 | 0.00 | 0.00 | 0.00 |
| $La^{3+}$ | 25.50 | 25.00 | 25.00 | 24.50 | 25.50 | 26.50 | 26.50 | 25.50 |
| $Gd^{3+}$ | 6.00 | 6.00 | 6.00 | 6.00 | 6.00 | 6.00 | 6.00 | 6.00 |
| $Y^{3+}$ | 2.20 | 2.00 | 2.00 | 2.20 | 2.20 | 2.20 | 2.20 | 2.20 |
| $Yb^{3+}$ | 0.00 | 0.00 | 0.00 | 0.00 | 0.00 | 0.00 | 0.00 | 0.00 |
| Σ $Ln^{3+}$ | 33.70 | 33.00 | 33.00 | 32.70 | 33.70 | 34.70 | 34.70 | 33.70 |
| $Ta^{5+}$ | 0.00 | 0.00 | 0.00 | 5.00 | 4.00 | 4.00 | 3.00 | 0.00 |
| $Zr^{4+}$ | 4.45 | 4.45 | 4.45 | 4.45 | 4.45 | 4.45 | 4.45 | 4.45 |
| $Ti^{4+}$ | 7.30 | 7.50 | 7.50 | 5.30 | 5.30 | 5.30 | 5.30 | 7.30 |
| $Nb^{5+}$ | 5.05 | 5.05 | 5.05 | 1.05 | 2.05 | 2.05 | 2.05 | 5.05 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| Σ HR | 16.80 | 17.00 | 17.00 | 15.80 | 15.80 | 15.80 | 14.80 | 16.80 |
| $Zn^{2+}$ | 5.50 | 5.50 | 5.50 | 7.50 | 6.50 | 5.50 | 6.50 | 5.50 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| Σ $R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.50 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 |
| $Ba^{2+}$ | 0.00 | 0.00 | 0.50 | 0.00 | 0.00 | 0.00 | 0.00 | 0.00 |
| Σ $R^{2+}$ | 0.00 | 0.50 | 0.50 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| Bubbles (pieces/kg) | 0 | 0 | 0 | 0 | 0 | 0 | 0 | 0 |
| nd | 1.91107 | 1.91271 | 1.9123 | 1.8964 | 1.8997 | 1.90149 | 1.89766 | 1.91458 |
| vd | 35.07 | 35.05 | 34.99 | 37.32 | 37.04 | 37.1 | 37.4 | 34.87 |
| Specific gravity | 5 | 4.99 | 5 | 5.24 | 5.21 | 5.23 | 5.19 | 5.02 |
| Pg, F | 0.58045 | 0.58833 | 0.58573 | 0.57993 | 0.5776 | 0.57654 | 0.57708 | 0.58063 |
| Tg (° C.) | 685 | — | — | — | 685 | 691 | 684 | 685 |
| Ts (° C.) | 733 | — | — | — | 736 | 743 | 738 | 737 |
| Liquidus temperature (° C.) | Less than 1175 | — | — | — | Less than 1200 | Less than 1200 | Less than 1200 | — |
| Viscosity at liquidus temperature (dPa·s) | 3.31 | — | — | — | — | — | — | — |

TABLE 1-2-continued

| No. (Cationic %) | 1-9 | 1-10 | 1-11 | 1-12 | 1-13 | 1-14 | 1-15 | 1-16 |
|---|---|---|---|---|---|---|---|---|
| λ 80 (nm) | 500 | 485 | 485 | 469 | 472 | 477 | 494 | 491 |
| λ 70 (nm) | 405 | 405 | 404 | 395 | 397 | 397 | 398 | 409 |
| λ 5 (nm) | 351 | 351 | 351 | 346 | 347 | 346 | 346 | 352 |

(Note 1)

Σ Ln3+ means a total content of La3+, Gd3+, Y3+, Yb3+, Sc3+ and Lu3+.

(Note 2)

Σ HR means a total content of Ta5+, Zr4+, Ti4+, Nb5+, W6+ and Bi3+.

(Note 3)

Σ R+ means a total content of Li+, Na+ and K+.

(Note 4)

Σ R2+ means a total content of Mg2+, Ca2+, Sr2+ and Ba2+.

(Note 5)

Sb represents an amount of Sb cation regardless of its valence.

TABLE 1-3

| No. (Cationic %) | 1-17 | 1-18 | 1-19 | 1-20 | 1-21 | 1-22 |
|---|---|---|---|---|---|---|
| $B^{3+}$ | 33.00 | 33.00 | 33.00 | 33.00 | 32.71 | 33.17 |
| $Si^{4+}$ | 11.00 | 11.00 | 11.00 | 11.00 | 11.09 | 11.06 |
| $Ge^{4+}$ | 0.00 | 0.00 | 0.00 | 0.00 | 0.00 | 0.00 |
| $La^{3+}$ | 25.50 | 25.50 | 25.50 | 25.50 | 25.46 | 25.11 |
| $Gd^{3+}$ | 6.00 | 6.00 | 6.00 | 6.00 | 6.05 | 6.03 |
| $Y^{3+}$ | 2.20 | 2.20 | 2.20 | 2.20 | 2.22 | 2.21 |
| $Yb^{3+}$ | 0.00 | 0.00 | 0.00 | 0.00 | 0.00 | 0.00 |
| $\Sigma Ln^{3+}$ | 33.70 | 33.70 | 33.70 | 33.70 | 33.73 | 33.35 |
| $Ta^{5+}$ | 0.00 | 0.00 | 0.00 | 0.00 | 0.00 | 0.00 |
| $Zr^{4+}$ | 4.45 | 4.45 | 4.45 | 4.45 | 4.48 | 4.47 |
| $Ti^{4+}$ | 7.30 | 7.30 | 7.30 | 7.30 | 7.36 | 7.34 |
| $Nb^{5+}$ | 5.05 | 5.05 | 5.05 | 5.05 | 5.09 | 5.08 |
| $W^{6+}$ | 0.00 | 0.00 | 0.00 | 0.00 | 0.00 | 0.00 |
| $Bi^{3+}$ | 0.00 | 0.00 | 0.00 | 0.00 | 0.00 | 0.00 |
| $\Sigma HR$ | 16.80 | 16.80 | 16.80 | 16.80 | 16.93 | 16.89 |
| $Zn^{2+}$ | 5.50 | 5.50 | 5.50 | 5.50 | 5.54 | 5.53 |
| $Li^{+}$ | 0.00 | 0.00 | 0.00 | 0.00 | 0.00 | 0.00 |
| $Na^{+}$ | 0.00 | 0.00 | 0.00 | 0.00 | 0.00 | 0.00 |
| $K^{+}$ | 0.00 | 0.00 | 0.00 | 0.00 | 0.00 | 0.00 |
| $\Sigma R^{+}$ | 0.00 | 0.00 | 0.00 | 0.00 | 0.00 | 0.00 |
| $Mg^{2+}$ | 0.00 | 0.00 | 0.00 | 0.00 | 0.00 | 0.00 |
| $Ca^{2+}$ | 0.00 | 0.00 | 0.00 | 0.00 | 0.00 | 0.00 |
| $Sr^{2+}$ | 0.00 | 0.00 | 0.00 | 0.00 | 0.00 | 0.00 |
| $Ba^{2+}$ | 0.00 | 0.00 | 0.00 | 0.00 | 0.00 | 0.00 |
| $\Sigma R^{2+}$ | 0.00 | 0.00 | 0.00 | 0.00 | 0.00 | 0.00 |
| Total | 100.00 | 100.00 | 100.00 | 100.00 | 100.00 | 100.00 |
| $CO_2$ in glass | contained | contained | contained | contained | contained | contained |
| $SO_3$ in glass | contained | contained | contained | contained | contained | contained |
| $CO_2$ (mass %) based on composition | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 |
| Bubbles (pieces/kg) | 0 | 0 | 0 | 0 | 0 | 0 |
| nd | 1.91261 | 1.91497 | 1.90443 | 1.90636 | 1.91236 | 1.91051 |
| νd | 35.01 | 34.92 | 35.26 | 35.23 | 35.01 | 35.06 |
| Specific gravity | 5.01 | 5.03 | 4.94 | 4.96 | 5 | 4.99 |
| Pg, F | 0.58343 | 0.58168 | 0.58441 | 0.58259 | 0.58327 | 0.58253 |
| Tg (° C.) | 683 | 684 | 886 | 687 | 683 | 682 |
| Ts (° C.) | 736 | 737 | 737 | 736 | 736 | 734 |
| Liquidus temperature (° C.) | Less than 1175 | — | Less than 1175 | Less than 1175 | Less than 1175 | Less than 1175 |
| Viscosity at liquidus temperature (dPa·s) | — | — | — | — | — | — |

TABLE 1-3-continued

| No. (Cationic %) | 1-17 | 1-18 | 1-19 | 1-20 | 1-21 | 1-22 |
|---|---|---|---|---|---|---|
| λ 80 (nm) | 487 | 493 | 479 | 482 | 487 | 486 |
| λ 70 (nm) | 407 | 408 | 405 | 405 | 404 | 403 |
| λ 5 (nm) | 351 | 351 | 352 | 352 | 352 | 352 |

(Note 1)
Σ Ln3+ means a total content of La3+, Gd3+, Y3+, Yb3+, So3+ and Lu3+.
(Note 2)
Σ HR means a total content of Ta5+, Zr4+, Ti4+, Nb5+, W6+ and Bi3+.
(Note 3)
Σ R+ means a total content of Li+, Na+ and K+.
(Note 4)
Σ R2+ means a total content of Mg2+, Ca2+, Sr2+ and Ba2+.
(Note 5)
Sb represents an amount of Sb cation regardless of its valence.

TABLE 2-1

| No. (Cationic %) | 2-1 | 2-2 | 2-3 | 2-4 | 2-5 | 2-6 | 2-7 | 2-8 |
|---|---|---|---|---|---|---|---|---|
| $B^{3+}$ | 27.80 | 27.80 | 27.80 | 27.80 | 27.80 | 27.80 | 27.80 | 27.80 |
| $Si^{4+}$ | 10.48 | 10.48 | 10.48 | 10.48 | 10.48 | 10.48 | 10.48 | 10.48 |
| $Ge^{4+}$ | 0.00 | 0.00 | 0.00 | 0.00 | 0.00 | 0.00 | 0.00 | 0.00 |
| $La^{3+}$ | 23.26 | 24.26 | 25.26 | 25.26 | 25.25 | 25.26 | 25.26 | 24.26 |
| $Gd^{3+}$ | 3.00 | 3.00 | 3.00 | 4.00 | 5.00 | 5.00 | 5.00 | 3.00 |
| $Y^{3+}$ | 1.10 | 1.10 | 1.10 | 1.10 | 1.10 | 2.00 | 1.10 | 1.10 |
| $Yb^{3+}$ | 0.00 | 0.00 | 0.00 | 0.00 | 0.00 | 0.00 | 0.00 | 0.00 |
| $\Sigma Ln^{3+}$ | 27.36 | 28.36 | 29.36 | 30.36 | 31.36 | 32.26 | 31.36 | 28.36 |
| $Ta^{5+}$ | 2.00 | 0.00 | 0.00 | 0.00 | 0.00 | 0.00 | 0.00 | 0.00 |
| $Zr^{4+}$ | 4.81 | 4.81 | 4.81 | 4.81 | 4.81 | 4.81 | 4.81 | 4.81 |
| $Ti^{4+}$ | 15.08 | 15.08 | 15.08 | 14.08 | 13.08 | 13.08 | 14.08 | 16.08 |
| $Nb^{5+}$ | 4.07 | 5.07 | 5.07 | 5.07 | 5.07 | 5.07 | 5.07 | 5.07 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| Σ HR | 25.96 | 24.96 | 24.96 | 23.96 | 22.96 | 22.96 | 23.96 | 25.96 |
| $Zn^{2+}$ | 3.44 | 3.44 | 3.44 | 3.44 | 3.44 | 3.44 | 3.44 | 3.44 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| $\Sigma R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 |
| $Ba^{2+}$ | 4.96 | 4.96 | 3.96 | 3.96 | 3.96 | 3.06 | 2.96 | 3.96 |
| $\Sigma R^{2+}$ | 4.96 | 4.96 | 3.96 | 3.96 | 3.96 | 3.06 | 2.96 | 3.96 |
| $Al^{3+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| Bubbles (pieces/kg) | 0 | 0 | 0 | 0 | 0 | 0 | 0 | 0 |
| nd | 1.95085 | 1.94938 | 1.95378 | 1.94958 | 1.94542 | 1.94831 | 1.95348 | 1.9574 |
| vd | 30.21 | 30.32 | 30.34 | 30.96 | 31.50 | 31.56 | 30.94 | 29.79 |
| $P_{g,F}$ | 0.59771 | 0.59534 | 0.59669 | 0.59700 | 0.59214 | 0.59468 | 0.59734 | 0.59863 |
| Specific gravity | 4.97 | 4.91 | 4.92 | 4.97 | 5.02 | 5.02 | 5.00 | 4.89 |
| Tg (° C.) | 688 | 686 | 690 | 694 | 695 | 698 | 694 | 687 |
| Ts (° C.) | 741 | 738 | 743 | 744 | 747 | 751 | 742 | 738 |
| Liquidus temperature (° C.) | Less than 1180 | Less than 1180 | Less than 1190 | Less than 1190 | Less than 1200 | Less than 1180 | Less than 1180 | Less than 1180 |

TABLE 2-1-continued

| No. (Cationic %) | 2-1 | 2-2 | 2-3 | 2-4 | 2-5 | 2-6 | 2-7 | 2-8 |
|---|---|---|---|---|---|---|---|---|
| λ 70 (nm) | 436 | 434 | 443 | 455 | 431 | 432 | 438 | 448 |
| λ 5 (nm) | 363 | 362 | 363 | 363 | 359 | 360 | 361 | 365 |

(Note 1)

$\Sigma Ln^{3+}$ means a total content of $La^{3+}$, $Gd^{3+}$, $Y^{3+}$, $Yb^{3+}$, $Sc^{3+}$ and $Lu^{3+}$.

(Note 2)

$\Sigma HR$ means a total content of $Ta^{5+}$, $Zr^{4+}$, $Ti^{4+}$, $Nb^{5+}$, $W^{6+}$ and $Bi^{3+}$.

(Note 3)

$\Sigma R^+$ means a total content of $Li^+$, $Na^+$ and $K^+$.

(Note 4)

$\Sigma R^{2+}$ means a total content of $Mg^{2+}$, $Ca^{2+}$, $Sr^{2+}$ and $Ba^{2+}$.

(Note 5)

Sb represents an amount of Sb cation regardless of its valence.

TABLE 2-2

| No. (Cationic %) | 2-9 | 2-10 | 2-11 | 2-12 | 2-13 | 2-14 | 2-15 | 2-16 |
|---|---|---|---|---|---|---|---|---|
| $B^{3+}$ | 27.80 | 27.80 | 28.76 | 27.80 | 27.80 | 27.80 | 27.80 | 27.80 |
| $Si^{4+}$ | 10.48 | 10.48 | 10.48 | 10.48 | 10.48 | 10.48 | 10.48 | 10.48 |
| $Ge^{4+}$ | 0.00 | 0.00 | 0.00 | 0.00 | 0.00 | 0.00 | 0.00 | 0.00 |
| $La^{3+}$ | 25.26 | 25.26 | 25.26 | 25.26 | 25.26 | 25.26 | 25.26 | 26.26 |
| $Gd^{3+}$ | 6.00 | 6.00 | 6.00 | 6.00 | 6.00 | 6.00 | 6.00 | 6.00 |
| $Y^{3+}$ | 1.10 | 2.10 | 2.10 | 2.00 | 2.00 | 2.00 | 2.00 | 2.00 |
| $Yb^{3+}$ | 0.00 | 0.00 | 0.00 | 0.00 | 0.00 | 0.00 | 0.00 | 0.00 |
| $\Sigma Ln^{3+}$ | 32.36 | 33.36 | 33.36 | 33.26 | 33.26 | 33.26 | 33.26 | 34.26 |
| $Ta^{5+}$ | 0.00 | 0.00 | 0.00 | 0.00 | 1.00 | 2.06 | 1.00 | 0.00 |
| $Zr^{4+}$ | 4.81 | 4.81 | 4.81 | 4.81 | 4.81 | 4.81 | 4.81 | 4.81 |
| $Ti^{4+}$ | 14.08 | 14.08 | 14.08 | 13.08 | 13.08 | 13.08 | 13.08 | 13.08 |
| $Nb^{5+}$ | 5.07 | 5.07 | 5.07 | 5.07 | 5.07 | 5.07 | 5.07 | 5.07 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| $\Sigma HR$ | 23.96 | 23.96 | 23.96 | 22.96 | 23.96 | 25.02 | 23.96 | 22.96 |
| $Zn^{2+}$ | 3.44 | 3.44 | 3.44 | 3.44 | 3.44 | 3.44 | 4.50 | 4.50 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| $\Sigma R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 |
| $Ba^{2+}$ | 1.96 | 0.96 | 0.00 | 2.06 | 1.06 | 0.00 | 0.00 | 0.00 |
| $\Sigma R^{2+}$ | 1.96 | 0.96 | 0.00 | 2.06 | 1.06 | 0.00 | 0.00 | 0.00 |
| $Al^{3+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| Bubbles (pieces/kg) | 0 | 0 | 0 | 0 | 0 | 0 | 0 | 0 |
| nd | 1.95744 | 1.96065 | 1.961 | 1.9525 | 1.95901 | 1.9656 | 1.9618 | 1.95955 |
| νd | 30.89 | 30.87 | 30.80 | 31.44 | 31.17 | 30.82 | 31.01 | 31.37 |
| $P_{g,F}$ | 0.59516 | 0.59512 | 0.59551 | 0.59208 | 0.59376 | 0.59464 | 0.590909 | 0.594312 |
| Specific gravity | 5.03 | 5.03 | 5.01 | 5.05 | 5.09 | 5.13 | 5.09 | 5.07 |
| Tg (° C.) | 697 | 700 | 697 | 700 | 700 | 699 | 694 | 698 |
| Ts (° C.) | 750 | 751 | 750 | 753 | 753 | 753 | 749 | 751 |
| Liquidus temperature (° C.) | Less than 1180 | Less than 1180 | Less than 1180 | Less than 1200 | Less than 1190 | Less than 1220 | Less than 1190 | Less than 1200 |

TABLE 2-2-continued

| No. (Cationic %) | 2-9 | 2-10 | 2-11 | 2-12 | 2-13 | 2-14 | 2-15 | 2-16 |
|---|---|---|---|---|---|---|---|---|
| λ70 (nm) | 433 | 434 | 437 | 427 | 431 | 435 | 434 | 431 |
| λ5 (nm) | 361 | 362 | 363 | 359 | 361 | 362 | 362 | 360 |

(Note 1)

Σ $Ln^{3+}$ means a total content of $La^{3+}$, $Gd^{3+}$, $Y^{3+}$, $Yb^{3+}$, $Sc^{3+}$ and $Lu^{3+}$.

(Note 2)

Σ HR means a total content of $Ta^{5+}$, $Zr^{4+}$, $Ti^{4+}$, $Nb^{5+}$, $W^{6+}$ and $Bi^{3+}$.

(Note 3)

Σ $R^+$ means a total content of $Li^+$, $Na^+$ and $K^+$.

(Note 4)

Σ $R^{2+}$ means a total content of $Mg^{2+}$, $Ca^{2+}$, $Sr^{2+}$ and $Ba^{2+}$.

(Note 5)

Sb represents an amount of Sb cation regardless of its valence.

TABLE 2-3

| No. (Cationic %) | 2-17 | 2-18 | 2-19 | 2-20 | 2-21 | 2-22 | 2-23 | 2-24 |
|---|---|---|---|---|---|---|---|---|
| $B^{3+}$ | 27.80 | 28.76 | 27.80 | 27.80 | 27.80 | 27.76 | 26.76 | 25.76 |
| $Si^{4+}$ | 10.48 | 10.48 | 10.48 | 10.48 | 10.48 | 10.48 | 10.48 | 10.48 |
| $Ge^{4+}$ | 0.00 | 0.00 | 0.00 | 0.00 | 0.00 | 0.00 | 0.00 | 0.00 |
| $La^{3+}$ | 25.26 | 27.36 | 25.26 | 25.26 | 25.26 | 25.26 | 25.26 | 25.26 |
| $Gd^{3+}$ | 6.00 | 6.00 | 6.00 | 6.00 | 6.00 | 6.00 | 6.00 | 6.00 |
| $Y^{3+}$ | 3.00 | 0.00 | 3.06 | 2.10 | 3.06 | 2.10 | 2.10 | 2.10 |
| $Yb^{3+}$ | 0.00 | 0.00 | 0.00 | 0.00 | 0.00 | 0.00 | 0.00 | 0.00 |
| Σ $Ln^{3+}$ | 34.26 | 33.36 | 34.32 | 33.36 | 34.32 | 33.36 | 33.36 | 33.36 |
| $Ta^{5+}$ | 0.00 | 0.00 | 0.00 | 0.00 | 0.00 | 0.00 | 0.00 | 0.00 |
| $Zr^{4+}$ | 4.81 | 4.81 | 4.81 | 4.81 | 4.81 | 4.81 | 4.81 | 4.81 |
| $Ti^{4+}$ | 13.08 | 14.08 | 14.08 | 13.08 | 13.08 | 15.08 | 16.08 | 17.08 |
| $Nb^{5+}$ | 5.07 | 5.07 | 5.07 | 5.07 | 5.07 | 5.07 | 5.07 | 5.07 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| Σ HR | 22.96 | 23.96 | 23.96 | 22.96 | 22.96 | 24.96 | 25.96 | 26.96 |
| $Zn^{2+}$ | 4.50 | 3.44 | 3.44 | 4.44 | 4.44 | 3.44 | 3.44 | 3.44 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| Σ $R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 |
| $Ba^{2+}$ | 0.00 | 0.00 | 0.00 | 0.96 | 0.00 | 0.00 | 0.00 | 0.00 |
| Σ $R^{2+}$ | 0.00 | 0.00 | 0.00 | 0.96 | 0.00 | 0.00 | 0.00 | 0.00 |
| $Al^{3+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| Bubbles (pieces/kg) | 0 | 0 | 0 | 0 | 0 | 0 | 0 | 0 |
| nd | 1.95862 | 1.96311 | 1.36422 | 1.95560 | 1.95877 | 1.96893 | 1.97672 | 1.98449 |
| νd | 31.36 | 30.8 | 30.83 | 31.37 | 31.33 | 30.28 | 29.74 | 29.22 |
| $P_{g,F}$ | 0.594701 | 0.595139 | 0.59463 | 0.59324 | 0.59248 | 0.59906 | 0.59866 | 0.59929 |
| Specific gravity | 5.05 | 5.04 | 5.03 | 5.04 | 5.05 | 5.02 | 5.02 | 5.03 |
| Tg (° C.) | 699 | 697 | 702 | 694 | 698 | 699 | 702 | 705 |
| Ts (° C.) | 750 | 748 | 753 | 746 | 752 | 751 | 752 | 758 |
| Liquidus temperature (° C.) | Less than 1190 | Less than 1200 | — | — | — | Less than 1180 | Less than 1180 | — |

TABLE 2-3-continued

| No. (Cationic %) | 2-17 | 2-18 | 2-19 | 2-20 | 2-21 | 2-22 | 2-23 | 2-24 |
|---|---|---|---|---|---|---|---|---|
| λ 70 (nm) | 431 | 433 | 436 | 430 | 431 | 444 | 451 | 455 |
| λ 5 (nm) | 360 | 362 | 362 | 360 | 360 | 365 | 366 | 367 |

(Note 1)
Σ Ln3+ means a total content of La3+, Gd3+, Y3+, Yb3+, Sc3+ and Lu3+.
(Note 2)
Σ HR means a total content of Ta5+, Zr4+, Ti4+, Nb5+. W6+ and Bi3+.
(Note 3)
Σ R+ means a total content of Li+, Na+ and K+.
(Note 4)
Σ R2+ means a total content of Mg2+, Ca2+, Sr2+ and Ba2+.
(Note 5)
Sb represents an amount of Sb cation regardless of its valence.

TABLE 2-4

| No. (Cationic %) | 2-25 | 2-26 | 2-27 | 2-28 |
|---|---|---|---|---|
| $B^{3+}$ | 25.76 | 26.76 | 26.76 | 26.76 |
| $Si^{4+}$ | 10.48 | 9.48 | 9.48 | 10.48 |
| $Ge^{4+}$ | 0.00 | 0.00 | 0.00 | 0.00 |
| $La^{3+}$ | 25.26 | 25.26 | 25.26 | 25.26 |
| $Gd^{3+}$ | 6.00 | 6.00 | 6.00 | 6.00 |
| $Y^{3+}$ | 2.10 | 2.10 | 2.10 | 2.10 |
| $Yb^{3+}$ | 0.00 | 0.00 | 0.00 | 0.00 |
| Σ $Ln^{3+}$ | 33.36 | 33.36 | 33.36 | 33.36 |
| $Ta^{5+}$ | 0.00 | 0.00 | 0.00 | 0.00 |
| $Zr^{4+}$ | 4.81 | 4.81 | 4.81 | 4.81 |
| $Ti^{4+}$ | 16.08 | 16.08 | 17.08 | 17.08 |
| $Nb^{5+}$ | 6.07 | 6.07 | 5.07 | 5.07 |
| $W^{6+}$ | 0.00 | 0.00 | 0.00 | 0.00 |
| $Bi^{3+}$ | 0.00 | 0.00 | 0.00 | 0.00 |
| Σ HR | 26.96 | 26.96 | 26.96 | 26.96 |
| $Zn^{2+}$ | 3.44 | 3.44 | 3.44 | 2.44 |
| $Li^+$ | 0.00 | 0.00 | 0.00 | 0.00 |
| $Na^+$ | 0.00 | 0.00 | 0.00 | 0.00 |
| $K^+$ | 0.00 | 0.00 | 0.00 | 0.00 |
| Σ $R^+$ | 0.00 | 0.00 | 0.00 | 0.00 |
| $Mg^{2+}$ | 0.00 | 0.00 | 0.00 | 0.00 |
| $Ca^{2+}$ | 0.00 | 0.00 | 0.00 | 0.00 |
| $Sr^{2+}$ | 0.00 | 0.00 | 0.00 | 0.00 |
| $Ba^{2+}$ | 0.00 | 0.00 | 0.00 | 0.00 |
| Σ $R^{2+}$ | 0.00 | 0.00 | 0.00 | 0.00 |
| $Al^{3+}$ | 0.00 | 0.00 | 0.00 | 0.00 |
| Total | 100.00 | 100.00 | 100.00 | 100.00 |
| $CO_2$ in glass | contained | contained | contained | contained |
| $SO_3$ in glass | contained | contained | contained | contained |

TABLE 2-4-continued

| No. (Cationic %) | 2-25 | 2-26 | 2-27 | 2-28 |
|---|---|---|---|---|
| $CO_2$ (mass %) based on composition | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 |
| Sb | 0.00 | 0.00 | 0.00 | 0.00 |
| Bubbles (pieces/kg) | 0 | 0 | 0 | 0 |
| nd | 1.98412 | 1.98602 | 1.98643 | 1.98151 |
| νd | 29.38 | 29.31 | 29.24 | 29.29 |
| $P_{g,F}$ | 0.60119 | 0.60048 | 0.60285 | 0.60042 |
| Specific gravity | 5.04 | 5.05 | 5.04 | 5.01 |
| Tg (° C.) | 704 | 701 | 702 | 707 |
| Ts (° C.) | 753 | 749 | 750 | 757 |
| Liquidus temperature (° C.) | — | — | — | Less than 1180 |
| λ 70 (nm) | 453 | 453 | 455 | 457 |
| λ 5 (nm) | 367 | 367 | 367 | 367 |

(Note 1)
Σ Ln3+ means a total content of La3+, Gd3+, Y3+, Yb3+, Sc3+ and Lu3+.
(Note 2)
Σ HR means a total content of Ta5+, Zr4+, Ti4+, Nb5+, W6+ and Bi3+.
(Note 3)
Σ R+ means a total content of Li+, Na+ and K+.
(Note 4)
Σ R2+ means a total content of Mg2+, Ca2+, Sr2+ and Ba2+.
(Note 5)
Sb represents an amount of Sb cation regardless of its valence.

TABLE 2-5

| No. (Cationic %) | 2-29 | 2-30 | 2-31 | 2-32 | 2-33 | 2-34 | 2-35 | 2-36 |
|---|---|---|---|---|---|---|---|---|
| $B^{3+}$ | 26.76 | 26.76 | 27.76 | 27.76 | 25.76 | 25.76 | 25.76 | 25.76 |
| $Si^{4+}$ | 9.48 | 9.48 | 8.48 | 8.48 | 10.48 | 10.48 | 10.48 | 10.48 |
| $Ge^{4+}$ | 0.00 | 0.00 | 0.00 | 0.00 | 0.00 | 0.00 | 0.00 | 0.00 |
| $La^{3+}$ | 25.26 | 25.26 | 25.26 | 26.26 | 25.26 | 26.26 | 26.26 | 26.26 |
| $Gd^{3+}$ | 6.00 | 6.00 | 6.00 | 6.00 | 6.00 | 6.00 | 5.00 | 6.00 |
| $Y^{3+}$ | 2.10 | 2.10 | 2.10 | 2.10 | 2.10 | 1.10 | 2.10 | 1.10 |
| $Yb^{3+}$ | 0.00 | 0.00 | 0.00 | 0.00 | 0.00 | 0.00 | 0.00 | 0.00 |
| Σ $Ln^{3+}$ | 33.36 | 33.36 | 33.36 | 34.36 | 33.36 | 33.36 | 33.36 | 33.36 |
| $Ta^{5+}$ | 0.00 | 0.00 | 0.00 | 0.00 | 0.00 | 0.00 | 0.00 | 0.00 |
| $Zr^{4+}$ | 4.81 | 4.81 | 4.81 | 4.81 | 4.81 | 4.81 | 4.81 | 4.81 |
| $Ti^{4+}$ | 15.08 | 14.08 | 14.08 | 14.08 | 17.08 | 16.08 | 16.08 | 17.08 |
| $Nb^{5+}$ | 7.07 | 8.07 | 8.07 | 8.07 | 6.07 | 6.07 | 6.07 | 6.07 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| Σ HR | 26.96 | 26.96 | 26.96 | 26.96 | 27.96 | 26.96 | 26.96 | 27.96 |
| $Zn^{2+}$ | 3.44 | 3.44 | 3.44 | 2.44 | 2.44 | 3.44 | 3.44 | 2.44 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| Σ $R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |

TABLE 2-5-continued

| No. (Cationic %) | 2-29 | 2-30 | 2-31 | 2-32 | 2-33 | 2-34 | 2-35 | 2-36 |
|---|---|---|---|---|---|---|---|---|
| $Sr^{2+}$ | 0.00 | 0.00 | 0.00 | 0.00 | 0.00 | 0.00 | 0.00 | 0.00 |
| $Ba^{2+}$ | 0.00 | 0.00 | 0.00 | 0.00 | 0.00 | 0.00 | 0.00 | 0.00 |
| $\Sigma R^{2+}$ | 0.00 | 0.00 | 0.00 | 0.00 | 0.00 | 0.00 | 0.00 | 0.00 |
| $Al^{3+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| Bubbles (pieces/kg) | 0 | 0 | 0 | 0 | 0 | 0 | 0 | 0 |
| nd | 1.98587 | 1.98552 | 1.98739 | 1.98856 | 1.98902 | 1.98487 | 1.98391 | 1.98993 |
| νd | 29.41 | 29.52 | 29.47 | 29.58 | 28.93 | 29.37 | 29.38 | 28.94 |
| $P_{g,F}$ | 0.59905 | 0.59808 | 0.59851 | 0.59844 | 0.60164 | 0.59976 | 0.59928 | 0.60129 |
| Specific gravity | 5.06 | 5.07 | 5.08 | 5.10 | 5.02 | 5.06 | 5.03 | 5.04 |
| Tg (° C.) | 700 | 698 | 696 | 703 | 706 | 706 | 704 | 707 |
| Ts (° C.) | 753 | 751 | 747 | 754 | 758 | 755 | 755 | 757 |
| Liquidus temperature (° C.) | — | — | — | — | — | — | — | Less than 1180 |
| λ 70 (nm) | 447 | 452 | 447 | 481 | 465 | 451 | 448 | 458 |
| λ 5 (nm) | 365 | 365 | 365 | 361 | 368 | 366 | 366 | 368 |

(Note 1)
$\Sigma Ln3+$ means a total content of La3+, Gd3+, Y3+, Yb3+, Sc3+ and Lu3+.
(Note 2)
$\Sigma HR$ means a total content of Ta5+, Zr4+, Ti4+, Nb5+, W6+ and Bi3+.
(Note 3)
$\Sigma R+$ means a total content of Li+, Na+ and K+,
(Note 4)
$\Sigma R2+$ means a total content of Mg2+, Ca2+, Sr2+ and Ba2+.
(Note 5)
Sb represents an amount of Sb cation regardless of its valence.

TABLE 2-6

| No. (Cationic %) | 2-37 | 2-38 | 2-39 | 2-40 | 2-41 | 2-42 | 2-43 | 2-44 |
|---|---|---|---|---|---|---|---|---|
| $B^{3+}$ | 25.76 | 25.76 | 25.76 | 24.76 | 24.76 | 24.76 | 23.76 | 23.76 |
| $Si^{4+}$ | 10.48 | 10.48 | 10.48 | 10.48 | 10.48 | 10.48 | 10.48 | 10.48 |
| $Ge^{4+}$ | 0.00 | 0.00 | 0.00 | 0.00 | 0.00 | 0.00 | 0.00 | 0.00 |
| $La^{3+}$ | 27.36 | 26.26 | 27.26 | 28.36 | 27.36 | 27.36 | 27.36 | 27.86 |
| $Gd^{3+}$ | 6.00 | 7.10 | 5.00 | 6.00 | 7.00 | 6.00 | 6.00 | 6.00 |
| $Y^{3+}$ | 0.00 | 0.00 | 1.10 | 0.00 | 0.00 | 1.00 | 2.00 | 1.50 |
| $Yb^{3+}$ | 0.00 | 0.00 | 0.00 | 0.00 | 0.00 | 0.00 | 0.00 | 0.00 |
| $\Sigma Ln^{3+}$ | 33.36 | 33.36 | 33.36 | 34.36 | 34.36 | 34.36 | 35.36 | 35.36 |
| $Ta^{5+}$ | 0.00 | 0.00 | 0.00 | 0.00 | 0.00 | 0.00 | 0.00 | 0.00 |
| $Zr^{4+}$ | 4.81 | 4.81 | 4.81 | 4.81 | 4.81 | 4.81 | 4.81 | 4.81 |
| $Ti^{4+}$ | 17.08 | 17.08 | 17.08 | 17.08 | 17.08 | 17.08 | 17.08 | 17.08 |
| $Nb^{5+}$ | 6.07 | 6.07 | 6.07 | 6.07 | 6.07 | 6.07 | 6.07 | 6.07 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| $\Sigma HR$ | 27.96 | 27.96 | 27.96 | 27.96 | 27.96 | 27.96 | 27.96 | 27.96 |
| $Zn^{2+}$ | 2.44 | 2.44 | 2.44 | 2.44 | 2.44 | 2.44 | 2.44 | 2.44 |
| $Li^+$ | 0.00 | 0.00 | 0.00 | 0.00 | 0.00 | 0.00 | 0.00 | 0.00 |
| Na | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| $\Sigma R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 |
| $Ba^{2+}$ | 0.00 | 0.00 | 0.00 | 0.00 | 0.00 | 0.00 | 0.00 | 0.00 |
| $\Sigma R^{2+}$ | 0.00 | 0.00 | 0.00 | 0.00 | 0.00 | 0.00 | 0.00 | 0.00 |
| $Al^{3+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |

TABLE 2-6-continued

| No. (Cationic %) | 2-37 | 2-38 | 2-39 | 2-40 | 2-41 | 2-42 | 2-43 | 2-44 |
|---|---|---|---|---|---|---|---|---|
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| Bubbles (pieces/kg) | 0 | 0 | 0 | 0 | 0 | 0 | 0 | 0 |
| nd | 1.99104 | 1.99110 | 1.99009 | 1.99481 | 1.99477 | 1.99390 | 1.99624 | 1.99693 |
| vd | 28.94 | 28.92 | 28.93 | 28.99 | 29.00 | 29.00 | 29.08 | 29.06 |
| $P_{g,F}$ | 0.60088 | 0.60140 | 0.60053 | 0.59983 | 0.60117 | 0.60082 | 0.60041 | 0.60041 |
| Specific gravity | 5.06 | 5.08 | 5.03 | 5.10 | 5.12 | 5.09 | 5.11 | 5.12 |
| Tg (° C.) | 708 | 708 | 705 | 713 | 711 | 713 | 712 | 714 |
| Ts (° C.) | 757 | 757 | 756 | 762 | 761 | 761 | 767 | 768 |
| Liquidus temperature (° C.) | Less than 1180 | — | Less than 1180 | — | — | Less than 1180 | — | — |
| λ 70 (nm) | 460 | 462 | 460 | 451 | 452 | 450 | 451 | 451 |
| λ 5 (nm) | 368 | 368 | 368 | 367 | 367 | 367 | 367 | 367 |

(Note 1)
Σ Ln3+ means a total content of La3+, Gd3+, Y3+, Yb3+, Sc3+ and Lu3+.
(Note 2)
Σ HR means a total content of Ta5+, Zr4+, Ti4+, Nb5+, W6+ and Bi3+.
(Note 3)
Σ R+ means a total content of Li+, Na+ and K+.
(Note 4)
Σ R2+ means a total content of Mg2+, Ca2+, Sr2+ and Ba2+.
(Note 5)
Sb represents an amount of Sb cation regardless of its valence.

TABLE 2-7

| No. (Cationic %) | 2-45 | 2-46 | 2-47 | 2-48 | 2-49 | 2-50 | 2-51 | 2-52 |
|---|---|---|---|---|---|---|---|---|
| $B^{3+}$ | 23.76 | 22.76 | 23.76 | 23.76 | 23.76 | 23.76 | 23.26 | 23.26 |
| $Si^{4+}$ | 10.48 | 10.48 | 10.48 | 10.48 | 10.48 | 10.48 | 10.48 | 10.48 |
| $Ge^{4+}$ | 0.00 | 0.00 | 0.00 | 0.00 | 0.00 | 0.00 | 0.00 | 0.00 |
| $La^{3+}$ | 27.36 | 27.36 | 28.36 | 27.36 | 28.80 | 28.36 | 29.30 | 28.80 |
| $Gd^{3+}$ | 6.00 | 6.00 | 6.00 | 7.00 | 6.00 | 6.44 | 6.00 | 6.50 |
| $Y^{3+}$ | 1.00 | 1.00 | 1.00 | 1.00 | 1.00 | 1.00 | 1.00 | 1.00 |
| $Yb^{3+}$ | 0.00 | 0.00 | 0.00 | 0.00 | 0.00 | 0.00 | 0.00 | 0.00 |
| Σ $Ln^{3+}$ | 34.36 | 34.36 | 35.36 | 35.36 | 35.80 | 35.80 | 36.30 | 36.30 |
| $Ta^{a+}$ | 0.00 | 0.00 | 0.00 | 0.00 | 0.00 | 0.00 | 0.00 | 0.00 |
| $Zr^{4+}$ | 4.81 | 4.81 | 4.81 | 4.81 | 4.81 | 4.81 | 4.81 | 4.81 |
| $Ti^{4+}$ | 17.08 | 17.08 | 17.08 | 17.08 | 17.08 | 17.08 | 17.08 | 17.08 |
| $Nb^{5+}$ | 6.07 | 6.07 | 6.07 | 6.07 | 6.07 | 6.07 | 6.07 | 6.07 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| Σ HR | 27.96 | 27.96 | 27.96 | 27.96 | 27.96 | 27.96 | 27.96 | 27.96 |
| $Zn^{2+}$ | 3.44 | 4.44 | 2.44 | 2.44 | 2.00 | 2.00 | 2.00 | 2.00 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| Σ $R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 |
| $Ba^{2+}$ | 0.00 | 0.00 | 0.00 | 0.00 | 0.00 | 0.00 | 0.00 | 0.00 |
| Σ $R^{2+}$ | 0.00 | 0.00 | 0.00 | 0.00 | 0.00 | 0.00 | 0.00 | 0.00 |
| $Al^{3+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| Bubbles (pieces/kg) | 0 | 0 | 0 | 0 | 0 | 0 | 0 | 0 |
| nd | 1.99631 | 1.99896 | 1.99726 | 1.99749 | 1.99794 | 1.99777 | 1.99930 | 1.99946 |
| vd | 28.98 | 28.91 | 29.07 | 29.04 | 29.11 | 29.11 | 29.16 | 29.16 |
| $P_{g,F}$ | 0.60064 | 0.60029 | 0.60029 | 0.60000 | 0.60035 | 0.60023 | 0.59965 | 0.59977 |
| Specific gravity | 5.11 | 5.13 | 5.12 | 5.14 | 5.13 | 5.14 | 5.15 | 5.16 |
| Tg (° C.) | 708 | 706 | 714 | 718 | 722 | 720 | 720 | 724 |
| Ts (° C.) | 762 | 762 | 768 | 768 | 772 | 771 | 773 | 774 |

TABLE 2-7-continued

| No. (Cationic %) | 2-45 | 2-46 | 2-47 | 2-48 | 2-49 | 2-50 | 2-51 | 2-52 |
|---|---|---|---|---|---|---|---|---|
| Liquidus temperature (° C.) | — | — | — | Less than 1190 | Less than 1190 | Less than 1190 | — | — |
| λ 70 (nm) | 451 | 454 | 450 | 450 | 450 | 448 | 450 | 451 |
| λ 5 (nm) | 367 | 367 | 367 | 367 | 366 | 366 | 366 | 366 |

(Note 1)

Σ Ln3+ means a total content of La3+, Gd3+, Y3+, Yb3+, Sc3+ and Lu3+.

(Note 2)

Σ HR means a total content of Ta5+, Zr4+, Ti4+, Nb5+, W6+ and Bi3+.

(Note 3)

Σ R+ means a total content of Li+, Na+ and K+.

(Note 4)

Σ R2+ means a total content of Mg2+, Ca2+, Sr2+ and Ba2+.

(Note 5)

Sb represents an amount of Sb cation regardless of its valence.

TABLE 2-8

| No. (Cationic %) | 2-53 | 2-54 | 2-55 | 2-56 | 2-57 | 2-58 | 2-59 | 2-60 |
|---|---|---|---|---|---|---|---|---|
| $B^{3+}$ | 23.26 | 24.01 | 24.26 | 23.76 | 23.76 | 23.76 | 23.76 | 23.76 |
| $Si^{4+}$ | 10.48 | 10.23 | 9.98 | 10.48 | 10.48 | 10.48 | 10.48 | 10.48 |
| $Ge^{4+}$ | 0.00 | 0.00 | 0.00 | 0.00 | 0.00 | 0.00 | 0.00 | 0.00 |
| $La^{3+}$ | 28.80 | 28.80 | 28.80 | 28.80 | 28.30 | 28.80 | 29.30 | 28.80 |
| $Gd^{3+}$ | 6.00 | 6.00 | 6.00 | 6.00 | 6.00 | 5.50 | 6.00 | 6.00 |
| $Y^{3+}$ | 1.50 | 1.00 | 1.00 | 0.75 | 1.00 | 1.00 | 0.50 | 1.00 |
| $Yb^{3+}$ | 0.00 | 0.00 | 0.00 | 0.00 | 0.00 | 0.00 | 0.00 | 0.00 |
| $\Sigma Ln^{3+}$ | 36.30 | 35.80 | 35.80 | 35.55 | 35.30 | 35.30 | 35.80 | 35.80 |
| $Ta^{5+}$ | 0.00 | 0.00 | 0.00 | 0.00 | 0.00 | 0.00 | 0.00 | 0.00 |
| $Zr^{4+}$ | 4.81 | 4.81 | 4.81 | 5.06 | 5.31 | 5.31 | 4.81 | 4.81 |
| $Ti^{4+}$ | 17.08 | 17.08 | 17.08 | 17.08 | 17.08 | 17.08 | 17.08 | 17.08 |
| $Nb^{5+}$ | 6.07 | 6.07 | 6.07 | 6.07 | 6.07 | 6.07 | 6.07 | 6.07 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| $\Sigma HR$ | 27.96 | 27.96 | 27.96 | 28.21 | 28.46 | 28.46 | 27.96 | 27.96 |
| $Zn^{2+}$ | 2.00 | 2.00 | 2.00 | 2.00 | 2.00 | 2.00 | 2.00 | 2.00 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| $\Sigma R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 |
| $Ba^{2+}$ | 0.00 | 0.00 | 0.00 | 0.00 | 0.00 | 0.00 | 0.00 | 0.00 |
| $\Sigma R^{2+}$ | 0.00 | 0.00 | 0.00 | 0.00 | 0.00 | 0.00 | 0.00 | 0.00 |
| $Al^{3+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| Bubbles (pieces/kg) | 0 | 0 | 0 | 0 | 0 | 0 | 0 | 0 |
| nd | 1.99890 | 1.99844 | 1.99910 | 1.99881 | 1.99882 | 1.99908 | 1.99866 | 1.99816 |
| vd | 29.16 | 29.13 | 29.11 | 29.09 | 29.11 | 29.09 | 29.14 | 29.12 |
| $P_{g,F}$ | 0.59953 | 0.59965 | 0.59965 | 0.59977 | 0.60187 | 0.60058 | 0.59936 | 0.59918 |
| Specific gravity | 5.14 | 5.14 | 5.14 | 5.14 | 5.12 | 5.12 | 5.14 | — |
| Tg (° C.) | 722 | 718 | 720 | 722 | 713 | 716 | 719 | — |
| Ts (° C.) | 772 | 770 | 769 | 770 | 771 | 770 | 770 | — |
| Liquidus temperature (° C.) | — | — | — | — | — | — | — | — |

TABLE 2-8-continued

| No. (Cationic %) | 2-53 | 2-54 | 2-55 | 2-56 | 2-57 | 2-58 | 2-59 | 2-60 |
|---|---|---|---|---|---|---|---|---|
| λ 70 (nm) | 449 | 450 | 450 | 448 | 449 | 449 | 447 | 468 |
| λ 5 (nm) | 366 | 366 | 366 | 366 | 366 | 366 | 366 | 374 |

(Note 1)

Σ $Ln^{3+}$ means a total content of $La^{3+}$, $Gd^{3+}$, $Y^{3+}$, $Yb^{3+}$, $Sc^{3+}$ and $Lu^{3+}$, (Note 2)

Σ HR means a total content of $Ta^{5+}$, $Zr^{4+}$, $Ti^{4+}$, $Nb^{5+}$, $W^{6+}$ and $Bi^{3+}$.

(Note 3)

Σ $R^+$ means a total content of $Li^+$, $Na^+$ and $K^+$.

(Note 4)

Σ $R^{2+}$ means a total content of $Mg^{2+}$, $Ca^{2+}$, $Sr^{2+}$ and $Ba^{2+}$, (Note 5)

Sb represents an amount of Sb cation regardless of its valence.

TABLE 2-9

| No. (Cationic %) | 2-61 | 2-62 | 2-63 | 2-64 | 2-65 | 2-66 | 2-67 | 2-68 |
|---|---|---|---|---|---|---|---|---|
| $B^{3+}$ | 23.76 | 23.76 | 23.76 | 23.76 | 23.76 | 23.76 | 23.76 | 23.76 |
| $Si^{4+}$ | 10.48 | 10.48 | 10.48 | 10.48 | 10.48 | 10.48 | 10.48 | 10.48 |
| $Ge^{4+}$ | 0.00 | 0.00 | 0.00 | 0.00 | 0.00 | 0.00 | 0.00 | 0.00 |
| $La^{3+}$ | 28.30 | 28.80 | 28.80 | 28.80 | 28.05 | 28.80 | 28.80 | 28.05 |
| $Gd^{3+}$ | 6.00 | 5.50 | 6.00 | 6.00 | 6.00 | 5.25 | 6.00 | 6.00 |
| $Y^{3+}$ | 1.00 | 1.00 | 0.50 | 1.00 | 1.00 | 1.00 | 0.25 | 1.00 |
| $Yb^{3+}$ | 0.00 | 0.00 | 0.00 | 0.00 | 0.00 | 0.00 | 0.00 | 0.00 |
| Σ $Ln^{3+}$ | 35.30 | 35.30 | 35.30 | 35.80 | 35.05 | 35.05 | 35.05 | 35.05 |
| $Ta^{5+}$ | 0.00 | 0.00 | 0.00 | 0.00 | 0.00 | 0.00 | 0.00 | 0.00 |
| $Zr^{4+}$ | 4.81 | 4.81 | 4.81 | 4.81 | 4.81 | 4.81 | 4.81 | 4.81 |
| $Ti^{4+}$ | 17.08 | 17.08 | 17.08 | 17.08 | 17.08 | 17.08 | 17.08 | 17.83 |
| $Nb^{5+}$ | 6.57 | 6.57 | 6.57 | 6.07 | 6.82 | 6.82 | 6.82 | 6.07 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| Σ HR | 28.46 | 28.46 | 28.46 | 27.96 | 28.71 | 28.71 | 28.71 | 28.71 |
| $Zn^{2+}$ | 2.00 | 2.00 | 2.00 | 2.00 | 2.00 | 2.00 | 2.00 | 2.00 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| Σ $R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 |
| $Ba^{2+}$ | 0.00 | 0.00 | 0.00 | 0.00 | 0.00 | 0.00 | 0.00 | 0.00 |
| Σ $R^{2+}$ | 0.00 | 0.00 | 0.00 | 0.00 | 0.00 | 0.00 | 0.00 | 0.00 |
| $Al^+$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| Bubbles (pieces/kg) | 0 | 0 | 0 | 0 | 0 | 0 | 0 | 0 |
| nd | 1.99997 | 2.00001 | 2.00047 | 1.99818 | 2.00114 | 2.00114 | 2.00169 | 2.00134 |
| νd | 28.93 | 28.91 | 28.91 | 29.12 | 28.78 | 28.81 | 28.82 | 28.68 |
| $P_{g,F}$ | 0.60081 | 0.59988 | 0.59983 | 0.59947 | 0.59977 | 0.60058 | 0.60098 | 0.59954 |
| Specific gravity | 5.13 | 5.12 | 5.14 | 5.14 | 5.12 | 5.11 | 5.14 | 5.11 |
| Ts (° C.) | 716 | 719 | 716 | 719 | 718 | 719 | 717 | 717 |
| Ts (° C.) | 768 | 768 | 767 | 770 | 768 | 766 | 766 | 767 |
| Liquidus temperature (° C.) | — | — | — | — | — | — | — | — |

TABLE 2-9-continued

| No. (Cationic %) | 2-61 | 2-62 | 2-63 | 2-64 | 2-65 | 2-66 | 2-67 | 2-68 |
|---|---|---|---|---|---|---|---|---|
| λ 70 (nm) | 465 | 464 | 465 | 457 | 467 | 467 | 470 | 469 |
| λ 5 (nm) | 369 | 369 | 369 | 368 | 370 | 370 | 370 | 370 |

(Note 1)
Σ Ln3+ means a total content of La3+, Gd3+, Y3+, Yb3+, Sc3+ and Lu3+.
(Note 2)
Σ HR means a total content of Ta5+, Zr4+, Ti4+, Nb5+, W6+ and Bi3+.
(Note 3)
Σ R+ means a total content of Li+, Na+ and K+.
(Note 4)
Σ R2+ means a total content of Mg2+, Ca2+, Sr2+ and Ba2+.
(Note 5)
Sb represents an amount of Sb cation regardless of its valence.

TABLE 2-10

| No. (Cationic %) | 2-69 | 2-70 |
|---|---|---|
| $B^{3+}$ | 23.76 | 23.76 |
| $Si^{4+}$ | 10.48 | 10.48 |
| $Ge^{4+}$ | 0.00 | 0.00 |
| $La^{3+}$ | 28.80 | 28.80 |
| $Gd^{3+}$ | 5.25 | 6.00 |
| $Y^{3+}$ | 1.00 | 0.25 |
| $Yb^{3+}$ | 0.00 | 0.00 |
| $\Sigma Ln^{3+}$ | 35.05 | 35.05 |
| $Ta^{5+}$ | 0.00 | 0.00 |
| $Zr^{4+}$ | 4.81 | 4.81 |
| $Ti^{4+}$ | 17.83 | 17.83 |
| $Nb^{5+}$ | 6.07 | 6.07 |
| $W^{6+}$ | 0.00 | 0.00 |
| $Bi^{3+}$ | 0.00 | 0.00 |
| $\Sigma HR$ | 28.71 | 28.71 |
| $Zn^{2+}$ | 2.00 | 2.00 |
| $Li^+$ | 0.00 | 0.00 |
| $Na^+$ | 0.00 | 0.00 |
| $K^+$ | 0.00 | 0.00 |
| $\Sigma R^+$ | 0.00 | 0.00 |
| $Mg^{2+}$ | 0.00 | 0.00 |
| $Ca^{2+}$ | 0.00 | 0.00 |
| $Sr^{2+}$ | 0.00 | 0.00 |
| $Ba^{2+}$ | 0.00 | 0.00 |
| $\Sigma R^{2+}$ | 0.00 | 0.00 |
| $Al^{3+}$ | 0.00 | 0.00 |
| Total | 100.00 | 100.00 |
| $CO_2$ in glass | contained | contained |
| $SO_3$ in glass | contained | contained |
| $CO_2$ (mass %) based on composition | 0.2~2 | 0.2~2 |
| $SO_3$ (mass %) based on composition | 0.07~0.5 | 0.07~0.5 |
| Sb | 0.00 | 0.00 |
| Bubbles (pieces/kg) | 0 | 0 |
| nd | 2.00134 | 2.00197 |
| νd | 28.70 | 28.69 |
| $P_{g,F}$ | 0.59960 | 0.60006 |
| Specific gravity | 5.10 | 5.13 |
| Tg (° C.) | 717 | 718 |
| Ts (° C.) | 755 | 766 |
| Liquidus temperature (° C.) | Less than 1200 | Less than 1200 |
| λ 70 (nm) | 471 | 467 |
| λ 5 (nm) | 370 | 370 |

(Note 1)
Σ Ln3+ means a total content of La3+, Gd3+, Y3+, Yb3+, Sc3+ and Lu3+.
(Note 2)
Σ HR means a total content of Ta5+, Zr4+, Ti4+, Nb5+, W6+ and Bi3+.
(Note 3)
Σ R+ means a total content of Li+, Na+ and K+.
(Note 4)
Σ R2+ means a total content of Mg2+, Ca2+, Sr2+ and Ba2+.
(Note 5)
Sb represents an amount of Sb cation regardless of its valence.

TABLE 3-1

| No. (Cationic %) | 3-1 | 3-2 | 3-3 | 3-4 | 3-5 | 3-6 | 3-7 | 3-8 |
|---|---|---|---|---|---|---|---|---|
| $B^{3+}$ | 29.37 | 32.93 | 29.27 | 30.39 | 38.16 | 56.40 | 59.20 | 59.40 |
| $Si^{4+}$ | 13.21 | 11.83 | 15.29 | 12.15 | 10.35 | 1.36 | 1.34 | 1.32 |
| $Ge^{4+}$ | 0.00 | 0.00 | 0.00 | 1.56 | 0.00 | 0.00 | 0.00 | 0.00 |
| $La^{3+}$ | 30.55 | 26.82 | 32.06 | 28.42 | 26.65 | 20.40 | 20.25 | 18.53 |
| $Gd^{3+}$ | 6.01 | 5.86 | 6.12 | 6.02 | 6.41 | 5.73 | 5.74 | 5.76 |
| $Y^{3+}$ | 0.00 | 5.64 | 0.00 | 3.86 | 4.67 | 1.58 | 1.68 | 1.86 |
| $Yb^{3+}$ | 0.00 | 0.00 | 0.00 | 0.00 | 1.07 | 0.00 | 0.00 | 0.00 |
| $\Sigma Ln^{3+}$ | 36.56 | 38.32 | 38.18 | 38.30 | 38.80 | 27.72 | 27.67 | 26.15 |
| $Ta^{5+}$ | 6.84 | 7.63 | 8.47 | 7.84 | 7.59 | 0.00 | 0.00 | 0.00 |
| $Zr^{4+}$ | 6.36 | 4.48 | 3.77 | 4.60 | 4.62 | 3.98 | 3.94 | 4.76 |
| $Ti^{4+}$ | 0.00 | 0.00 | 0.00 | 0.00 | 0.00 | 0.00 | 0.00 | 0.00 |
| $Nb^{5+}$ | 0.98 | 0.64 | 0.67 | 0.66 | 0.48 | 4.77 | 5.62 | 4.62 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| $\Sigma HR$ | 14.18 | 12.75 | 12.91 | 13.10 | 12.68 | 8.75 | 9.56 | 9.38 |
| $Zn^{2+}$ | 6.68 | 4.17 | 4.35 | 4.29 | 0.00 | 5.78 | 2.23 | 3.75 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| $\Sigma R^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |

TABLE 3-1-continued

| No. (Cationic %) | 3-1 | 3-2 | 3-3 | 3-4 | 3-5 | 3-6 | 3-7 | 3-8 |
|---|---|---|---|---|---|---|---|---|
| $Sr^{2+}$ | 0.00 | 0.00 | 0.00 | 0.00 | 0.00 | 0.00 | 0.00 | 0.00 |
| $Ba^{2+}$ | 0.00 | 0.00 | 0.00 | 0.21 | 0.00 | 0.00 | 0.00 | 0.00 |
| $\Sigma R^{2+}$ | 0.00 | 0.00 | 0.00 | 0.21 | 0.00 | 0.00 | 0.00 | 0.00 |
| $Al^{3+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 | 0.00 | 0.00 |
| nd | 1.89 | 1.88 | 1.88 | 1.88 | 1.88 | 1.83433 | 1.83261 | 1.82905 |
| νd | 40.7 | 41.2 | 41 | 41.1 | 41.2 | 42.72 | 42.2 | 43.13 |
| Tg | 697 | 699 | 713 | 707 | 708 | 655 | 670 | 652 |
| Liquidus temperature (° C.) | 1260 | 1260 | 450 | 1270 | 1280 | 1119 | 1131 | 1145 |
| Specific gravity | — | — | — | — | — | — | — | — |
| λ 80 (nm) | 450 | 443 | 450 | 460 | 444 | — | — | — |
| λ 70 (nm) | — | — | — | — | — | — | — | — |
| λ 5 (nm) | — | — | — | — | — | — | — | — |

(Note 1)
$\Sigma Ln3+$ means a total content of La3+, Gd3+, Y3+, Yb3+, Sc3+ and Lu3+.
(Note 2)
$\Sigma HR$ means a total content of Ta5+, Zr4+, Ti4+, Nb5+, W6+ and Bi3+.
(Note 3)
$\Sigma R+$ means a total content of Li+, Na+ and K+.
(Note 4)
$\Sigma R2+$ means a total content of Mg2+, Ca2+, Sr2+ and Ba2+.
(Note 5)
Sb represents an amount of Sb cation regardless of its valence.

TABLE 3-2

| No. (Cationic %) | 3-9 | 3-10 | 3-11 | 3-12 | 3-13 | 3-14 | 3-15 | 3-16 |
|---|---|---|---|---|---|---|---|---|
| $B^{3+}$ | 26.53 | 34.12 | 28.21 | 22.43 | 54.12 | 34.22 | 22.32 | 34.16 |
| $Si^{4+}$ | 11.24 | 9.95 | 10.11 | 9.74 | 0.00 | 9.90 | 9.69 | 9.94 |
| $Ge^{4+}$ | 5.38 | 0.00 | 0.00 | 0.00 | 0.00 | 0.00 | 0.00 | 0.00 |
| $La^{3+}$ | 33.84 | 20.02 | 19.50 | 20.35 | 20.09 | 20.03 | 20.24 | 20.02 |
| $Gd^{3+}$ | 0.00 | 0.00 | 0.00 | 0.00 | 0.00 | 0.00 | 0.00 | 0.00 |
| $Y^{3+}$ | 1.00 | 0.00 | 0.00 | 0.00 | 0.00 | 0.00 | 0.00 | 0.00 |
| $Yb^{3+}$ | 1.71 | 0.00 | 0.00 | 0.00 | 0.00 | 0.00 | 0.00 | 0.00 |
| $\Sigma Ln^{3+}$ | 36.55 | 20.02 | 19.50 | 20.35 | 20.09 | 20.03 | 20.24 | 20.02 |
| $Ta^{5+}$ | 9.17 | 0.00 | 0.00 | 0.00 | 1.85 | 0.00 | 0.00 | 0.00 |
| $Zr^{4+}$ | 4.93 | 3.16 | 5.31 | 5.15 | 3.32 | 4.17 | 5.12 | 5.15 |
| $Ti^{4+}$ | 6.20 | 14.18 | 18.72 | 23.20 | 5.12 | 15.13 | 24.90 | 14.17 |
| $Nb^{5+}$ | 0.00 | 4.63 | 4.92 | 6.24 | 10.47 | 3.66 | 5.84 | 3.63 |
| $W^{6+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| $\Sigma HR$ | 20.30 | 21.97 | 28.96 | 34.59 | 20.77 | 22.96 | 35.86 | 22.96 |
| $Zn^{2+}$ | 0.00 | 3.00 | 3.45 | 3.00 | 5.03 | 2.99 | 2.38 | 3.00 |
| $Li^{+}$ | 0.00 | 0.00 | 0.00 | 0.00 | 0.00 | 0.00 | 0.00 | 0.00 |
| $Na^{+}$ | 0.00 | 0.00 | 0.00 | 0.00 | 0.00 | 0.00 | 0.00 | 0.00 |
| $K^{+}$ | 0.00 | 0.00 | 0.00 | 0.00 | 0.00 | 0.00 | 0.00 | 0.00 |
| $\Sigma R^{+}$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 3.00 |
| $Sr^{2+}$ | 0.00 | 0.00 | 0.00 | 0.00 | 0.00 | 0.00 | 0.00 | 0.00 |
| $Ba^{2+}$ | 0.00 | 10.94 | 9.78 | 9.89 | 0.00 | 9.90 | 9.51 | 6.93 |
| $\Sigma R^{2+}$ | 0.00 | 10.94 | 9.78 | 9.89 | 0.00 | 9.90 | 9.51 | 9.93 |
| $Al^{3+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $CO_2$ in glass | contained | contained | contained | contained | contained | contained | contained | contained |
| $SO_3$ in glass | contained | contained | contained | contained | contained | contained | contained | contained |
| $CO_2$ (mass %) based on composition | 0.2~2 | 0.2~2 | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 | 0.07~0.5 | 0.07~0.5 |

TABLE 3-2-continued

| No. (Cationic %) | 3-9 | 3-10 | 3-11 | 3-12 | 3-13 | 3-14 | 3-15 | 3-16 |
|---|---|---|---|---|---|---|---|---|
| Sb | 0.00 | 0.00 | 0.00 | 0.00 | 0.00 | 0.00 | 0.00 | 0.00 |
| nd | 1.9225 | 1.89803 | 1.94875 | 1.9945 | 1.90564 | 1.90047 | 2.0003 | 1.90384 |
| νd | 35.95 | 31.14 | 28.25 | 25.88 | 31.71 | 30.71 | 25.51 | 31.3 |
| Tg | — | — | — | — | — | — | — | 650 |
| Liquidus temperature (° C.) | 1050 | 1100 | 1150 | 1150 | 1050 | 1080 | 1150 | — |
| Specific gravity | — | — | — | — | — | — | — | 4.54 |
| λ 80 (nm) | — | — | — | — | — | — | — | 467 |
| λ 70 (nm) | 405 | 407 | 418 | 437 | 424 | 408 | 440 | 405 |
| λ 5 (nm) | 364 | 360 | 364 | 370 | 362 | 362 | 372 | 358 |

(Note 1)

Σ Ln3+ means a total content of La3+, Gd3+, Y3+, Yb3+, Sc3+ and Lu3+.

(Note 2)

Σ HR means a total content of Ta5+, Zr4+, Ti4+, Nb5+, W6+ and Bi3+

(Note 3)

Σ R+ means a total content of Li+, Na+ and K+.

(Note 4)

Σ R2+ means a total content of Mg2+, Ca2+, Sr2+ and Ba2+.

(Note 5)

Sb represents an amount of Sb cation regardless of its valence.

TABLE 3-3

| No. (Cationic %) | 3-17 | 3-18 | 3-19 | 3-20 | 3-21 | 3-22 |
|---|---|---|---|---|---|---|
| $B^{3+}$ | 34.04 | 34.12 | 34.13 | 18.00 | 15.00 | 15.00 |
| $Si^{4+}$ | 9.95 | 9.95 | 9.95 | 6.00 | 5.99 | 6.00 |
| $Ge^{4+}$ | 0.00 | 0.00 | 0.00 | 0.00 | 0.00 | 0.00 |
| $La^{3+}$ | 20.12 | 20.03 | 20.03 | 19.98 | 19.99 | 19.99 |
| $Gd^{3+}$ | 0.00 | 0.00 | 0.00 | 0.00 | 0.00 | 0.00 |
| $Y^{3+}$ | 0.00 | 0.00 | 0.00 | 0.00 | 0.00 | 0.00 |
| $Yb^{3+}$ | 0.00 | 0.00 | 0.00 | 0.00 | 0.00 | 0.00 |
| $\Sigma\,Ln^{3+}$ | 20.12 | 20.03 | 20.03 | 19.98 | 19.99 | 19.99 |
| $Ta^{5+}$ | 0.00 | 0.00 | 0.00 | 0.00 | 0.00 | 0.00 |
| $Zr^{4+}$ | 4.66 | 5.16 | 5.16 | 5.00 | 5.00 | 6.00 |
| $Ti^{4+}$ | 14.18 | 14.18 | 14.18 | 33.60 | 36.60 | 37.59 |
| $Nb^{5+}$ | 3.63 | 3.63 | 3.63 | 8.40 | 8.40 | 5.40 |
| $W^{6+}$ | 0.00 | 0.00 | 0.00 | 0.00 | 0.00 | 0.00 |
| $Bi^{3+}$ | 0.00 | 0.00 | 0.00 | 0.00 | 0.00 | 1.00 |
| Σ HR | 22.47 | 22.97 | 22.98 | 47.00 | 49.99 | 50.00 |
| $Zn^{2+}$ | 2.99 | 2.99 | 3.00 | 0.00 | 0.00 | 0.00 |
| $Li^{+}$ | 0.00 | 0.00 | 0.00 | 0.00 | 0.00 | 0.00 |
| $Na^{+}$ | 0.00 | 0.00 | 0.00 | 0.00 | 0.00 | 0.00 |
| $K^{+}$ | 0.00 | 0.00 | 0.00 | 0.00 | 0.00 | 0.00 |
| $\Sigma\,R^{+}$ | 0.00 | 0.00 | 0.00 | 0.00 | 0.00 | 0.00 |
| $Mg^{2+}$ | 0.00 | 0.00 | 0.00 | 0.00 | 0.00 | 0.00 |
| $Ca^{2+}$ | 5.00 | 1.51 | 2.54 | 0.00 | 0.00 | 0.00 |
| $Sr^{2+}$ | 0.00 | 2.50 | 1.47 | 0.00 | 0.00 | 0.00 |
| $Ba^{2+}$ | 5.43 | 5.93 | 5.91 | 9.02 | 9.02 | 9.02 |
| $\Sigma\,R^{2+}$ | 10.43 | 9.93 | 9.92 | 9.02 | 9.02 | 9.02 |
| $Al^{3+}$ | 0.00 | 0.00 | 0.00 | 0.00 | 0.00 | 0.00 |
| Total | 100.00 | 100.00 | 100.00 | 100.00 | 100.00 | 100.00 |
| $CO_2$ in glass | contained | contained | contained | contained | contained | contained |
| $SO_3$ in glass | contained | contained | contained | contained | contained | contained |
| $CO_2$ (mass %) based on composition | 0.2~2 | 0.2~2 | 0.2~2 | 0.2~2 | 0.2~2 | 0.2~2 |
| $SO_3$ (mass %) based on composition | 0.07~0.5 | 0.07~0.5 | 0.07~0.5 | 0.07~0.5 | 0.07~0.5 | 0.07~0.5 |
| Sb | 0.00 | 0.00 | 0.00 | 0.00 | 0.00 | 0.00 |
| nd | 1.90296 | 1.903275 | 1.90382 | 2.08313 | 2.10449 | 2.10226 |
| νd | 31.27 | 31.315 | 31.255 | 22.23 | 22.51 | 21.58 |
| Tg | 651 | 652 | 653 | 701 | 704 | 716 |
| Liquidus temperature (° C.) | — | — | — | 1270 | 1270 | 1270 |
| Specific gravity | 4.49 | 4.56 | 4.54 | 4.78 | 4.826 | 4.856 |

TABLE 3-3-continued

| No. (Cationic %) | 3-17 | 3-18 | 3-19 | 3-20 | 3-21 | 3-22 |
|---|---|---|---|---|---|---|
| λ 80 (nm) | 491 | 478 | 479 | — | — | — |
| λ 70 (nm) | 405 | 408 | 409 | 465 | 529 | 527 |
| λ 5 (nm) | 359 | 358 | 359 | 374 | 390 | 389 |

(Note 1)
Σ Ln3+ means a total content of La3+, Gd3+, Y3+, Yb3+, Sc3+ and Lu3+.
(Note 2)
Σ HR means a total content of Ta5+, Zr4+, Ti4+, Nb5+, W6+ and Bi3+.
(Note 3)
Σ R+ means a total content of Li+, Na+ and K+.
(Note 4)
Σ R2+ means a total content of Mg2+, Ca2+, Sr2+ and Ba2+.
(Note 5)
Sb represents an amount of Sb cation regardless of its valence.

Comparative Example

Figure 13:
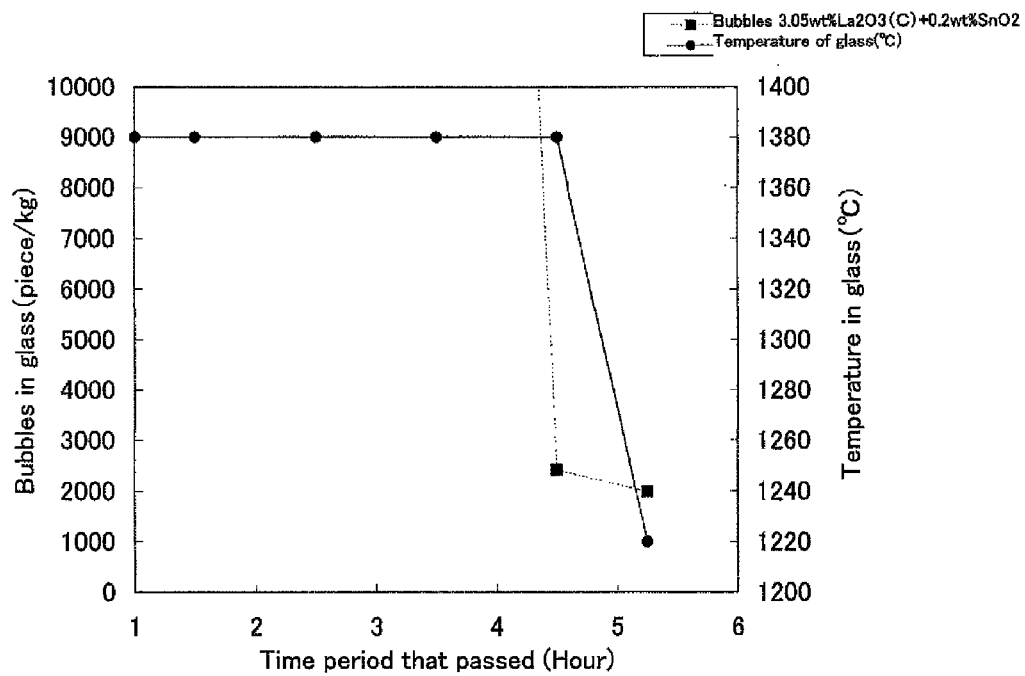
FIG. 13 shows relationships among the passage of time in the step of melting a glass, the temperature of the glass and the density of bubbles in the glass in Comparative Example.

A bubble density in a glass was measured when $SnO_2$ was added to the above Glass No. 2-42 in place of sulfate. In FIG. 13, the abscissa axis shows the passage of time in the step of melting a glass, the ordinate axis on the left side shows the number of bubbles (bubbles density) contained in the glass per unit mass, and the ordinate axis on the right side shows the temperature of the glass, and FIG. 13 shows changes of the temperature of the glass and the bubble density with time. A line passing through plots ● shows a change of the bubble density with time when the amount of $La_2O_3$ to be introduced into the glass as lanthanum carbonate was adjusted to 3.05 mass % and further, $SnO_2$ was added in an amount of 0.2 mass % based on the composition. When the sulfate is replaced with $SnO_2$ as described above, the clarification effect is greatly decreased. Data of the change of the bubble density with time is also shown in Table 5.

Example 2

Boric acid, oxides, carbonates and sulfates were weighed so as to obtain optical glasses having compositions shown in Tables 4 and Tables 5-1 and 5-2, and glass raw materials were prepared by mixing. Lanthanum carbonate, zinc carbonate and barium carbonate were used as the carbonates, and zinc sulfate, barium sulfate, etc., were used as the sulfates. In addition, As and nitrates were not introduced into any glass raw material.

Tables 5-1 and 5-2 show amounts of carbon (based on compositions) contained in the glass raw materials as converted amounts of $CO_2$ and $SO_3$.

Glass raw materials obtained by mixing were placed in crucibles made of platinum, and melted by heating and stirring them at 1,100 to 1,350° C., and the molten glasses were cast into molds to mold them. Then, the molded glasses were pulverized in the form of particles to prepare cutlets.

A cullet having a slightly low refractive index than each of optical glasses and a cullet having a slightly high refractive index than the above optical glass were prepared, the above two cutlets were mixed, and the mixture was placed in a crucible made of platinum and melted by heating it at 1,100 to 1,350° C. Then, the molten glass was temperature-increased to 1,200 to 1,400° C. to clarify it, temperature-decreased, stirred and homogenized at a temperature around a liquidus temperature or a little higher than the liquidus temperature, then caused to flow out and molded.

The thus-obtained optical glasses were measured for properties in the same manner as in Example 1. Tables 4 and Tables 5-1 and 5-2 show the results.

Tables 4 and Tables 5-1 and 5-2 show amounts of carbonates and sulfates to be introduced into the glass raw materials. While the amounts of carbonates and sulfates were adjusted, the number density of bubbles having a diameter of 50 μm or less in each optical glass was controlled such that it was 30 pieces/kg or less, preferably 10 pieces/kg.

In the above optical glasses, sufficient clarification effects can be produced. Much $CO_2$ and $SO_3$ are detectable from the above optical glasses as compared with an optical glass produced without using any one of carbonate and sulfate. Defects such as platinum foreign matter, etc., were not found inside any one of the above optical glasses.

Example 3

Clarified and homogenized molten glasses that would give various optical glasses by the method explained in Example 1 were prepared, and the molten glasses were caused to flow out from pipes at a constant speed, cast into molds and molded in the form of a plate or a round rod.

The resultant glasses in the form of a plate or a round rod were annealed, and then cut or split to prepare glass pieces called cut pieces, and the cut pieces were barrel-polished to give a plurality of glass gobs.

Then, boron nitride as a powder release agent was uniformly applied to the entire surfaces of the glass gobs, and the gobs were heated and softened in a heating furnace, and molded into various lens blanks with press molds each constituted of an upper mold member, a lower mold member and a sleeve. The lens blanks taken out the press molds were annealed to reduce internal stains, and their refractive indices of the glasses were finely adjusted to bring the refractive indices into agreement with desired values.

The annealed lens blanks were ground and polished according to known methods to produce various spherical lenses such as concave meniscus spherical lenses, convex meniscus spherical lenses, biconcave spherical lenses, biconvex spherical lenses, plano-convex spherical lenses, plano-concave spherical lenses, etc.

Similarly, prism blanks were press-molded and annealed, and the annealed products were ground and polished to produce prisms.

A known anti-reflection film may be formed on the optical function surface of each of the thus-obtained various lenses and prisms.

The above glasses in the form of a plate and a round rod were sampled, and the sampled glasses were measured for refractive indices nd and Abbe's numbers vd to show that the tolerance of the refractive indices nd was within ±0.00050 and that the tolerance of the Abbe's numbers vd was within ±0.8%.

TABLE 4

| No. (Cationic %) | 4-1 | 4-2 | 4-3 | 4-4 | 4-5 | 4-6 |
|---|---|---|---|---|---|---|
| $B^{3+}$ | 59.58 | 58.58 | 55.00 | 51.00 | 54.80 | 57.00 |
| $Si^{4+}$ | 0.00 | 1.00 | 2.00 | 4.00 | 2.00 | 0.00 |
| $Ge^{4+}$ | 0.00 | 0.00 | 0.00 | 0.00 | 0.00 | 0.00 |
| $La^{3+}$ | 14.00 | 14.00 | 14.50 | 14.00 | 14.50 | 15.00 |
| $Gd^{3+}$ | 9.00 | 9.00 | 8.00 | 8.00 | 8.00 | 6.00 |
| $Y^{3+}$ | 0.00 | 0.00 | 0.00 | 0.00 | 0.00 | 0.00 |
| $Yb^{3+}$ | 0.00 | 0.00 | 0.00 | 0.00 | 0.00 | 0.00 |
| $\Sigma Ln^{3+}$ | 23.00 | 23.00 | 22.50 | 22.00 | 22.50 | 21.00 |
| $Ta^{5+}$ | 3.42 | 3.42 | 4.00 | 4.00 | 3.80 | 4.00 |
| $Zr^{4+}$ | 3.00 | 3.00 | 2.50 | 3.00 | 2.70 | 2.00 |
| $Ti^{4+}$ | 0.00 | 0.00 | 0.00 | 0.00 | 0.00 | 0.00 |
| $Nb^{5+}$ | 0.00 | 0.00 | 0.00 | 0.00 | 0.00 | 0.00 |
| $W^{6+}$ | 0.00 | 0.00 | 0.00 | 0.00 | 0.20 | 0.00 |
| $Bi^{3+}$ | 0.00 | 0.00 | 0.00 | 0.00 | 0.00 | 0.00 |
| $\Sigma HR$ | 6.42 | 6.42 | 6.50 | 7.00 | 6.70 | 6.00 |
| $Zn^{2+}$ | 11.00 | 10.00 | 11.00 | 11.00 | 11.00 | 15.00 |
| $Li^+$ | 0.00 | 1.00 | 3.00 | 5.00 | 3.00 | 1.00 |
| $Na^+$ | 0.00 | 0.00 | 0.00 | 0.00 | 0.00 | 0.00 |
| $K^+$ | 0.00 | 0.00 | 0.00 | 0.00 | 0.00 | 0.00 |
| $\Sigma R^+$ | 0.00 | 1.00 | 3.00 | 5.00 | 3.00 | 1.00 |
| $Mg^{2+}$ | 0.00 | 0.00 | 0.00 | 0.00 | 0.00 | 0.00 |
| $Ca^{2+}$ | 0.00 | 0.00 | 0.00 | 0.00 | 0.00 | 0.00 |
| $Sr^{2+}$ | 0.00 | 0.00 | 0.00 | 0.00 | 0.00 | 0.00 |
| $Ba^{2+}$ | 0.00 | 0.00 | 0.00 | 0.00 | 0.00 | 0.00 |
| $\Sigma R^{2+}$ | 0.00 | 0.00 | 0.00 | 0.00 | 0.00 | 0.00 |
| Total | 100.00 | 100.00 | 100.00 | 100.00 | 100.00 | 100.00 |
| $CO_2$ in glass | contained | contained | contained | contained | contained | contained |
| $SO_3$ in glass | contained | contained | contained | contained | contained | contained |
| $CO_2$ (mass %) based on composition | 6.00 | 9.00 | 6.00 | 3.00 | 9.00 | 6.00 |
| $SO_3$ (mass %) based on composition | 0.20 | 0.30 | 0.10 | 0.10 | 0.20 | 0.10 |
| $Sb_2O_3$ (mass %) based on composition | 0.04 | 0.06 | 0.05 | 0.05 | 0.05 | 0.05 |
| Bubbles (pieces/kg) | 10 | 10 | 10 | 20 | 10 | 20 |
| nd | 1.8021 | 1.79995 | 1.80449 | 1.80038 | 1.80247 | 1.80046 |
| νd | 45.99 | 46.27 | 45.76 | 45.57 | 45.46 | 45.42 |
| Tg (° C.) | 629 | 624 | 593 | 580 | 594 | 591 |
| Ts (° C.) | 668 | 666 | 640 | 629 | 639 | 634 |
| Liquidus temperature (° C.) | 1010 | 1010 | 1020 | 1020 | 1010 | 1010 |
| Viscosity at liquidus temperature (dPa·s) | 4.5 | 5.5 | 6.0 | 6.5 | 6.0 | 7.0 |

(Note 1)
$\Sigma SLn^{3+}$ means a total content of $La^{3+}$, $Gd^{3+}$, $Y^{3+}$, $Yb^{3+}$, $Sc^{3+}$ and $Lu^{3+}$.
(Note 2)
$\Sigma SHR$ means a total content of $Ta^{5+}$, $Zr^{4+}$, $Ti^{4+}$, $Nb^{5+}$, $W^{6+}$ and $Bi^{3+}$.
(Note 3)
$\Sigma SR^+$ means a total content of $Li^+$, $Na^+$ and $K^+$.
(Note 4)
$\Sigma SR^{2+}$ means a total content of $Mg^{2+}$, $Ca^{2+}$, $Sr^{2+}$ and $Ba^{2+}$.

TABLE 5-1

| No. (Cationic %) | 5-1 | 5-2 | 5-3 | 5-4 | 5-5 | 5-6 | 5-7 | 5-8 | 5-9 | 5-10 | 5-11 |
|---|---|---|---|---|---|---|---|---|---|---|---|
| $B^{3+}$ | 38.50 | 38.00 | 38.00 | 36.73 | 41.23 | 41.50 | 36.00 | 29.32 | 40.00 | 38.00 | 32.50 |
| $Si^{4+}$ | 7.00 | 5.00 | 5.50 | 5.61 | 1.02 | 2.00 | 2.00 | 2.30 | 3.00 | 5.00 | 8.50 |
| $Ge^{4+}$ | 0.00 | 0.00 | 0.00 | 0.00 | 0.00 | 0.00 | 0.00 | 0.00 | 0.00 | 0.00 | 0.00 |
| $La^{3+}$ | 22.00 | 20.00 | 11.00 | 13.27 | 19.23 | 14.75 | 17.00 | 13.75 | 20.00 | 20.50 | 20.00 |
| $Gd^{3+}$ | 4.00 | 6.00 | 11.00 | 10.20 | 5.61 | 5.50 | 6.00 | 4.41 | 5.00 | 5.00 | 6.00 |
| $Y^{3+}$ | 0.00 | 0.00 | 0.00 | 0.00 | 0.00 | 0.00 | 0.00 | 0.00 | 0.00 | 0.00 | 0.00 |
| $Yb^{3+}$ | 0.00 | 0.00 | 0.00 | 0.00 | 0.00 | 0.00 | 0.00 | 0.00 | 0.00 | 0.00 | 0.00 |
| $\Sigma Ln^{3+}$ | 26.00 | 26.00 | 22.00 | 23.47 | 24.84 | 20.25 | 23.00 | 18.16 | 25.00 | 25.50 | 26.00 |
| $Ta^{5+}$ | 5.00 | 3.00 | 5.50 | 5.61 | 5.61 | 5.50 | 5.00 | 4.41 | 6.00 | 6.00 | 6.00 |
| $Zr^{4+}$ | 3.00 | 4.00 | 2.75 | 2.81 | 2.81 | 2.75 | 2.00 | 3.65 | 3.00 | 3.00 | 3.00 |
| $Ti^{4+}$ | 0.00 | 3.00 | 0.25 | 0.26 | 0.00 | 4.00 | 0.00 | 0.00 | 1.50 | 1.50 | 1.50 |
| $Nb^{5+}$ | 0.00 | 0.00 | 0.00 | 0.00 | 0.00 | 0.00 | 0.00 | 0.00 | 0.00 | 0.00 | 0.50 |
| $W^{6+}$ | 3.50 | 3.00 | 7.00 | 6.12 | 5.10 | 5.00 | 8.00 | 9.96 | 3.00 | 3.50 | 2.00 |

TABLE 5-1-continued

| No. (Cationic %) | 5-1 | 5-2 | 5-3 | 5-4 | 5-5 | 5-6 | 5-7 | 5-8 | 5-9 | 5-10 | 5-11 |
|---|---|---|---|---|---|---|---|---|---|---|---|
| $Bi^{3+}$ | 0.00 | 0.00 | 0.00 | 0.00 | 0.00 | 0.00 | 0.00 | 0.00 | 0.00 | 0.00 | 0.00 |
| $\Sigma HR$ | 11.50 | 13.00 | 15.50 | 14.80 | 13.52 | 17.25 | 16.00 | 18.02 | 13.50 | 14.00 | 13.00 |
| $Zn^{2+}$ | 17.00 | 18.00 | 17.00 | 17.35 | 19.39 | 19.00 | 23.00 | 32.20 | 18.50 | 17.50 | 20.00 |
| $Li^+$ | 0.00 | 0.00 | 2.00 | 2.04 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 | 0.00 | 0.00 | 0.00 |
| $\Sigma R^+$ | 0.00 | 0.00 | 2.00 | 2.04 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 | 0.00 | 0.00 | 0.00 |
| $Ba^{2+}$ | 0.00 | 0.00 | 0.00 | 0.00 | 0.00 | 0.00 | 0.00 | 0.00 | 0.00 | 0.00 | 0.00 |
| $\Sigma R^{2+}$ | 0.00 | 0.00 | 0.00 | 0.00 | 0.00 | 0.00 | 0.00 | 0.00 | 0.00 | 0.00 | 0.00 |
| 合計 | 100.00 | 100.00 | 100.00 | 100.00 | 100.00 | 100.00 | 100.00 | 100.00 | 100.00 | 100.00 | 100.00 |

(Note 1)
$\Sigma Ln3+$ means a total content of La3+, Gd3+, Y3+, Yb3+, Sc3+ and Lu3+.
(Note 2)
$\Sigma HR$ means a total content of Ta5+, Zr4+, Ti4+, Nb5+, W6+ and Bi3+.
(Note 3)
$\Sigma R+$ means a total content of Li+, Na+ and K+.
(Note 4)
$\Sigma R2+$ means a total content of Mg2+, Ca2+, Sr2+ and Ba2+.

TABLE 5-2

| No. (Cationic %) | 5-1 | 5-2 | 5-3 | 5-4 | 5-5 | 5-6 |
|---|---|---|---|---|---|---|
| $CO_2$ in glass | contained | contained | contained | contained | contained | contained |
| $SO_3$ in glass | contained | contained | contained | contained | contained | contained |
| $CO_2$ (mass %) based on composition | 6.00 | 3.00 | 3.00 | 9.00 | 6.00 | 3.00 |
| $SO_3$ (mass %) based on composition | 0.20 | 0.10 | 0.10 | 0.30 | 0.10 | 0.20 |
| $Sb_2O_3$ (mass %) based on composition | 0.04 | 0.04 | 0.04 | 0.02 | 0.02 | 0.04 |
| Bubbles (pieces/kg) | 30 | 20 | 10 | 20 | 10 | 20 |
| nd | 1.86175 | 1.88158 | 1.86930 | 1.87483 | 1.88658 | 1.89192 |
| nd | 39.31 | 37.20 | 36.43 | 36.60 | 36.86 | 34.13 |
| Specific gravity | 5.31 | 5.27 | 5.10 | 5.51 | 5.53 | 5.31 |
| Tg (° C.) | 614 | 610 | 592 | 597 | 602 | 599 |
| Ts (° C.) | 661 | 659 | 635 | 640 | 643 | 642 |
| Liquidus temperature (° C.) | 1140 | 1110 | 1170 | 1210 | 1080 | 1080 |
| Viscosity at liquidus temperature (dPa·s) | 1.5 | 2.0 | 1.5 | 1.0 | 2.0 | 2.0 |

| No. (Cationic %) | 5-7 | 5-8 | 5-9 | 5-10 | 5-11 |
|---|---|---|---|---|---|
| $CO_2$ in glass | contained | contained | contained | contained | contained |
| $SO_3$ in glass | contained | contained | contained | contained | contained |
| $CO_2$ (mass %) based on composition | 3.00 | 6.00 | 9.00 | 6.00 | 9.00 |
| $SO_3$ (mass %) based on composition | 0.20 | 0.10 | 0.30 | 0.10 | 0.30 |
| $Sb_2O_3$ (mass %) based on composition | 0.04 | 0.04 | 0.06 | 0.04 | 0.06 |
| Bubbles (pieces/kg) | 20 | 10 | 10 | 20 | 30 |
| nd | 1.90148 | 1.89294 | 1.88311 | 1.88492 | 1.87963 |
| nd | 34.73 | 35.78 | 37.40 | 37.09 | 37.75 |
| Specific gravity | 5.68 | 5.60 | 5.40 | 5.42 | 5.39 |
| Tg (° C.) | 589 | 596 | 607 | 621 | 627 |
| Ts (° C.) | 630 | 638 | 650 | 665 | 675 |
| Liquidus temperature (° C.) | 1100 | 1090 | 1120 | 1120 | 1125 |

TABLE 5-2-continued

| | | | | | |
|---|---|---|---|---|---|
| Viscosity at liquidus temperature (dPa·s) | 2.0 | 2.0 | 2.0 | 2.0 | 3.0 |

(Note 1)
Σ Ln3+ means a total content of La3+, Gd3+, Y3+, Yb3+, Sc3+ and Lu3+.
(Note 2)
Σ HR means a total content of Ta5+, Zr4+, Ti4+, Nb5+, W6+ and Bi3+.
(Note 3)
Σ R+ means a total content of Li+, Na+ and K+.
(Note 4)
Σ R2+ means a total content of Mg2+, Ca2+, Sr2+ and Ba2+.

Example 4

Clarified and homogenized molten glasses that would give various optical glasses by the method explained in Example 1 were prepared, and the molten glasses were caused to flow out onto molding surfaces of lower mold members of press molds from pipes at a constant speed, cut with cutting blades called shear, to obtain molten glass gobs on the molding surfaces of the lower mold members. Then, the molten glass gobs were press-molded with the lower mold members and the upper mold members to mold them into various lens blanks. The lens blanks taken out of the press molds were annealed to reduce a stain inside each lens blank, and the refractive indices of the glasses were finely adjusted to bring their refractive indices into agreement with desired values.

The annealed lens blanks were ground and polished according to known methods to produce various spherical lenses such as concave meniscus spherical lenses, convex meniscus spherical lenses, biconcave spherical lenses, biconvex spherical lenses, plano-convex spherical lenses, plano-concave spherical lenses, etc.

Similarly, prism blanks were press-molded and annealed, followed by grinding and polishing to produce prisms.

A known anti-reflection film may be formed on the optical function surface of each of the thus-obtained various lenses and prisms.

Example 5

Clarified and homogenized molten glasses that would give various optical glasses by the method explained in Example 2 were prepared, they were caused to flow out at a constant speed from pipes into concave portions of receiving molds, the lower ends of the molten glass flows were supported with the molds, narrow portions were formed in the molten glass flows thanks to a surface tension, and then the receiving molds were rapidly moved down to separate molten glasses below the above narrow portions. Separated molten glass masses were molded into precision press-molding preforms while they were caused to float by applying upward gas pressures thereto in the concave portions of the receiving molds.

A carbon film was formed on each of the thus-obtained preforms, the preforms were placed in press molds made of SiC having a constitution of an upper mold member, a lower mold member and a sleeve member, the preforms and the press molds were heated together and the preforms were precision press-molded to produce various aspherical lenses such as concave meniscus aspherical lenses, convex meniscus aspherical lenses, biconcave aspherical lenses, biconvex aspherical lenses, plano-convex aspherical lenses, plano-concave aspherical lenses, etc.

The thus-obtained various lenses may be annealed to finely adjust their refractive indices or to reduce strains, or they may be processed for centering and edging.

A known anti-reflection film may be formed on the optical function surface of each of the thus-obtained various lenses.

There may be employed a constitution in which clarified and homogenized molten glasses that will give various optical glasses by the method explained in Example 2 are prepared, they are cast into molds from pipes at a constant speed to mold them into glasses in the form of a plate or round rod, they are annealed and then cut or split to produce cut pieces, and the cut pieces are ground and polished to obtain precision press-molding preforms. Various optical elements can be produced from the thus-obtained preforms by the above-described method.

The above glasses in the form of a plate or a round rod were sampled, and the sampled glasses were measured for refractive indices nd and Abbe's numbers vd to show that the tolerance of the refractive indices nd was within ±0.00050 and that the tolerance of the Abbe's numbers vd was within ±0.8%.

Example 6

Clarified and homogenized molten, glasses that would give various optical glasses by the methods explained in Examples 1 and 2 were prepared, they were cast into molds from pipes at a constant speed to mold them into glasses in the form of a plate or a round rod, they were annealed and then cut or split to produce cut pieces, and the cut pieces were ground and polished to produce various spherical lenses such as concave meniscus spherical lenses, convex meniscus spherical lenses, biconcave spherical lenses, biconvex spherical lenses, plano-convex spherical lenses, plano-concave spherical lenses, etc., and prisms.

A known anti-reflection film may be formed on the optical function surface of each of the thus-obtained various lenses.

The invention claimed is:
1. A process for producing a glass in the production of a glass molded article formed of an optical glass by melting and clarifying a glass raw material to prepare a molten glass and molding said molten glass,
the process comprising preparing a glass raw material that gives an oxide glass comprising, by cationic %,
12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$, a total content of said cationic components in the oxide glass being 99 to 100%, and said glass raw material comprising carbonate and sulfate.

2. A process for producing a glass in the production of a cullet by melting a glass raw material to prepare a molten glass and rapidly cooling said molten glass, the process comprising preparing a glass raw material that gives a glass comprising, by cationic %, 12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$, a total content of said cationic components in the glass being 99 to 100%, and said glass raw material comprising carbonate and sulfate.

3. A process for producing a glass, which comprises preparing a cullet according to the process recited in claim 2, melting and clarifying said cullet to prepare a molten glass and molding said molten glass, to produce a glass molded material formed of an optical glass comprising, by cationic %, 12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$, a total content of said cationic components in the optical glass being 99 to 100%.

4. The process for producing a glass as recited in claim 1 or 3, wherein at least one step of said melting and clarifying is carried out in a vessel made of platinum or a platinum alloy.

5. An optical glass that is an oxide glass comprising, by cationic %, 12 to 65% of $B^{3+}$,
0 to 20% of $Si^{4+}$,
0 to 6% of $Ge^{4+}$,
15 to 50% of total of $La^{3+}$, $Gd^{3+}$, $Y^{3+}$, $Yb^{3+}$, $Sc^{3+}$ and $Lu^{3+}$,
4 to 54% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$, a total content of said cationic components in the oxide glass being 99% or more, the oxide glass containing carbon and sulfur.

6. A press-molding glass material formed of the optical glass recited in claim 5.

7. An optical element formed of the optical glass recited in claim 5.

8. A process for producing an optical element, which comprises preparing an optical glass according to the process recited in claim 1 or 3, and making an optical element from said optical glass.

9. A cullet formed of an oxide glass comprising, by cationic %, 12 to 65% of $B^{3+}$,
0 to 20% of $Si^{4+}$,
0 to 6% of $Ge^{4+}$,
15 to 54% of total of $La^{3+}$, $Gd^{3+}$, $Y^{3+}$, $Yb^{3+}$, $Sc^{3+}$ and $Lu^{3+}$,
4 to 40% of total of $Ta^{5+}$, $Zr^{4+}$, $Ti^{4+}$, $Nb^{5+}$, $W^{6+}$ and $Bi^{3+}$,
0 to 35% of $Zn^{2+}$,
0 to 9% of total of $Li^+$, $Na^+$ and $K^+$, and
0 to 15% of total of $Mg^{2+}$, $Ca^{2+}$, $Sr^{2+}$ and $Ba^{2+}$, a total content of said cationic components in the oxide glass being 99% or more, the oxide glass containing carbon and sulfur.

* * * * *

UNITED STATES PATENT AND TRADEMARK OFFICE
CERTIFICATE OF CORRECTION

| | | |
|---|---|---|
| PATENT NO. | : 8,661,853 B2 | Page 1 of 1 |
| APPLICATION NO. | : 13/128454 | |
| DATED | : March 4, 2014 | |
| INVENTOR(S) | : Tomoaki Neghishi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 82 days.

Signed and Sealed this
Eighth Day of September, 2015

Michelle K. Lee
*Director of the United States Patent and Trademark Office*